(12) United States Patent
Zhao et al.

(10) Patent No.: US 10,987,653 B2
(45) Date of Patent: Apr. 27, 2021

(54) MATERIAL FOR REMOVING CONTAMINANTS FROM WATER

(71) Applicant: Auburn University, Auburn, AL (US)

(72) Inventors: Dongye Zhao, Auburn, AL (US); Wen Liu, Beijing (CN)

(73) Assignee: AUBURN UNIVERSITY, Auburn, AL (US)

( * ) Notice: Subject to any disclaimer, the term of this patent is extended or adjusted under 35 U.S.C. 154(b) by 297 days.

(21) Appl. No.: 15/884,641

(22) Filed: Jan. 31, 2018

(65) Prior Publication Data

US 2018/0214851 A1 Aug. 2, 2018

Related U.S. Application Data

(60) Provisional application No. 62/452,648, filed on Jan. 31, 2017.

(51) Int. Cl.
| | |
|---|---|
| *B01J 20/28* | (2006.01) |
| *B01J 20/34* | (2006.01) |
| *C02F 1/28* | (2006.01) |
| *B01J 20/20* | (2006.01) |
| *B01J 23/10* | (2006.01) |

(Continued)

(52) U.S. Cl.
CPC ............. *B01J 23/10* (2013.01); *B01J 20/20* (2013.01); *B01J 20/28083* (2013.01); *B01J 20/3416* (2013.01); *B01J 20/3441* (2013.01); *B01J 21/063* (2013.01); *B01J 21/18* (2013.01); *B01J 23/02* (2013.01); *B01J 23/04* (2013.01); *B01J 23/90* (2013.01); *B01J 35/004* (2013.01); *B01J 35/0013* (2013.01); *B01J 35/0046* (2013.01); *B01J 35/1061* (2013.01); *B01J 37/0215* (2013.01); *B01J 38/00* (2013.01); *B82Y 40/00* (2013.01); *C02F 1/288* (2013.01); *B01J 37/08* (2013.01); *C02F 1/281* (2013.01); *C02F 1/283* (2013.01); *C02F 2101/20* (2013.01); *C02F 2101/327* (2013.01); *C02F 2103/02* (2013.01);
(Continued)

(58) Field of Classification Search
CPC .................. B01J 20/20; B01J 20/28083; B01J 20/28026; B01J 20/3416; B01J 20/0211; B01J 21/063; B01J 21/18; B01J 23/02; B01J 23/04; B01J 23/90; B01J 23/10; B01J 37/0215; B01J 37/08; B01J 38/00; B01J 35/0013; B01J 35/004; B01J 35/0046; B01J 35/1061; B82Y 40/00
See application file for complete search history.

(56) References Cited

U.S. PATENT DOCUMENTS

| | | | |
|---|---|---|---|
| 4,879,049 A | 11/1989 | De Mon et al. | |
| 5,849,201 A | 12/1998 | Bradley | |

(Continued)

FOREIGN PATENT DOCUMENTS

JP 2009035463 A * 2/2009

OTHER PUBLICATIONS

Machine translation of JP-2009035463-A, originally published Feb. 2009. (Year: 2009).*

(Continued)

*Primary Examiner* — Katherine Zalasky McDonald
(74) *Attorney, Agent, or Firm* — Barnes & Thornburg LLP

(57) ABSTRACT

A composite comprises a carbonaceous and a metallic nanotube conjugated with a carbonaceous support. The composite may be used to remove contaminants from water.

16 Claims, 33 Drawing Sheets

(51) Int. Cl.
    *B01J 21/06*     (2006.01)
    *B01J 23/02*     (2006.01)
    *B01J 21/18*     (2006.01)
    *B01J 35/00*     (2006.01)
    *B01J 37/02*     (2006.01)
    *B01J 23/04*     (2006.01)
    *B01J 35/10*     (2006.01)
    *B01J 23/90*     (2006.01)
    *B01J 38/00*     (2006.01)
    *B82Y 40/00*     (2011.01)
    *B01J 37/08*     (2006.01)
    *C02F 103/02*     (2006.01)
    *C02F 101/20*     (2006.01)
    *C02F 101/32*     (2006.01)

(52) U.S. Cl.
CPC ...... *C02F 2303/16* (2013.01); *C02F 2305/08* (2013.01); *C02F 2305/10* (2013.01)

(56) References Cited

U.S. PATENT DOCUMENTS

| | | | |
|---|---|---|---|
| 7,645,439 | B2 | 1/2010 | Toledo Antonio et al. |
| 2005/0215068 | A1* | 9/2005 | Yuka .................. B01J 21/063 438/758 |
| 2007/0190765 | A1* | 8/2007 | Xie .................... C01G 23/047 438/585 |
| 2007/0217978 | A1 | 9/2007 | Baican et al. |
| 2008/0045770 | A1* | 2/2008 | Sigmund .................. C02F 1/32 588/299 |
| 2009/0005238 | A1* | 1/2009 | Falaras ................ B01J 37/0215 502/200 |
| 2010/0190639 | A1* | 7/2010 | Worsley ................ H01M 4/625 502/183 |
| 2012/0165184 | A1* | 6/2012 | Lim .................... B01J 37/024 502/183 |
| 2016/0207789 | A1 | 7/2016 | Tang et al. |

OTHER PUBLICATIONS

Ahmed et al., "Influence of parameters on the heterogeneous photocatalytic degradation of pesticides and phenolic contaminants in wastewater: A short review," Journal of Environmental Management 92 (2011), 311-330.
Akhavan et al., "Toxicity of Graphene and Graphene Oxide Nanowalls Against Bacteria," ACS Nano, vol. 4, No. 10, (2010), 5731-5736.
Bavykin et al., "Protonated Titanates and $TiO_2$ Nanostructured Materials: Synthesis, Properties, and Applications," Adv. Mater., 2006, 18, 2807-2824.
Bavykin et al., "Stability of Aqueous Suspensions of Titanate Nanotubes," Chem. Mater., 2006, 18, 1124-1129.
Chen et al., "Trititanate Nanotubes Made via a Single Alkali Treatment," Adv. Mater., 2002, 14, No. 17, 1208-1211.
Chen et al., "Adsorption of Nonionic Aromatic Compounds to Single-Walled Carbon Nanotubes: Effects of Aqueous Solution Chemistry," Environ. Sci. Technol., 2008, 42, 7225-7230.
Chen et al., "Adsorption of Polar and Nonpolar Organic Chemicals to Carbon Nanotubes," Environ. Sci. Technol., 2007, 41, 8295-8300.
Chilom et al., "Aggregation of humic acid in solution: contributions to different fractions," Organic Geochemistry, 40, (2009), 455-460.
Chingombe et al., "Surface modification and characterisation of a coal-based activated carbon," Carbon 43, (2005), 3132-3143.
Chong et al., "Recent developments in photocatalytic water treatment technology: A review," Water Research, 44, (2010), 2997-3027.
Dabrowski et al., "Adsorption of phenolic compounds by activated carbon—a critical review," Chemosphere, 58, (2005), 1049-1070.
Everett, D.H., "A General Approach to Hysteresis. Part 3—A formal treatment of the independent domain model of hysteresis," Transactions of the Faraday Society, vol. 50, (1954), 1077-1096.
Fasnacht et al., "Aqueous Photodegradation of Polycyclic Aromatic Hydrocarbons," Environ. Sci. Technol. 2002, 36, 4364-4369.
Fujii et al., "Effects of Molecular composition of Natural Organic Matter on Ferric Iron Complexation of Circumneutral pH," Environ. Sci. Technol., 2014, 48, 4414-4424.
Garcia et al., "Role of the activated carbon surface chemistry in the adsorption of phenanthrene," Carbon, 42, (2004), 1683-1689.
Guetzloff et al., "Does humic acid form a micelle?" The Science of the Total Environment, 152, (1994), 31-35.
Haritash et al., "Biodegradation aspects of Polycyclic Aromatic Hydrocarbons (PAHs): A review," Journal of Hazardous Materials, 169, (2009), 1-15.
Ho et al., "Pseudo-second order model for sorption processes," Process Biochemistry, 34, 1999, 451-465.
Hu et al., "Photocatalytic mechanism of graphene/titanate nanotubes photocatalyst under visible-light irradiation," Materials Chemistry and Physics, 138, (2013), 608-614.
Jia et al., "Photodegradation of phenanthrene on cation-modified clays under visible light," Applied Catalysis B: Envionmental, 123, (2012), 43-51.
Karapanagioti et al., "Phenanthrene Sorption with Heterogeneous Organic Matter in a Landfill Aquifer Material," Phys. Chem. Earth (B), vol. 24, No. 6, 535-541.
Kasuga et al., "Titania Nanotubes Prepared by Chemical Processing," Adv. Mat., 1999, 11, 1307-1311.
Kim et al., "Core-shell-structured carbon nanofiber-titanate nanotubes with enhanced photocatalytic activity," Applied Catalysis B: Environmental, 148, (2014), 170-176.
Ko et al., "Cyclodextrin-Enhanced Electrokinetic Removal of Phenanthrene from a Model Clay Soil," Environ. Sci. Technol., 2000, 34, 1535-1541.
Lam et al., "A Review of Carbon Nanotube Toxicity and Assessment of Potential Occupational and Environmental Health Risks," Critical Reviews in Toxicology, 36, 189-217, 2006.
Laor, Y. et al, "Bioavailability of Phenanthrene Sorbed to Mineral-Associated Humic Acid," Wat. Res., 33, 1719-1729, (1999).
Le et al., "Photocatalytic degradation of methylene blue by a combination of $TiO_2$-anastase and coconut shell activated carbon," Powder Technology, 225, (2012), 167-175.
Lee et al., "Effects of sodium content and calcination temperature on the morphology, structure and photocatalytic activity of nanotubular titanates," Journal of Colloid and Interface Science, 316, (2007), 562-569.
Lee et al., "Equilibrium Partitioning of Polycyclic Aromatic Hydrocarbons from Coal Tar Into Water," Environ. Sci. Technol., 26, 1992, 2110-2115.
Li et al., "Water-Soluble Fluorescent Carbon Quantum Dots and Photocatalyst Design," Angew. Chem. Int. Ed., 49, (2010), 4430-4434.
Libby et al., "Adsorption/Desorption Hysteresis in Inkbottle Pores: A Density Functional Theory and Monte Carlo Simulation Study," Langmuir, 20, (2004), 4289-4294.
Liu et al., "Synergy of photocatalysis and adsorption for simultaneous removal of Cr(VI) and Cr(III) with $TiO_2$ and titanate nanotubes," Water Research, 53, (2014), 12-25.
Liu et al., Adsorption of $Pb^{2+}$, $Cd^{2+}$, $Cu^{2+}$ and $Cr^{3+}$ onto titanate nanotubes: Competition and effect of inorganic ions, Science of the Total Environment, 456-457, (2013) 171-180.
Liu et al., "Application potential of carbon nanotubes in water treatment: A review," Journal of Environmental Sciences, 25(7), (2013) 1263-1280.
Liu et al., "Dual-Enhanced Photocatalytic Activity of Fe-Deposited Titanate Nanotubes Used for Simultaneous Removal of As(III) and As(V)," ACS Appl. Mater. Interface, 2015, 7, 19726-19735.
Liu et al., "High photocatalytic and adsorptive performance of anatase-covered titanate nanotubes prepared by wet chemical reaction," Microporous and Mesoporous Materials, 186, (2014), 168-175.
Manfroi et al., "Titanate nanotubes produced from microwave-assisted hydrothermal synthesis: Photocatalytic and structural properties," Ceramics International, 40, (2014), 14483-14491.

(56) References Cited

OTHER PUBLICATIONS

Mason, G., "The Effect of Pore Space Connectivity on the Hysteresis of Capillary Condensation in Adsorption-Desorption Isotherms," Journal of Colloid and Interface Science, vol. 88, No. 1, 36-46, 1982.
Miao et al., "Titanate nanotubes: synthesis, properties and loading with silver-nanoparticles for photochromic application," 2008 2nd IEEE International Nanoelectronics Conference (INEC 2008), 1093-1098.
Neimark et al., "Adsorption hysteresis in nanopores," Physical Review E, vol. 62, No. 2, 2000, R1493-R1496.
Nel et al., "Toxic Potential of Materials at the Nanolevel," Science, vol. 311, 2006, 622-627.
Neville et al., "Visible light active C-doped titanate nanotubes prepared via alkaline hydrothermal treatment of C-doped nanoparticulate $TiO_2$: Photo-electrochemical and photocatalytic properties," Journal of Photochemistry and Photobiology A: Chemistry, 267, (2013), 17-24.
Ou et al., "Review of titania nanotubes synthesized via the hydrothermal treatment: Fabrication, modification, and application," Separation and Purification Technology, 58, (2007) 179-191.
Pan et al., "Adsorption Mechanisms of Organic Chemicals on Carbon Nanotubes," Environmental Science & Technology, vol. 42, No. 24, 2008, 9005-9013.
Parlett et al., "Hierarchical porous materials: catalytic applications," Chem. Soc. Rev., 2013, 42, 3876-3893.
Pazos et al., "Decontamination of spills containing PAHs by electroremediation: A review," Journal of Hazardous Materials, 177, (2010), 1-11.
Pignatello et al., "Effect of Natural Organic Substances on the Surface and Adsorptive Properties of Environmental Black Carbon (Char): Attenuation of Surface Activity by Humic and Fulvic Acids," Environ. Sci. Technol., 2006, 40, 7757-7763.
Przepiorski, J., "Enhanced adsorption of phenol from water by ammonia-treated activated carbon," Journal of Hazardous Materials, B135, 2006, 453-456.
Puziy et al., "XPS and NMR studies of phosphoric acid activated carbons," Carbon ,46, 2008, 2113-2123.
Quinones et al., "Enhanced activity and reusability of $TiO_2$ loaded magnetic activated carbon for solar photocatalytic ozonation," Applied Catalysis B: Environmental, 144, (2014), 96-106.
Rey et al., "Simulated solar-light assisted photocatalytic ozonation of metroprolol over titania-coated magnetic activated carbon," Applied Catalysis B: Environmental, 111, (2012), 246-253.
Rubio-Clemente et al., "Removal of polycyclic aromatic hydrocarbons in aqueous environment by chemical treatments: A review," Science of the Total Environment, 478, (2014), 201-225.
Shabeer et al., "Removal of Poly Aromatic Hydrocarbons (PAHs) from Water: Effect of Nano and Modified Nano-clays as a Flocculation Aid and Adsorbent in Coagulation-flocculation Process," Polycyclic Aromatic Compounds, 2014, 34, 452-467.
Simko et al., "Removal of polycyclic aromatic hydrocarbons from water by migration into polyethylene," Food Chemistry, 64, (1999), 157-161.
Simpson, A.J., "Determining the molecular weight, aggregation, structures and interactions of natural organic matter using diffusion ordered spectroscopy," Magnetic Resonance in Chemistry, 40, (2002), S72-S82.
Slimen et al., "Elaboration of stable anatase $TiO_2$ through activated carbon addition with high photocatalytic activity under visible light," Journal of Photochemistry and Photobiology A Chemistry, 221 (2011), 13-21.
Sun et al., "Synthesis and Characterization of Ion-Exchangeable Titanate Nanotubes," Chem. Eur. J., 2003, 9, 2229-2238.
Takagahara et al., "Theory of the quantum confinement effect on excitons in quantum dots of indirect-gap materials," Rapid Communications Physical Review B, vol. 46, No. 23, 1992, 15578-15581.
Tan et al., "Equilibrium and kinetic studies on basic dye adsorption by oil palm fibre activated carbon," Chemical Engineering Journal, 127, (2007), 111-119.
Trellu et al., "Removal of hydrophobic organic pollutants from soil washing/flushing solutions: A critical review," Journal of Hazardous Materials, 306, (2016), 149-174.
Tuller et al., "Adsorption and capillary condensation in porous media: Liquid retention and interfacial configurations in angular pores," Water Resources Research, 35, 1999, 1949-1964.
Valderrama et al., "Sorption kinetics of polycyclic aromatic hydrocarbons removal using granular activated carbon: Intraparticle diffusion coefficients," Journal of Hazardous Materials, 157, (2008), 386-396.
Wang et al., "Adsorption and Desorption of Phenanthrene on Carbon Nanotubes in Simulated Gastrointestinal Fluids," Environmental Science & Technology, 2011, 45, 6018-6024.
Wang et al., "Adsorption of Polycyclic Aromatic Hydrocarbons by Graphene and Graphene Oxide Nanosheets," Environmental Science & Technology, 2014, 48, 4847-1825.
Wang et al., "Influence of pH, ionic strength and humic acid on competitive adsorption of Pb(II), Cd(II) and Cr(III) onto titanate nanotubes," Chemical and Journal, 215-215, 2013, 366-374.
Wang et al., "Sorption of Organic Contaminants by Carbon Nanotubes: Influence of Adsorbed Organic Matter," Environ. Sci. Technol. 2008, 42, 3207-3212.
Wen et al., "Photocatalytic reactions of phenanthrene at $TiO_2$/water interfaces," Chemosphere, 46, (2002), 871-877.
Woan et al., "Photocatalytic Carbon-Nanotube-$TiO_2$ Composites," Adv. Mater., 2009, 21, 2233-2239.
Wu et al., "Sequence of Events for the Formation of Titanate Nanotubes, Nanofibers, Nanowires, and Nanobelts," Chem. Mater., 2006, 18, 547-553.
Wu et al., "The fabrication and characterization of novel carbon doped $TiO_2$ nanotubes, nanowires and nanorods with high visible light photocatalytic activity," Nanotechnology, 20, (2009), 235701 (9pp).
Xiong et al., "Adsorption of Pb(II) and Cd(II) from aqueous solutions using titanate nanotubes prepared via hydrothermal method," Journal of Hazardous Materials, 189, (2011) ,741-748.
Xiong et al., "Adsorption behavior of methylene blue onto titanate nanotubes," Chemical Engineering Journal, 156, (2010), 313-320.
Xue et al., "Synergy between surface adsorption and photocatalysis during degradation of humic acid on $TiO_2$/activated carbon composites," Journal of Hazardous Materials, 185, (2011), 765-772.
Yang et al., "Adsorption of Polycyclic Aromatic Hydrocarbons by Carbon Nanomaterials," Environ. Sci. Technol., 2006, 40, 1855-1861.
Yang et al., "Anatase $TiO_2$ single crystals with a large percentage of reactive facets," Nature, vol. 453, 29, 2008, 638-641.
Yang, "Competitive Adsorption of Naphthalene with 2,4-Dichlorophenol and 4-Chloroaniline on Multiwalled Carbon Nanotubes," Environ. Sci. Technol., 2010, 44, 3021-3027.
Yang et al., "Competitive Sorption of Pyrene, Phenanthrene, and Naphthalene on Multiwalled Carbon Nanotubes," Environ. Sci. Technol, 2006, 40, 5804-5810.
Yang et al., "Desorption of polycyclic aromatic hydrocarbons from carbon nanomaterials in water," Environmental Pollution 145 (2007) 529-537.
Yang et al., "Porous carbon-supported catalysts for energy and environmental applications: A short review," Catalysis Today, 178 (2011), 197-205.
Yu et al., "Carbon quantum dots/$TiO_2$ composites for efficient photocatalytic hydrogen evolution," Journal of Materials Chemistry A, 2014, 2, 3344-3351.
Zeledon-Toruno et al., "Removal of PAHs from water using an immature coal (leonardite)," Chemosphere 67, (2007), 505-512.
Zhang et al., "Carbon quantum dot sensitized $TiO_2$ nanotube arrays for photoelectrochemical hydrogen generation under visible light," Nanoscale, 2013, 5, 2274-2278.
Zhang et al., "Heterogeneous photocatalytic degradation of phenanthrene in surfactant solution containing $TiO_2$ Particles," Journal of Hazardous Materials, 191 2011, 136-143.

(56) References Cited

OTHER PUBLICATIONS

Zhao et al., "A new type of cobalt-deposited titanate nanotubes for enhanced photocatalytic degradation of phenanthrene," Applied Catalysis B: Environmental, 187, (2016), 134-143.
Zhao et al., "Adsorption of Phenanthrene on Multilayer Graphene as Affected by Surfactant and Exfoliation," Environmental Science & Technology, 2014, 48, 331-339.
Zhao et al., "Application of the Dual-Mode Model for Predicting Competitive Sorption Equilibria and Rates of Polycyclic aromatic Hydrocarbons in Estuarine Sediment Suspensions," Environmental Toxicology and Chemistry, 2002, 21, 2276-2282.
Zhao et al., "Dual-mode modeling of competitive and concentration-dependent sorption and desorption kinetics of polycyclic aromatic hydrocarbons in soils," Water Resources Research, vol. 37, No. 8, 2205-2212, 2001.
Wershaw, R. L. Membrane-Micelle Model for Humus in Soils and Sediments and its Relation to Humification; US Geological Survey, USGPO: 1994, 54 pages.

\* cited by examiner

MATERIAL FOR REMOVING CONTAMINANTS FROM WATER

CROSS-REFERENCE TO RELATED APPLICATIONS

This application claims priority under 35 U.S.C. § 119(e) to U.S. Provisional Application No. 62/452,648, filed Jan. 31, 2017, which is expressly incorporated by reference herein.

GOVERNMENT RIGHTS

This invention was made with government support under Grant/Contract No. M12AC00013 awarded by the Bureau of Ocean Energy Management (BOEM). The government has certain rights in the invention.

TECHNICAL FIELD

The invention relates to composites of a carbonaceous support and a metallic nanotube conjugated with a carbonaceous support. The invention includes compositions and various methods, including methods for removing one or more contaminants from water.

BACKGROUND AND SUMMARY

Separating and degrading organic micro-contaminants in drinking water represents a major challenge in safeguarding human health. However, conventional technologies such as adsorption and oxidation are often limited due to limited adsorption capacity, poor regeneration, and low degradation efficiency. Accordingly, the present disclosure provides composite materials formed via a process based on commercial charcoals and a metal oxide and methods of utilizing the improved composites.

The composites and methods of the present disclosure provide several advantages compared to alternatives known in the art. First, as an adsorbent, composites of the present disclosure offer not only rapid adsorption rate but also high adsorption capacity for contaminants which may be due to the modified pore size distribution and formation of the high-capacity ink-bottle-shaped pores.

Second, as a photocatalyst, composites of the present disclosure display superior photocatalytic activity compared to neat nanotubes, owing to the carbonaceous support-mediated electron transfer and enhanced generation of ROS. The composites of the present disclosure are capable of performing over a broad pH range and at high ionic strength and also display resistance to organic fouling. The degradation may regenerate the composites and allow for use in multiple operations.

Third, a two-step adsorption/photodegradation-regeneration may concentrate hydrophobic micro-pollutants like phenanthrene from large volumes of polluted water onto a small amount of composite. This property may allow for efficient photodegradation of contaminants compared to that known in the art.

The following numbered embodiments are contemplated and are non-limiting:

1. A composite comprising a carbonaceous support and a metallic nanotube conjugated with a carbonaceous support.
2. The composite of clause 1, wherein the carbonaceous support comprises charcoal.
3. The composite of clause 2, wherein the charcoal is activated charcoal, powder activated charcoal, activated carbon fibers, biochar, or a mixture thereof.
4. The composite of any of the preceding clauses, wherein the composite comprises at least 5% of a metal.
5. The composite of any of the preceding clauses, wherein the composite comprises less than 80% carbon.
6. The composite of clause 4 or clause 5, wherein the metal comprises titanium.
7. The composite of any one of clauses 4 to 6, wherein the metal comprises a dopant.
8. The composite of clause 7, wherein the dopant is iron, cobalt, or nickel.
9. The composite material of any of the preceding clauses, wherein the composite has XRD peaks at 2θ of about 24°, about 28°, about 48°, and about 62°.
10. The composite material of any of the preceding clauses, wherein the composite has XRD peaks at about 26°, about 43°, or both.
11. The composite of any of the preceding clauses, wherein the composite has an XRD peak at about 9.5° or about 10°.
12. The composite of any of the preceding clauses, wherein the composite has an IR spectra comprising peaks at about 900 and about 500 cm−1.
13. The composite of any of the preceding clauses, wherein the carbonaceous support comprises a plurality of pores.
14. The composite of clause 13, wherein each pore of the plurality of pores has a diameter of about 2 nm to about 50 nm.
15. The composite material of any of the preceding clauses, wherein the composite has a BET surface area of at least 275 $m^2/g$.
16. The composite of clause 15, wherein the BET surface area is less than about 570 $m^2/g$.
17. The composite of clause 15 or clause 16, wherein the BET surface area is less than about 680 $m^2/g$.
18. The composite material of any of the preceding clauses, wherein the metallic nanotube has an inner diameter of about 2 nm to about 10 nm.
19. The composite material of any of the preceding clauses, wherein the metallic nanotube comprises a first metal and a second metal.
20. The composite material of clause 19, wherein the first metal and the second metal are in a mass ratio of at least about 2:1.
21. The composite material of clause 19 or clause 20, wherein the first metal is titanium.
22. The composite material of any one of clauses 19 to 21, wherein the second metal is sodium.
23. The composite material of any one of clauses 19 to 22, wherein the first metal and the second metal are in a mass ratio of at least about 3:1.
24. The composite material of clause 23, wherein the first metal is titanium.
25. The composite material of clause 23 or clause 24, wherein the second metal is sodium.
26. The composite material of any of the preceding clauses, wherein the carbonaceous support and the metallic nanotube are in a mass ratio of about 4:1 to about 0.5:1.
27. The composite material of any of the preceding clauses, wherein the carbonaceous support comprises a plurality of pores, each having a diameter that is generally larger than a diameter of the metallic nanotube.

28. The composite material of any of the preceding clauses, wherein the metallic nanotubes are arranged in multiple layers on the carbonaceous support.

29. The composite material of clause 28, wherein composite material comprises at least 3 layers of metallic nanotubes.

30. The composite material of any of the preceding clauses, wherein the metallic nanotubes comprise carbon.

31. The composite material of clause 30, wherein the carbon is in the form of a partial coating of microscale carbonaceous support on the metallic nanotube.

32. The composite material of any of the preceding clauses, wherein the metallic nanotubes comprise tubular walls.

33. The composite material of clause 32, wherein the tubular walls comprise the metal and carbon.

34. A method of removing one or more contaminants from water, the method comprising the step of contacting a composite according to any one of clauses 1 to 33 with contaminated water to form a composite-contaminant complex.

35. The method of clause 34, wherein the contaminant is a hydrocarbon or a heavy metal.

36. The method of clause 35, wherein the hydrocarbon is selected from the group consisting of aromatic hydrocarbons, polyaromatic hydrocarbons, alkyl hydrocarbons, and halogenated hydrocarbons.

37. The method of clause 35, wherein the heavy metal is lead or uranium.

38. The method of any one of clauses 34 to 37, comprising regenerating the composite.

39. The method of clause 38, wherein the step of regenerating comprises degrading the contaminant.

40. The method of clause 38 or clause 39, wherein the degrading is carried out by exposing the composite-contaminant complex to light.

41. The method of clause 40, wherein composite produces radicals in response to being exposed to light.

42. The method of clause 41, wherein the radicals comprise hydroxyl radicals.

43. The method of any one of clauses 40 to 42, wherein at least 75%, at least 85%, at least 90%, or at least 95% of the contaminant is degraded within about four hours.

44. The method of any one of clauses 40 to 42, wherein at least 75%, at least 85%, at least 90%, or at least 95% of the contaminant is degraded within about two hours.

45. The method of any one of clauses 40 to 42, wherein at least 75%, at least 85%, at least 90%, or at least 95% of the contaminant is degraded within about one hour.

46. The method of any one of clauses 40 to 42, wherein the composite has a binding capacity of at least 2 mg contaminant per gram of composite.

47. The method of any one of clauses 34 to 46, wherein the composite has a binding capacity of at least 4 mg contaminant per gram of composite.

48. The method of any one of clauses 34 to 46, wherein the composite has a binding capacity of at least 10 mg contaminant per gram of composite.

49. The method of any one of clauses 34 to 46, wherein the composite has a binding capacity of at least 100 mg contaminant per gram of composite.

50. The method of any one of clauses 34 to 46, wherein the composite has a binding capacity of at least 200 mg contaminant per gram of composite.

51. The method of any one of clauses 34 to 46, wherein the composite has a binding capacity of at least 500 mg contaminant per gram of composite.

52. The method of any one of clauses 34 to 46, wherein the pH of the contaminated water is selected from a range of about 2 to about 12.

53. The method of any one of clauses 34 to 52, wherein the contaminated water comprises dissolved organic matter.

54. The method of any one of clauses 34 to 52, wherein the composite is not fouled by the dissolved organic matter.

55. The method of any one of clauses 34 to 52, wherein the step of contacting is performed for about 2 minutes to about 48 hours.

56. A method of forming a composite comprising the step of combining a carbonaceous support with a metal oxide in an alkaline solution to form a composite, wherein the alkaline solution comprises a base.

57. The method of clause 56, wherein the metal oxide comprises titanium.

58. The method of clause 57, wherein the metal oxide comprises $TiO_2$ or organo-titanium compounds.

59. The method of any one of clauses 56 to 58, wherein the base comprises sodium hydroxide.

60. The method of any one of clauses 56 to 59, wherein the concentration of the base in the alkaline solution is at least about 8 M.

61. The method of any one of clauses 56 to 60, wherein the step of combining is performed for at least about 3 hours, at least about 4 hours, at least about 6 hours, at least about 8 hours, or at least about 10 hours.

62. The method of clause 61, wherein the step of combining is performed for about 12 hours.

63. The method of clause anyone of clauses 56 to 62, comprising the step of heating the carbonaceous support and the metallic salt.

64. The method of clause 63, wherein the step of heating is performed at a temperature of at least about 120° C., at least about 150° C., or at least about 180° C.

65. The method of clause 63 or clause 64, wherein the step of heating is performed at about 130° C.

66. The method of any one of clauses 63 to 65, wherein the step of heating is performed for at least 3 hours, at least 6 hours, at least 12 hours, at least 24 hours, at least 36 hours, at least 48 hours, or at least 60 hours.

67. The method of any one of clauses 63 to 66, wherein the step of heating is performed for about 72 hours.

68. The method of any one of clauses 56 to 67, comprising washing the composite with water or methanol.

69. The method of any one of clauses 56 to 68, comprising drying the composite.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A shows a conceptualized representation of the bottle-filling mechanism and transition from adsorption to capillary condensation for carbon modified TNTs. FIG. 1B shows a schematic of a two-step adsorption-photodegradation process for complete destruction of phenanthrene by TNTs@AC.

FIG. 2A shows SEM images of AC. FIGS. 2B and 2C show SEM images of TNTs@AC. FIG. 2D shows EDS spectra of AC. FIG. 2E shows EDS spectra of TNTs@AC.

FIGS. 3A-3C refer to adsorption kinetics. FIG. 3A shows adsorption kinetics of phenanthrene by AC, AC-treated, neat TNTs, and TNTs@AC. FIG. 3B shows adsorption isotherms of phenanthrene by AC, AC-treated, neat TNTs and TNTs@AC.

FIG. 3C shows a detailed adsorption isotherm of phenanthrene with broader concentration range.

FIGS. 4A and 4B show TEM of TNTs@AC. FIGS. 4C and 4D show HRTEM of single TNTs. FIG. 4E shows EDS line spectra of TNTs walls.

Figure 8A:
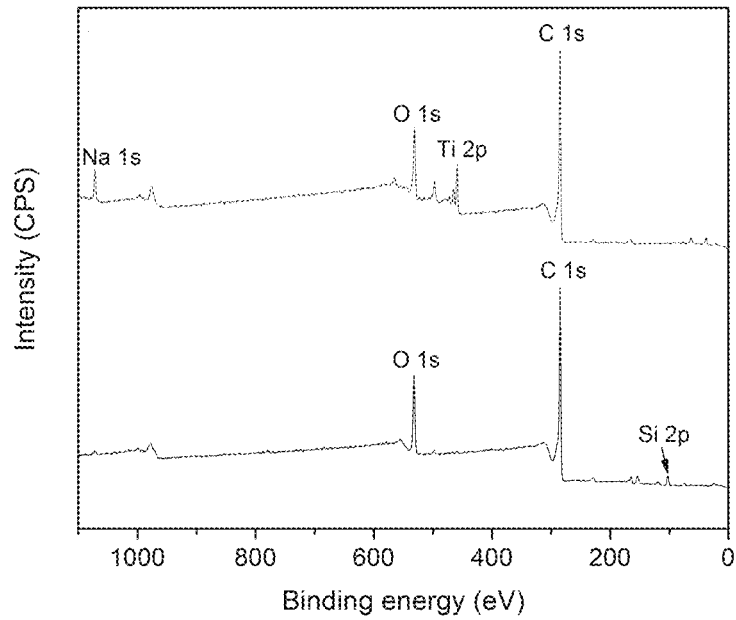
Figure 8B:
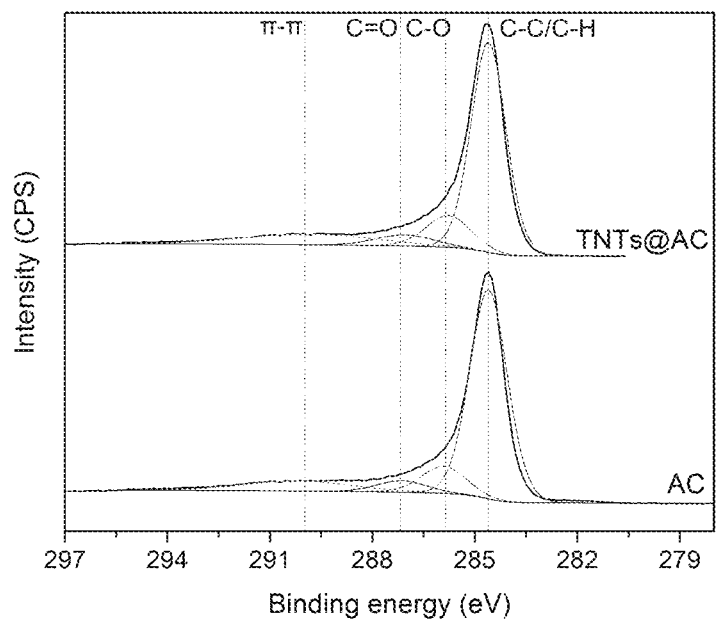
Figure 8C:
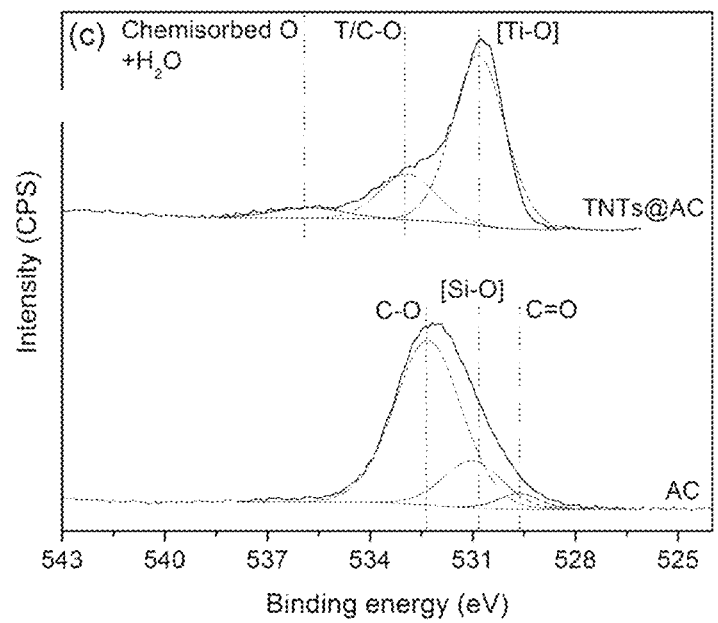

FIGS. 8A-8C show XPS spectra of AC and TNTs@AC. FIG. 8A shows survey XPS. FIG. 8B shows high resolution of C 1s. FIG. 8C shows high resolution of O 1s.

Figure 9:
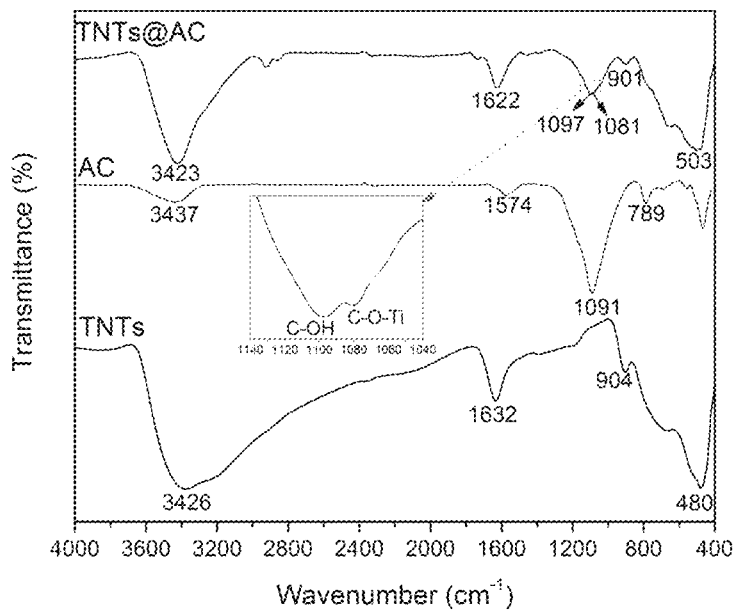

FIG. 9 shows FTIR spectra of AC and TNTs-AC.

Figure 10A:
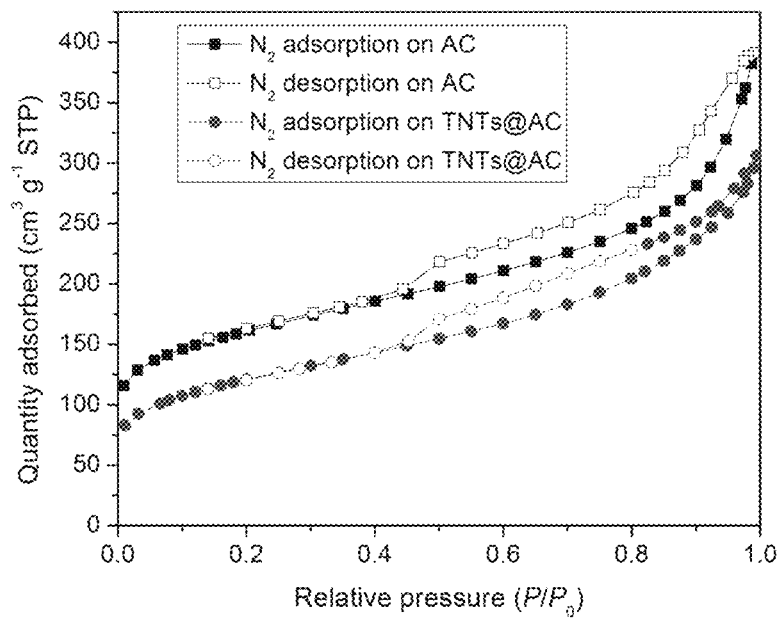
Figure 10B:
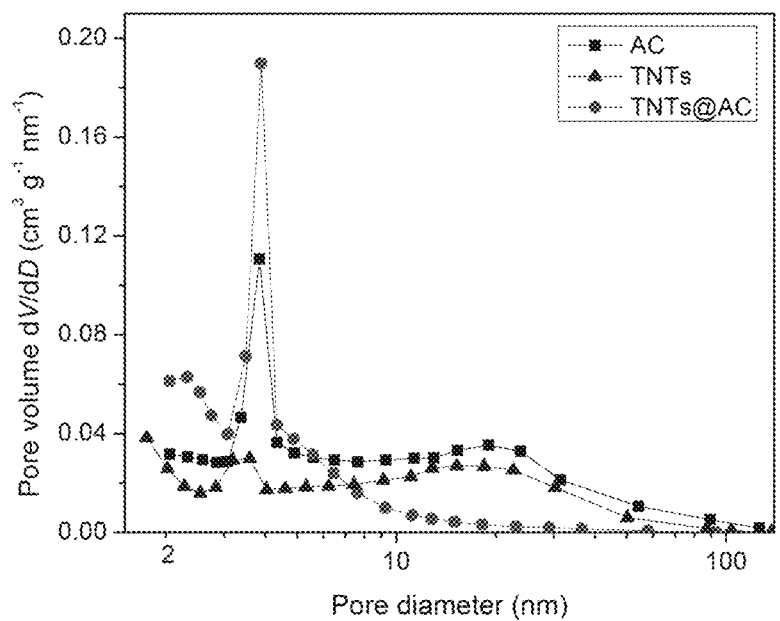

FIG. 10A shows $N_2$ adsorption-desorption isotherms and FIG. 10B shows pore size distributions of various materials.

Figure 11:
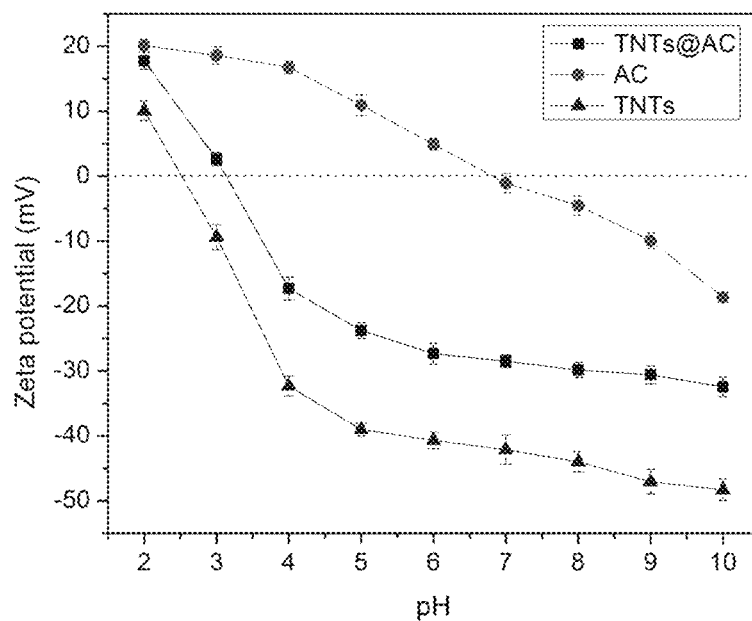

FIG. 11 shows Zeta potentials of different materials as a function of pH.

Figure 12A:
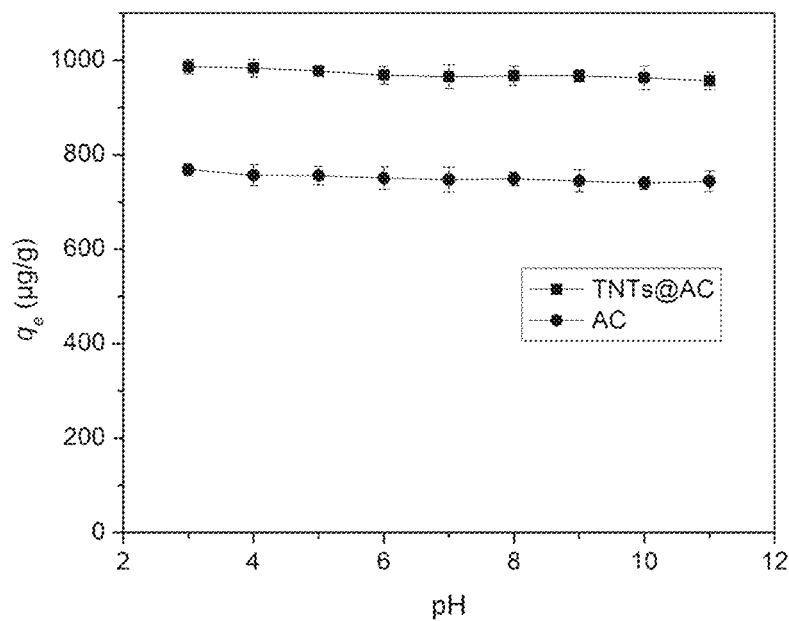
Figure 12B:
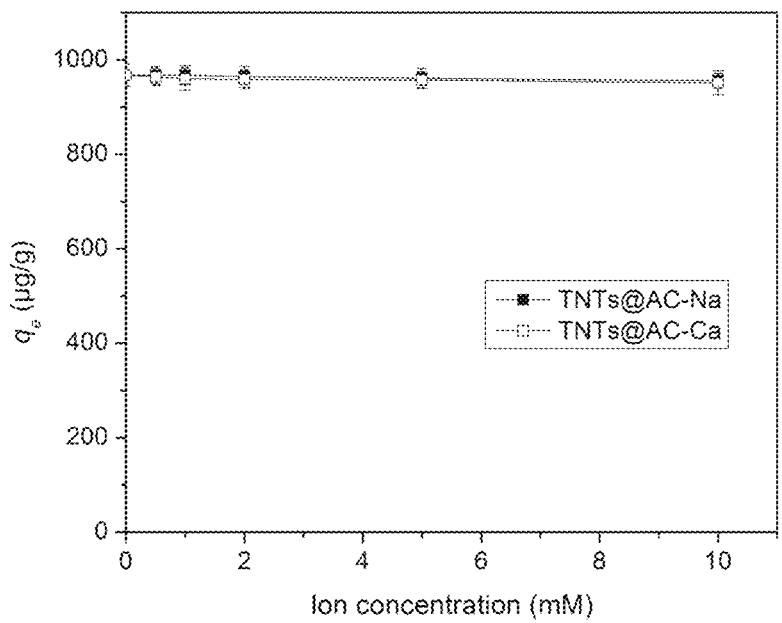
Figure 12C:
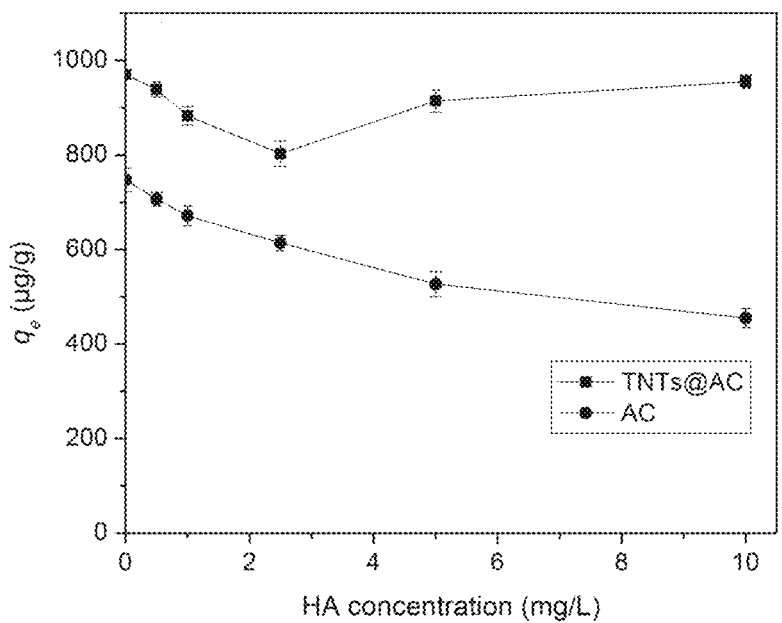

FIG. 12A shows the effect of pH on equilibrium uptake of phenanthrene by TNTs@AC. FIG. 12B shows the effects of ionic strength on equilibrium uptake of phenanthrene by TNTs@ AC. FIG. 12C shows the effect of HA on equilibrium uptake of phenanthrene by TNTs@ AC.

Figure 13:
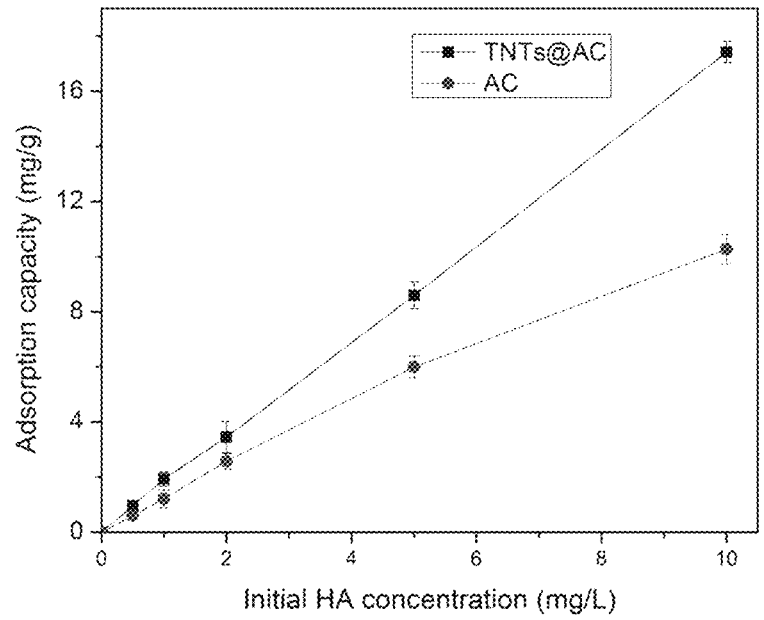

FIG. 13 shows the adsorption of HA by AC and TNTs@AC at different HA initial concentrations.

Figure 14A:
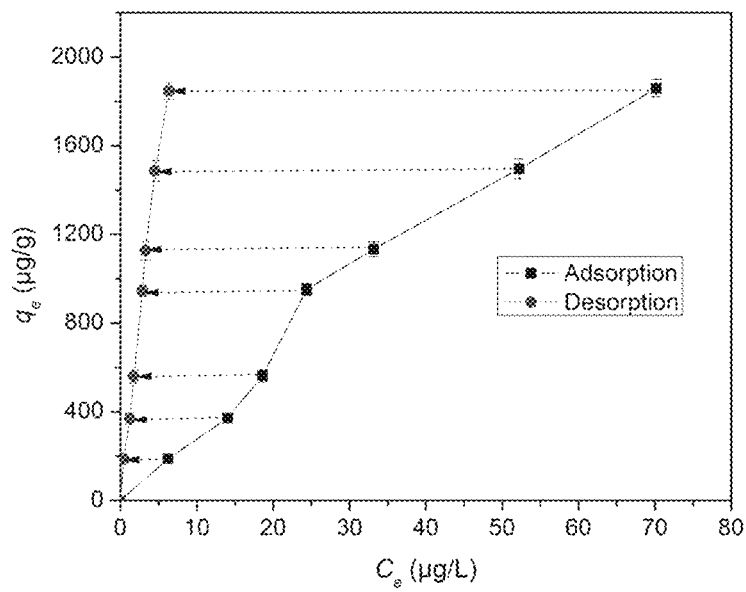
Figure 14B:
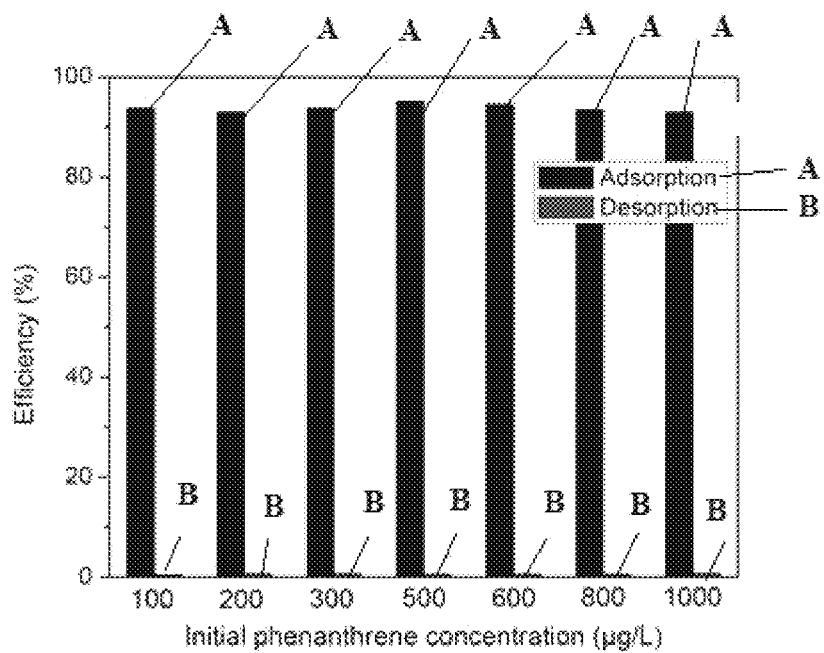

FIG. 14A shows the adsorption and desorption isotherms of phenanthrene with TNTs@AC. (Lines with arrows indicate the corresponding points from the sorption isotherm to desorption isotherm points). FIG. 14B shows the percent removal of phenanthrene by TNTs@ AC in the adsorption process and desorption percentile.

Figure 15A:
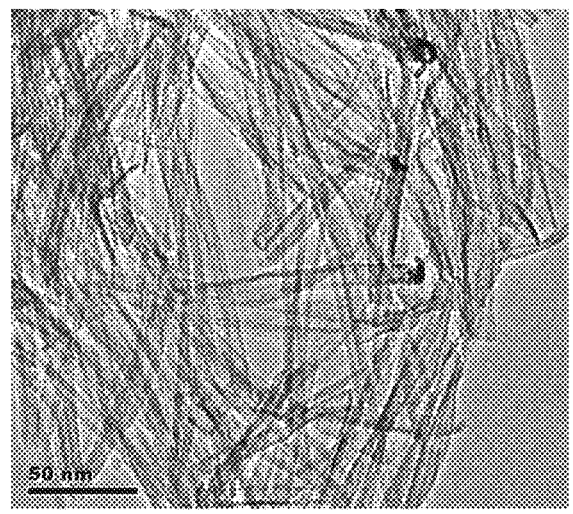
Figure 15B:
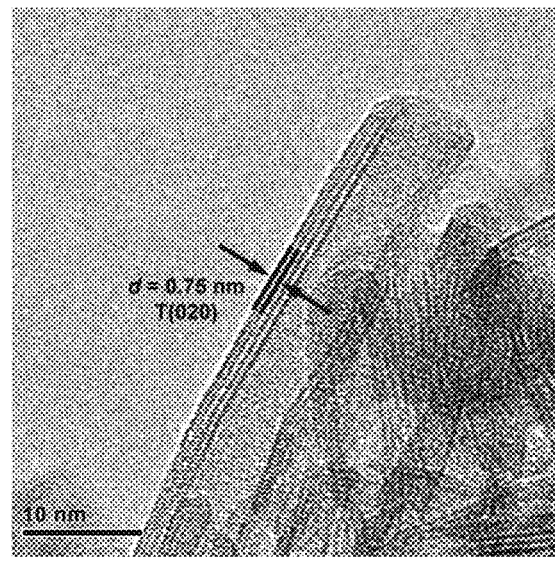

FIG. 15A shows TEM of neat TNTs and FIG. 15B shows HRTEM of neat TNTs.

Figure 16:
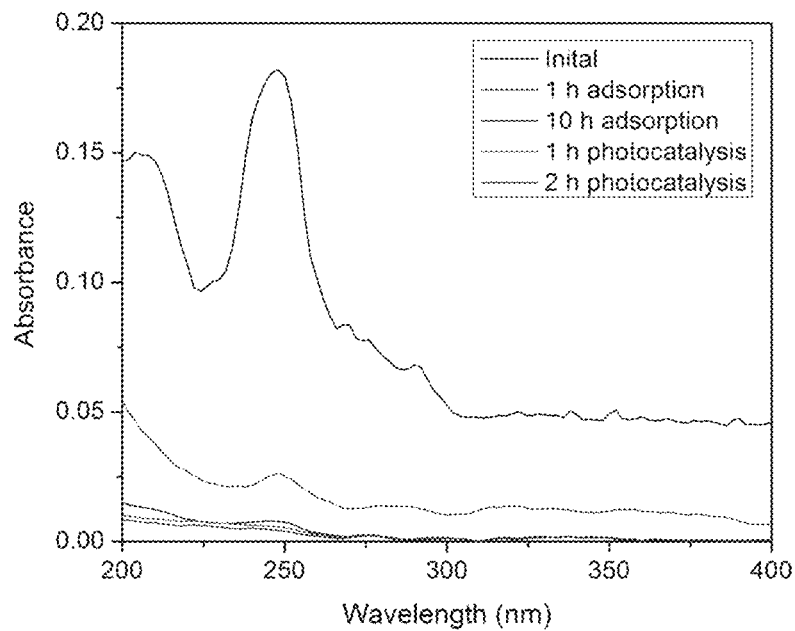

FIG. 16 shows UV-vis spectra of phenanthrene solution (500 µg/L) during adsorption and photocatalysis with TNTs@AC.

Figure 17:
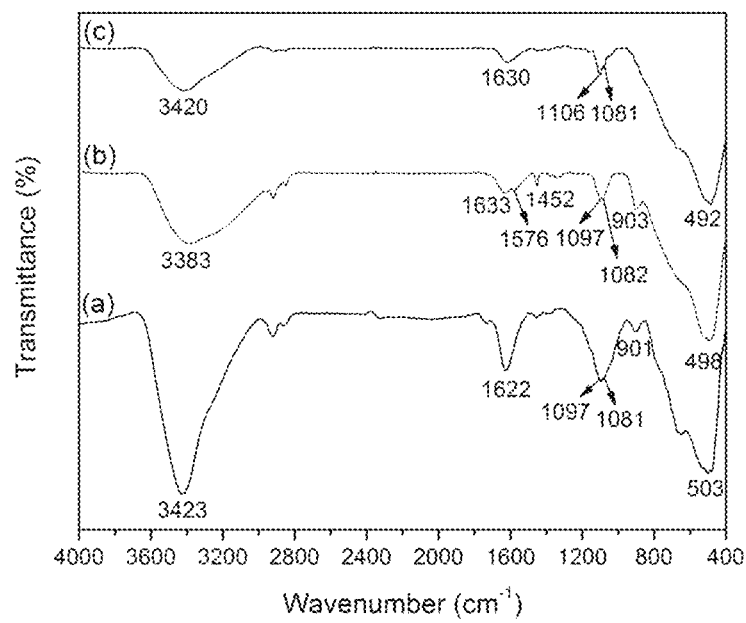

FIG. 17 shows FTIR spectra of (a) neat TNTs@AC, TNTs@AC (b) before and (c) after photo-degradation.

Figure 18:
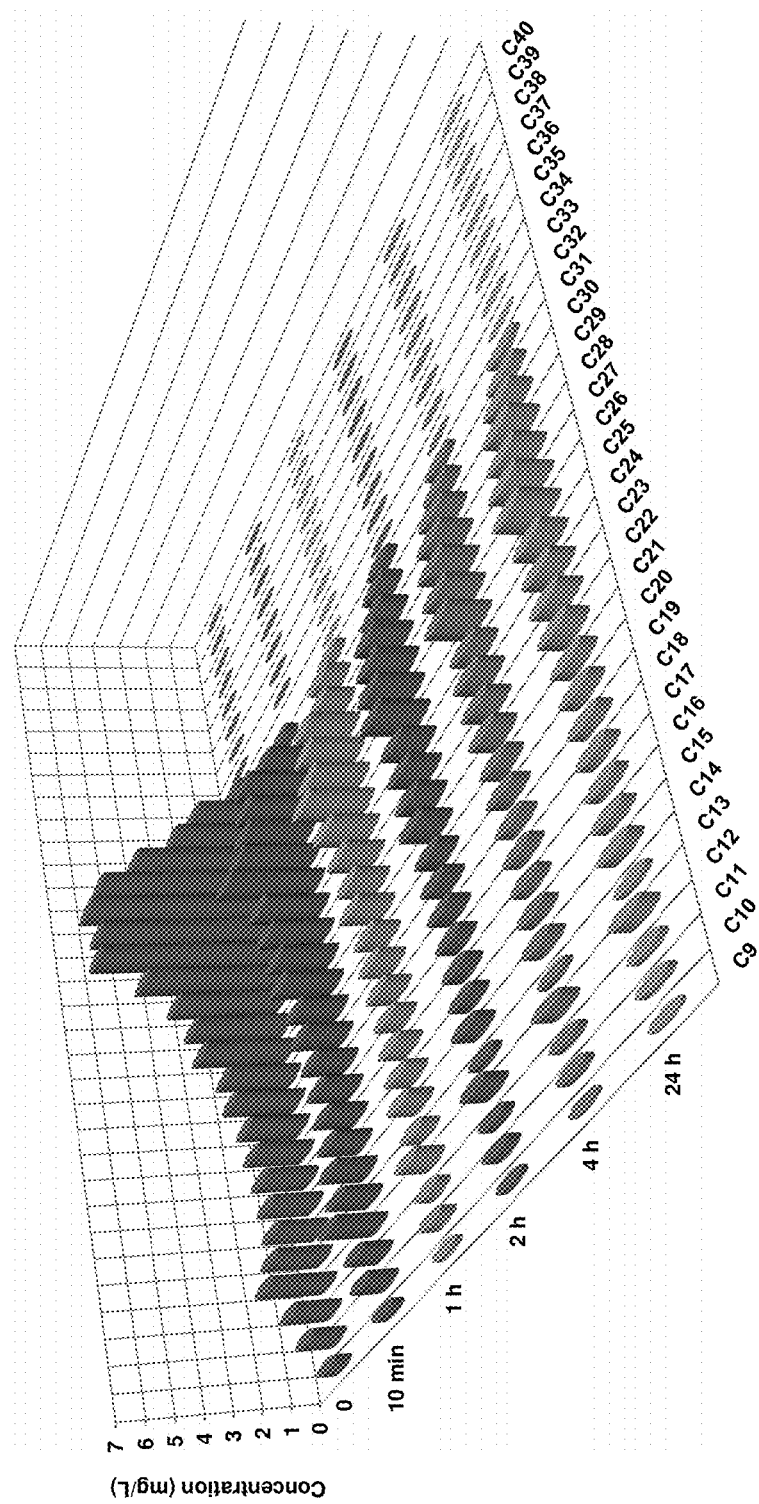

FIG. 18 shows the distribution of n-alkanes in the aqueous phase during the adsorption process at a material dosage of 0.625 g/L.

Figure 19:
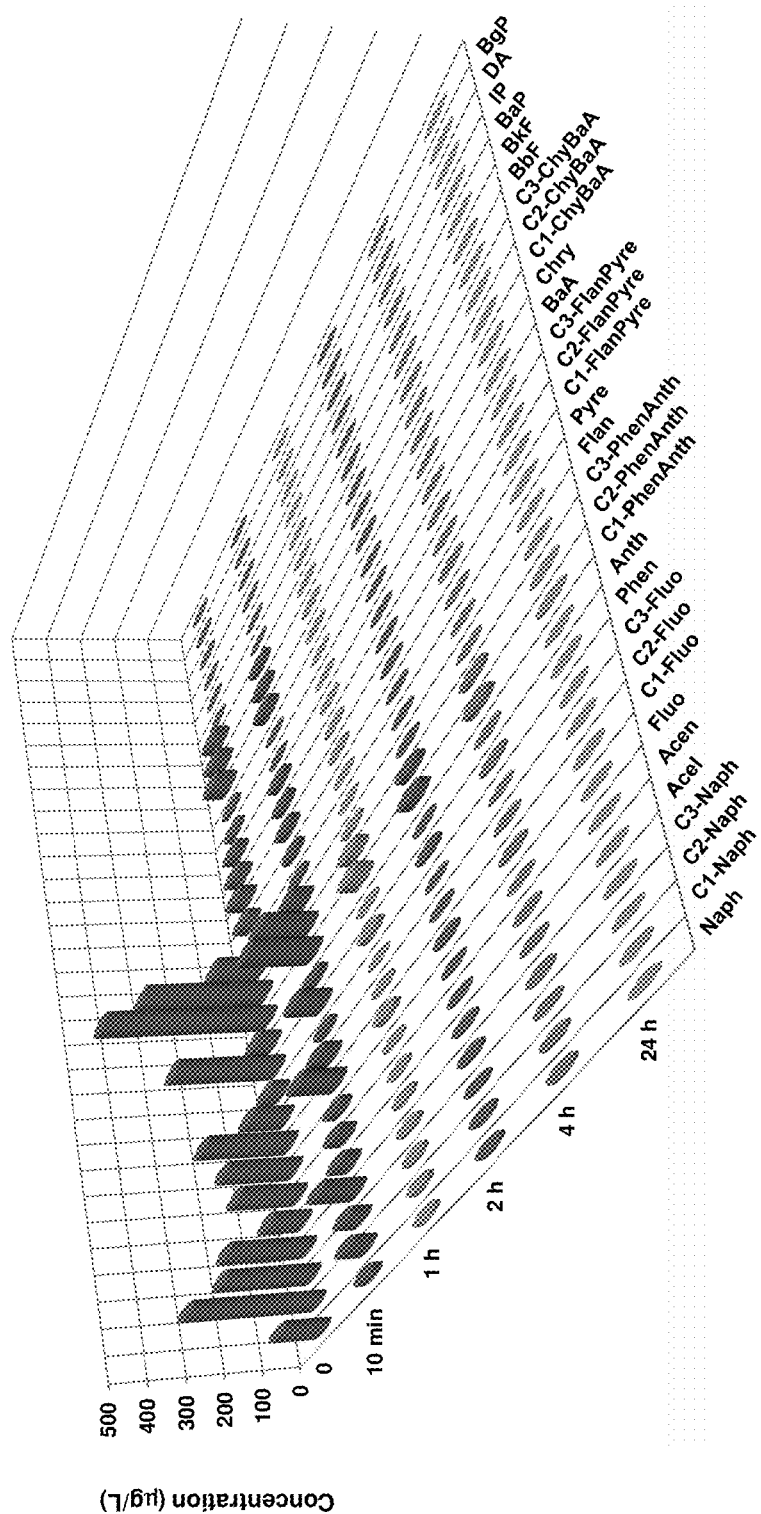

FIG. 19 shows the distribution of PAHs during the adsorption at a material dosage of 0.625 g/L.

Figure 20A:
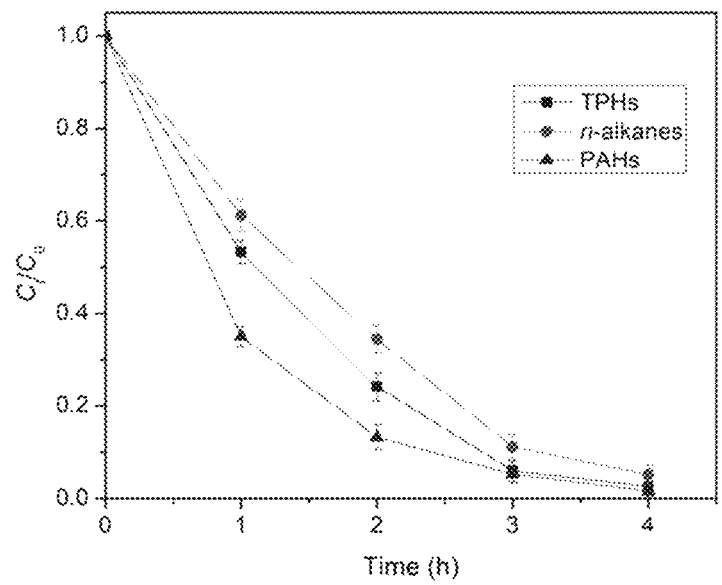
Figure 20B:
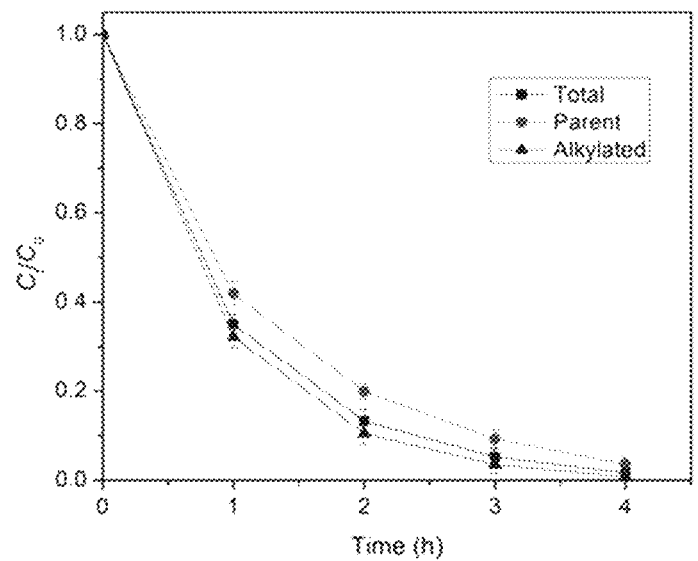

FIG. 20A shows the photodegradation of various oil components. FIG. 20B shows various PAHs pre-concentrated on TNTs@AC.

Figure 21:
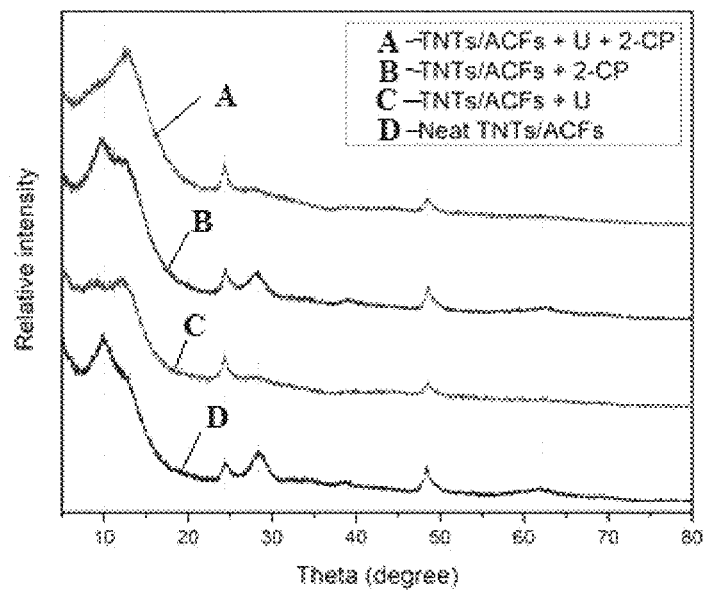

FIG. 21 shows the XRD patterns of TNTs@ACFs before and after adsorption of U(VI) or 2-CP.

Figure 22:
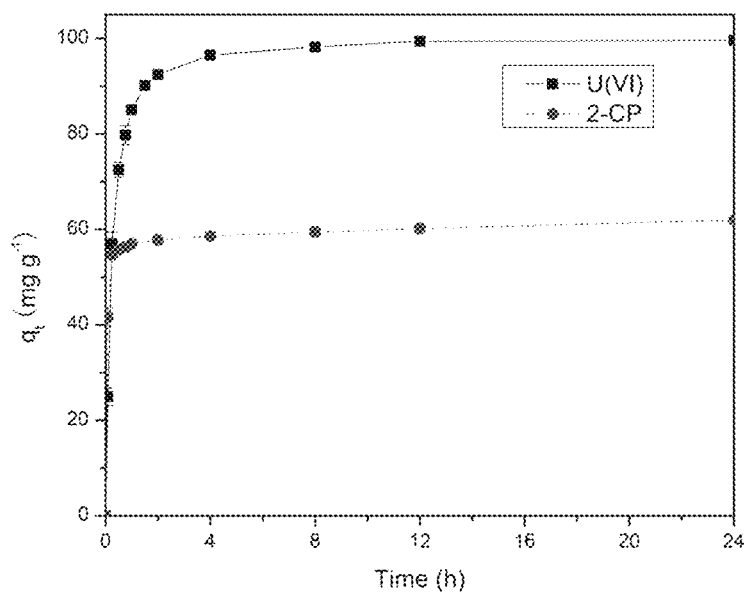

FIG. 22 shows adsorption kinetics of U(VI) or 2-CP by TNTs@ACFs.

Figure 23:
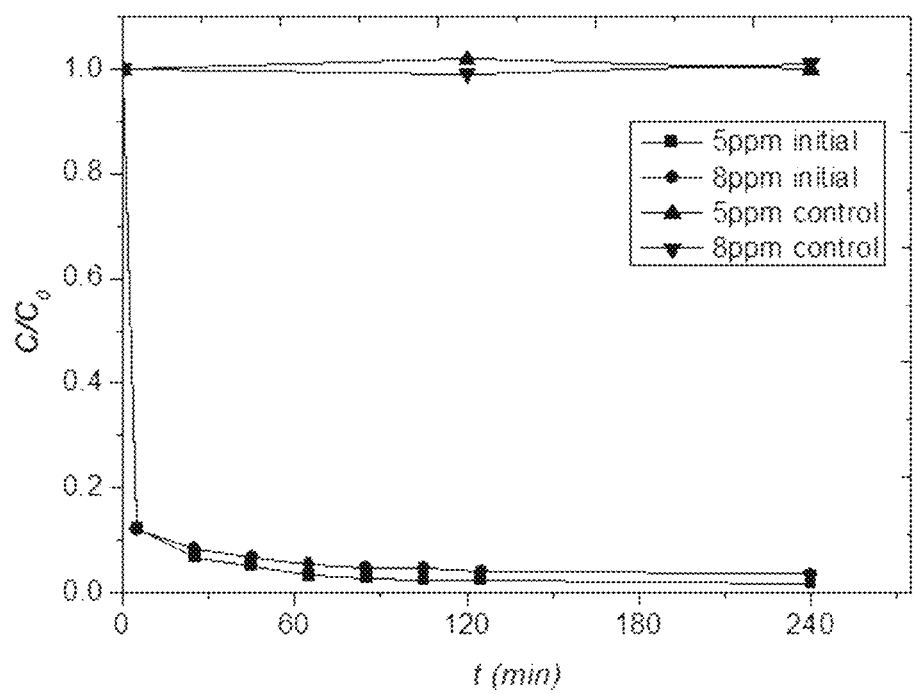

FIG. 23 shows adsorption kinetics of 4-CP by TNTs@AC.

Figure 24:
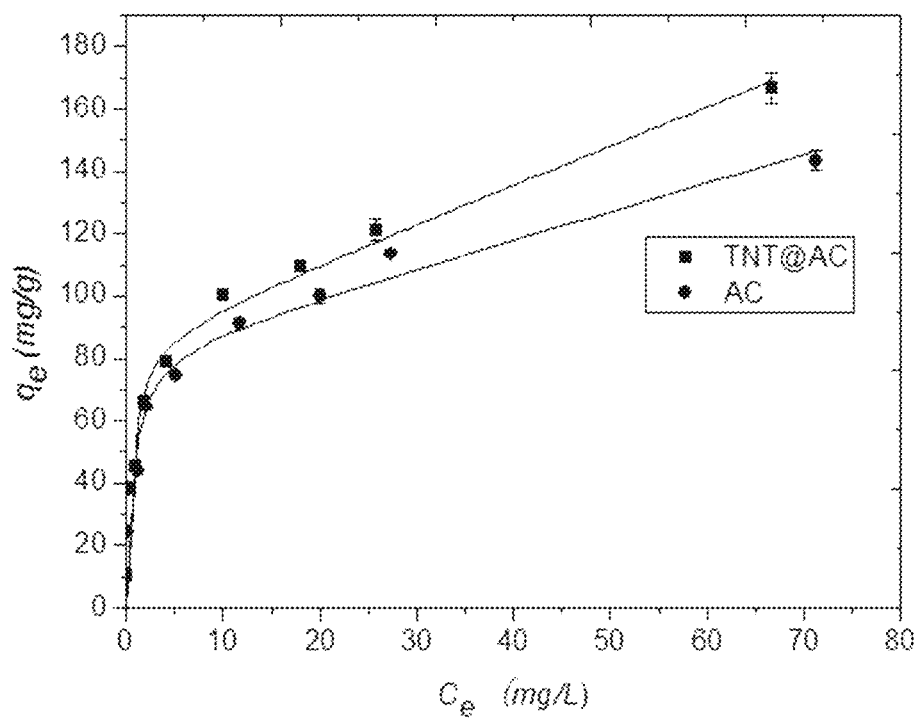

FIG. 24 shows a comparison of the adsorption isotherms of 4-CP by TNTs@AC and parent AC with the 4-CP initial concentration range of 2-100 mg/L.

Figure 25:
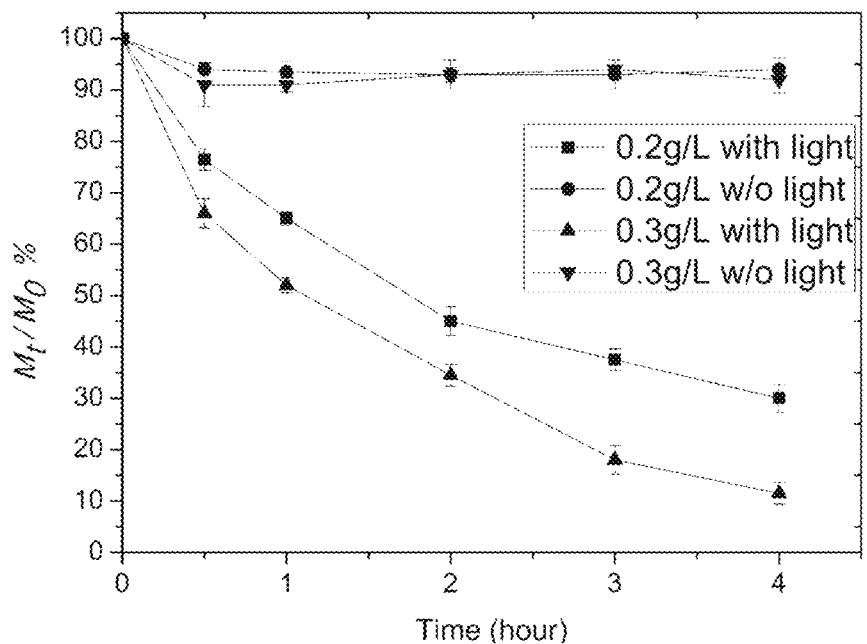

FIG. 25 shows the photodegradation of 4-CP on TNTs@AC under UV irradiation.

Figure 26:
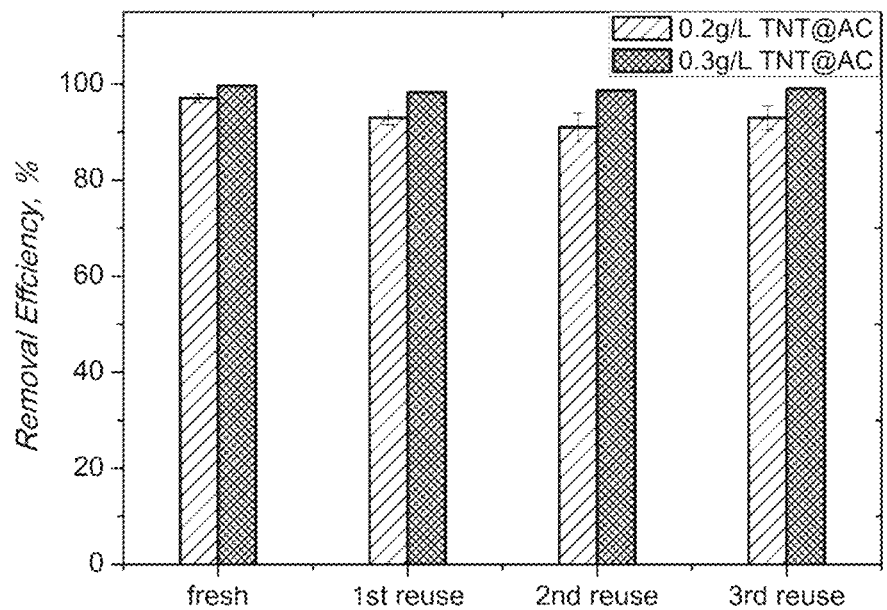

FIG. 26 shows the performance after cycles of reuse.

Figure 27:
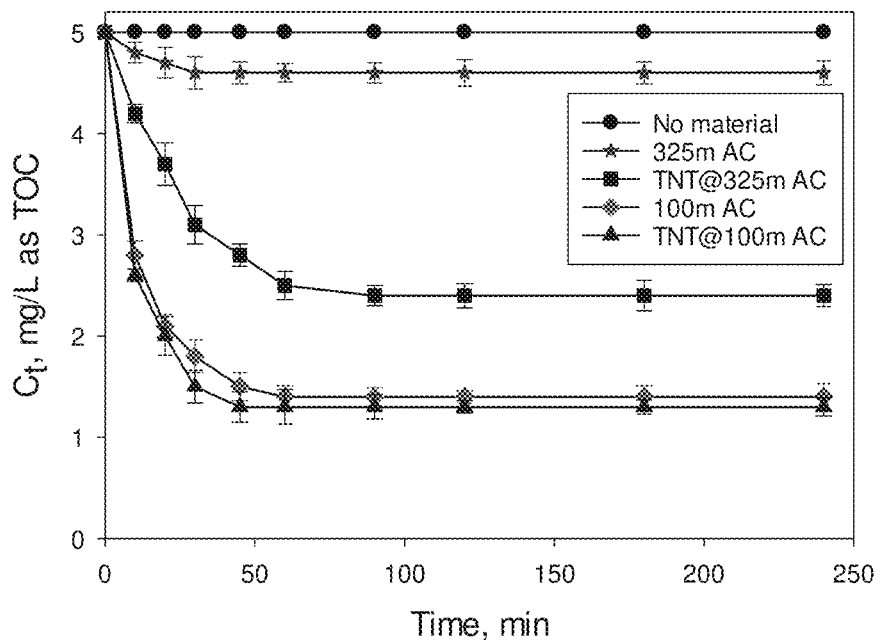

FIG. 27 shows adsorption kinetics of DOM by 2 kinds of TNTs@AC.

Figure 28:
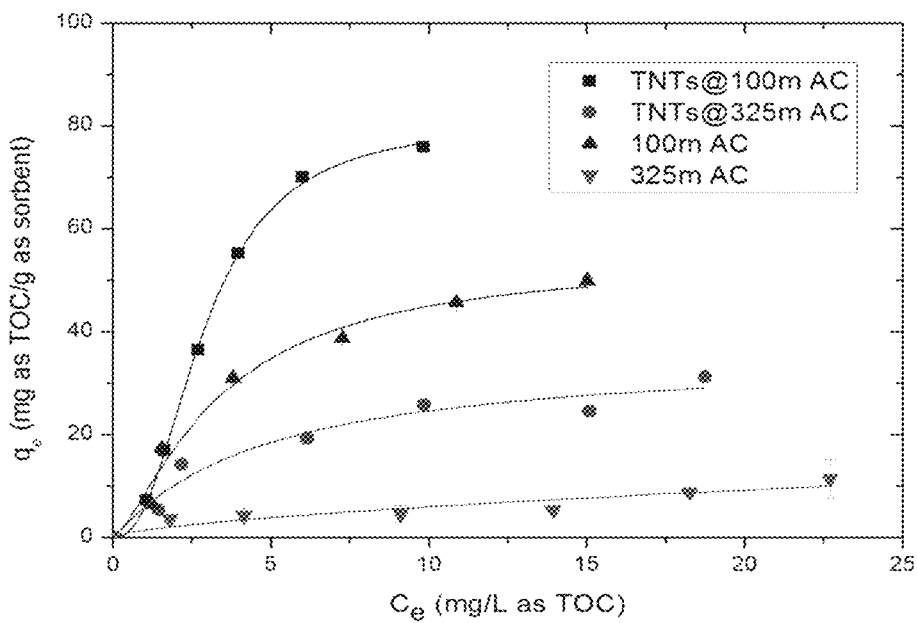

FIG. 28 shows a comparison of the adsorption isotherms of DOM by 2 kinds of TNTs@AC and their parent AC, as well as hydrothermal treated AC, with the DOM initial concentration range of 1-25 mg/L as TOC.

Figure 29:
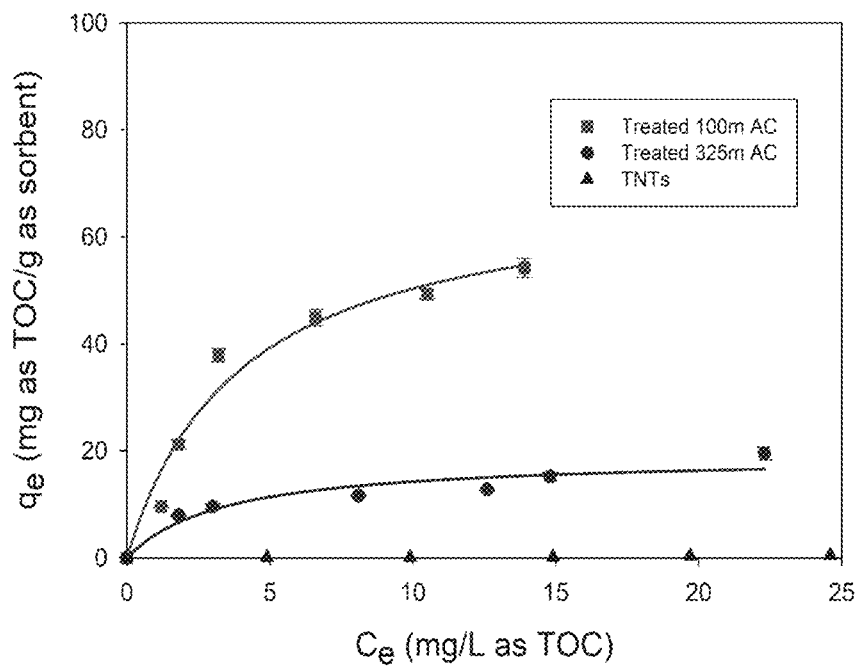

FIG. 29 shows DOM adsorption isotherm by hydrothermal treated AC and TNTs.

Figure 30:
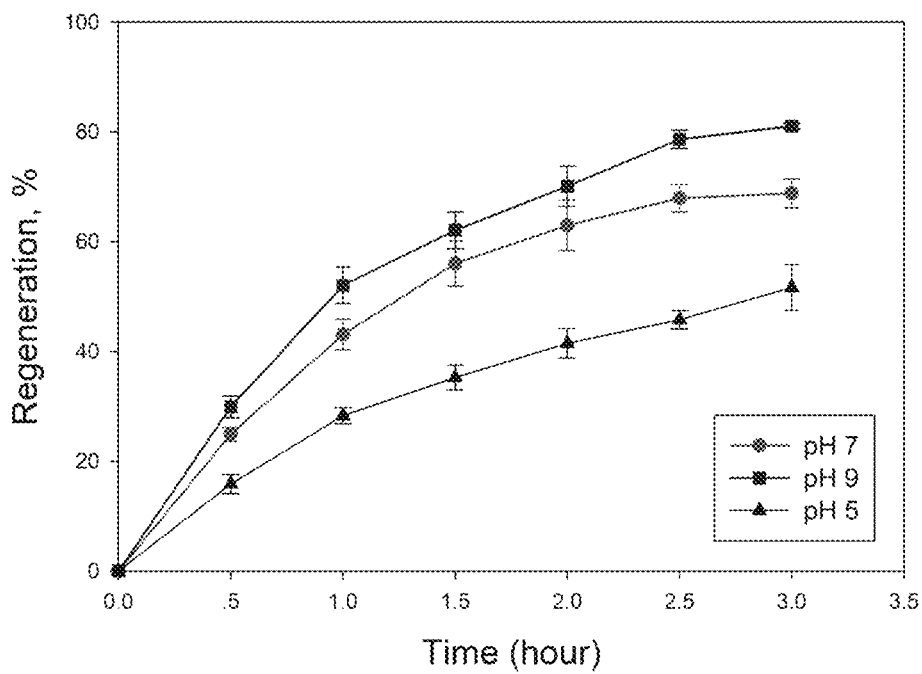

FIG. 30 shows photoregeneration of DOM by TNTs@AC.

Figure 31:
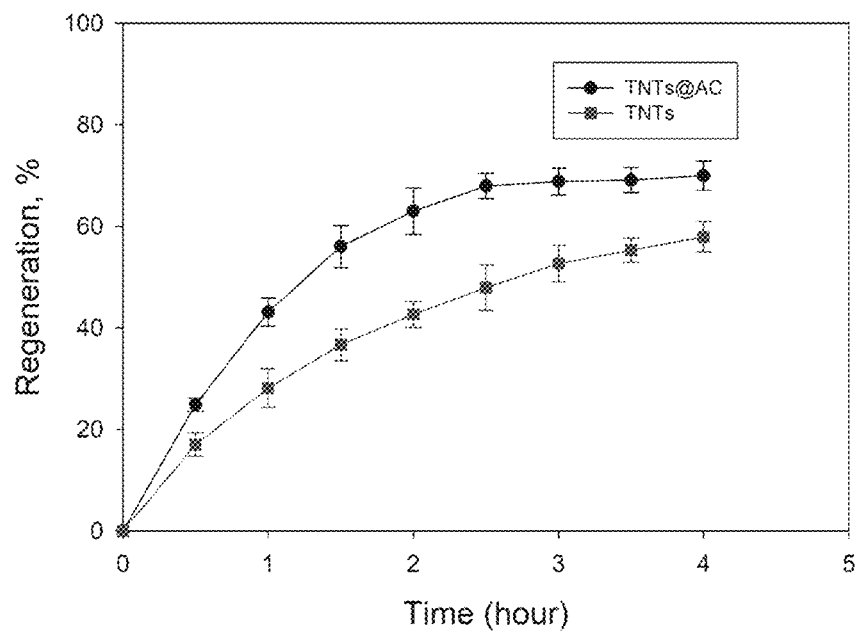

FIG. 31 shows photoregeneration of DOM by TNTs@AC and TNTs.

Figure 32:
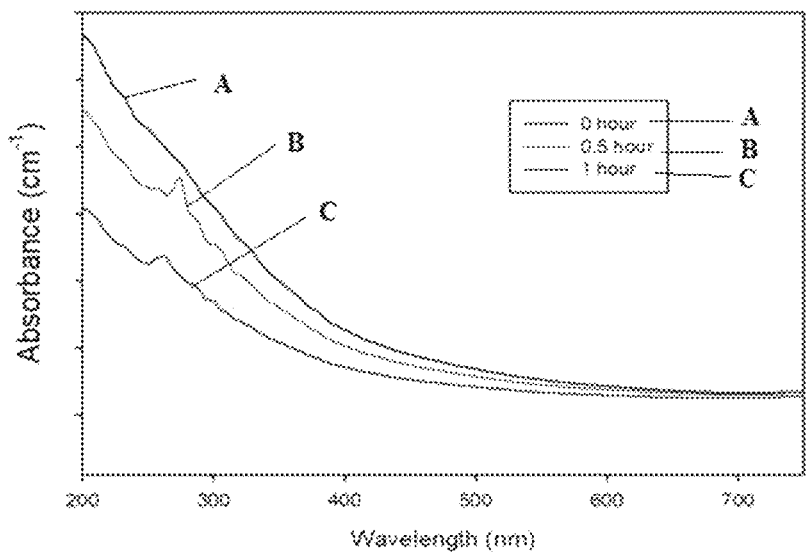

FIG. 32 shows UV-vis spectra of extracted DOM from TNTs@AC during photoregeneration.

Figure 33:
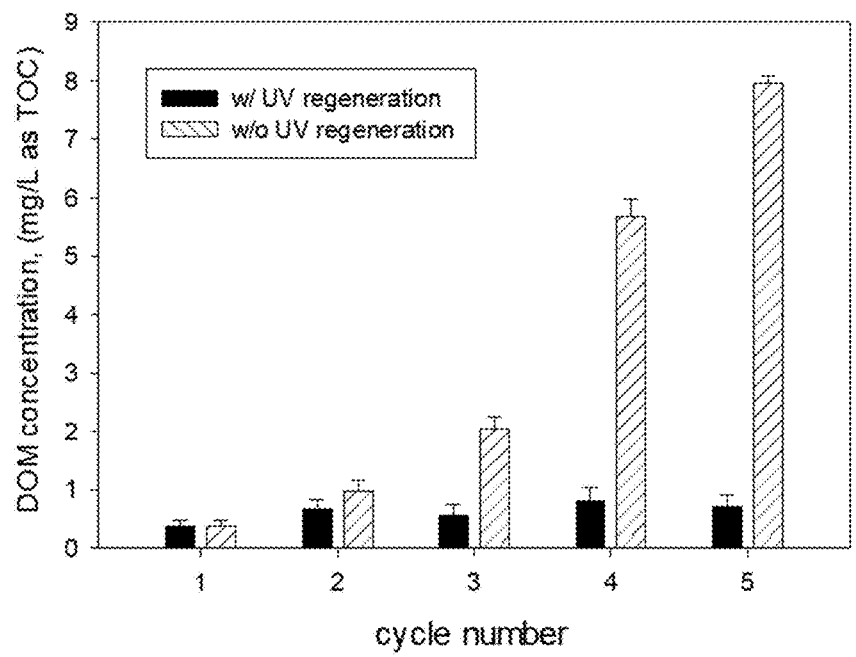

FIG. 33 shows the reuse-ability of TNTs@AC.

Figure 34A:
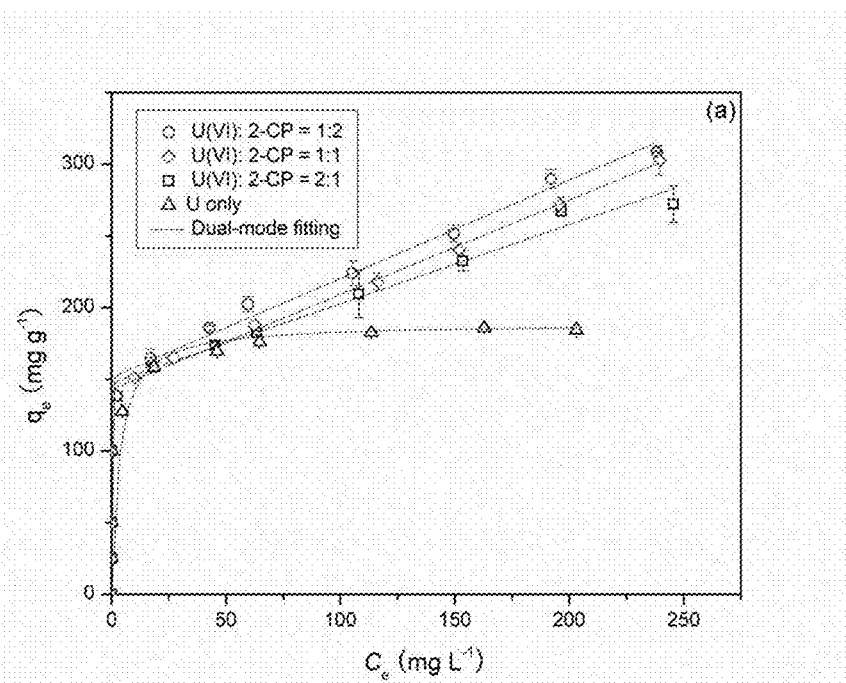
Figure 34B:
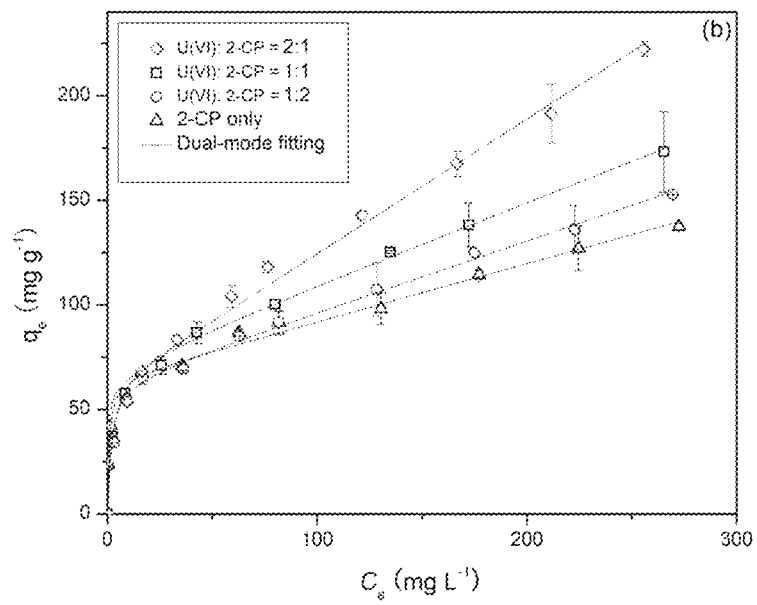

FIGS. 34A and 34B show U(VI) and 2-CP binding in binary systems or alone.

Figure 35:
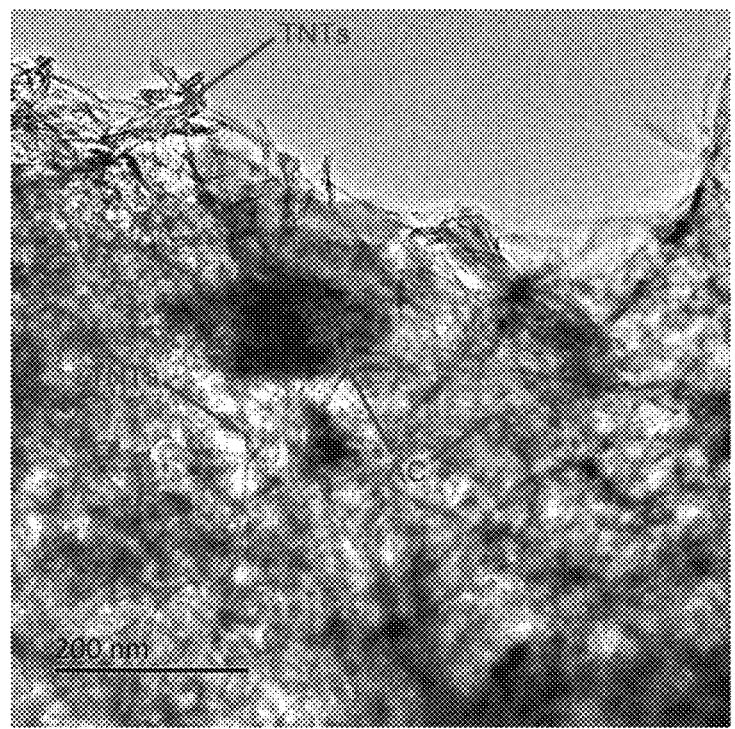

FIG. 35 shows a TEM image of TNTs@PAC.

Figure 36:
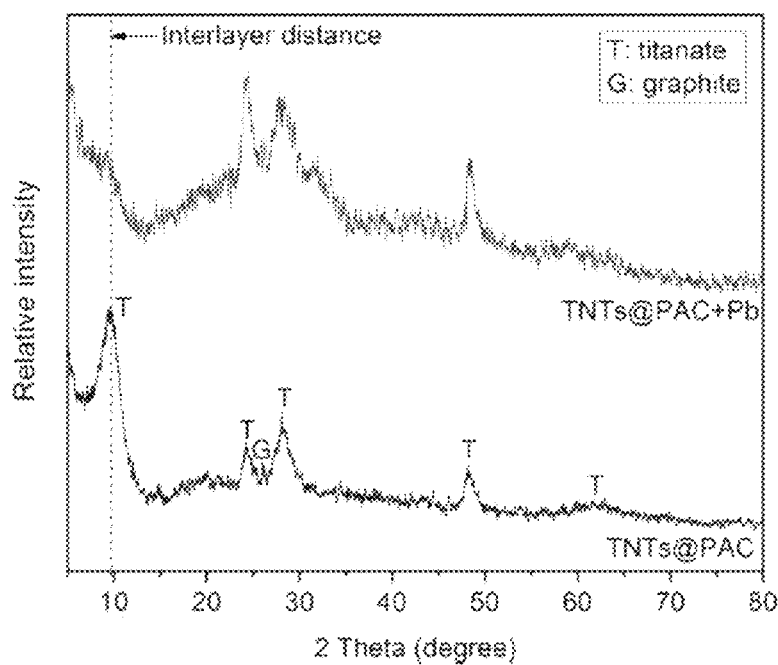

FIG. 36 shows the XRD patterns of TNTs@PAC before and after Pb(II) adsorption.

Figure 37A:
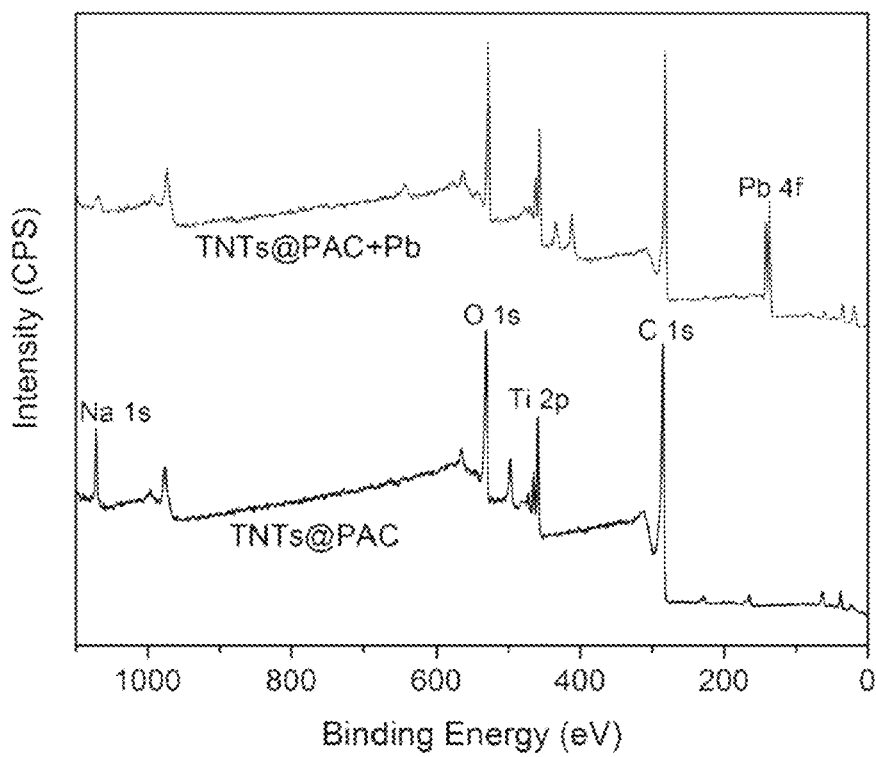
Figure 37B:
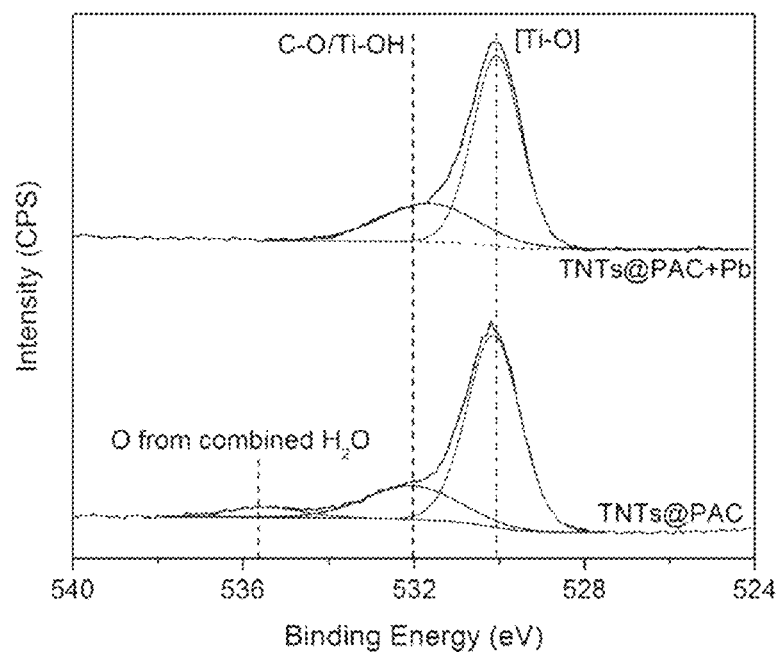
Figure 37C:
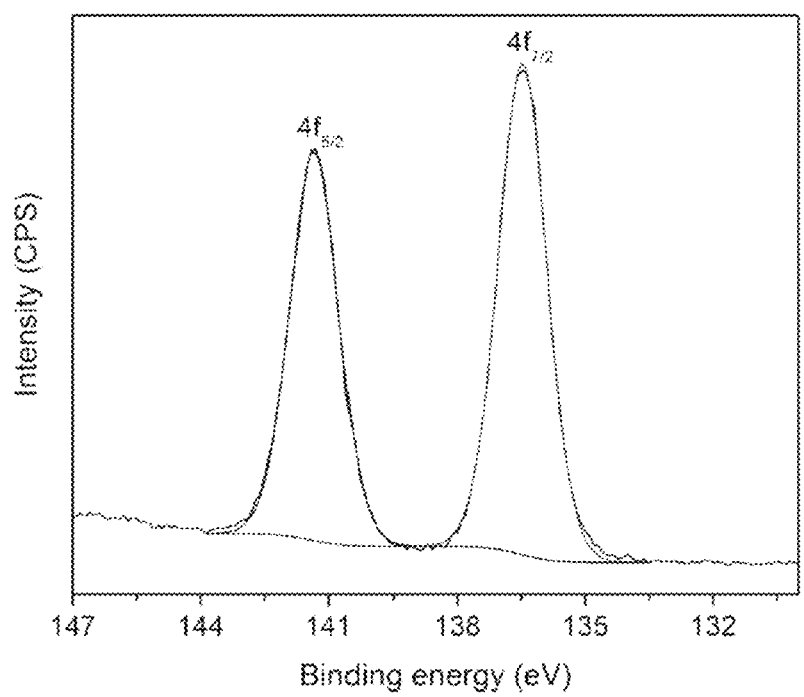

FIG. 37A shows survey XPS Spectra. FIG. 37B shows high-resolution spectra of O 1s. FIG. 37C shows high-resolution spectra of Pb 4f.

Figure 38:
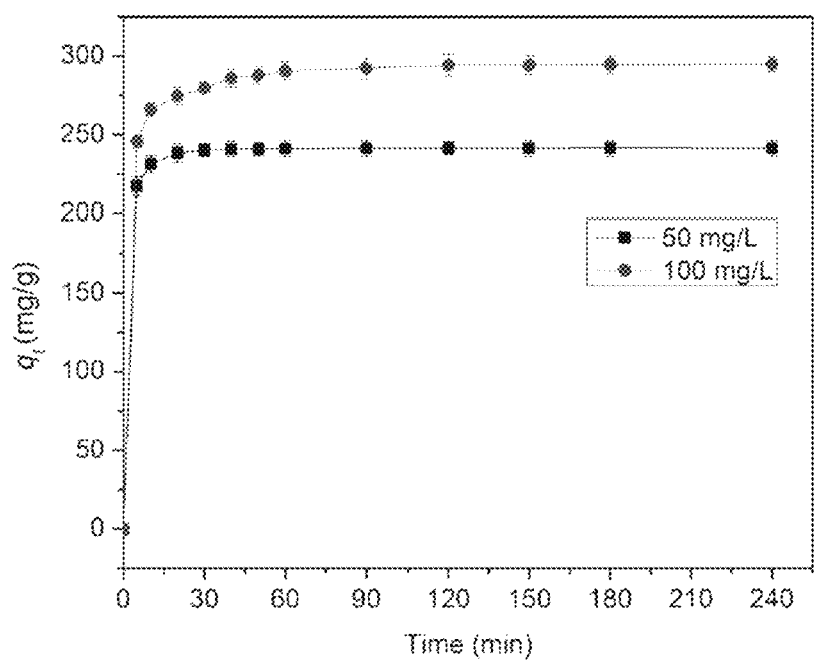

FIG. 38 shows adsorption kinetics of different concentrations of Pb(II) by TNTs@PAC.

Figure 39:
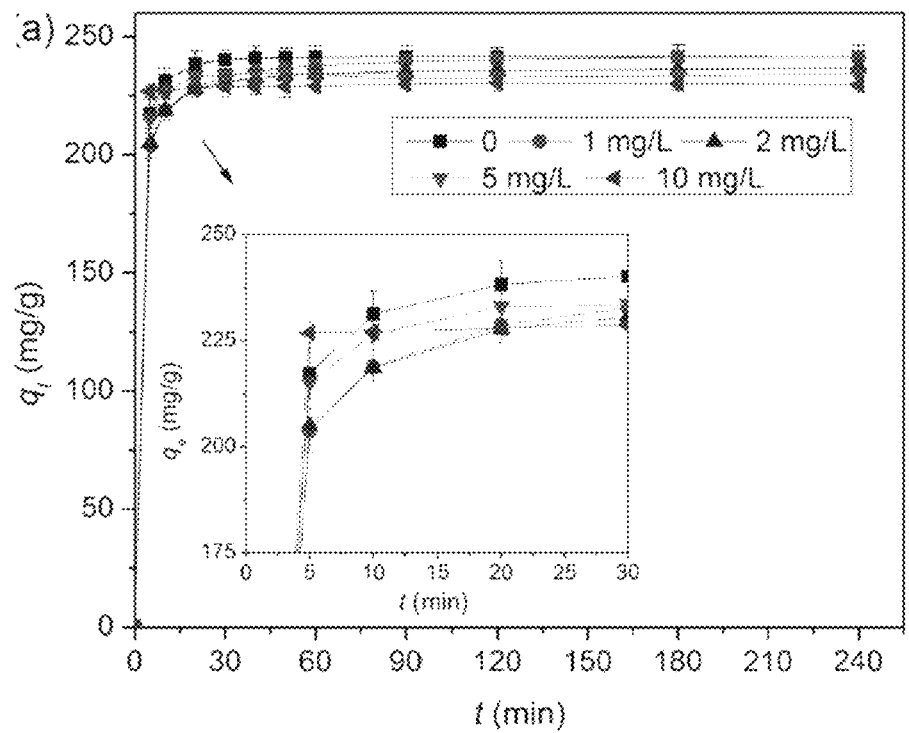

FIG. 39 shows the effect of HA on adsorption of Pb(II) by TNTs@PAC.

Figure 40:
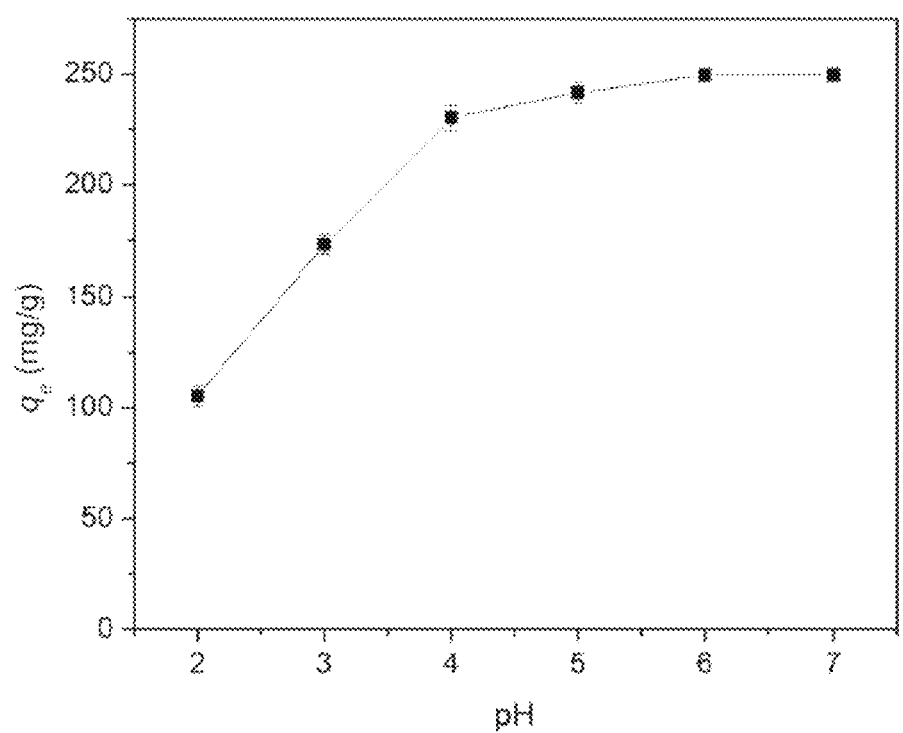

FIG. 40 shows the effect of pH on the adsorption of Pb(II) by TNTs@PAC.

DETAILED DESCRIPTION

Various embodiments of the invention are described herein as follows. In one embodiment described herein, a composite is provided. The composite comprises a carbonaceous support and a metallic nanotube conjugated with a carbonaceous support.

In another embodiment, a method of removing one or more contaminants from water is provided. The method comprises the step of contacting a composite with a contaminant to form a composite-contaminant complex.

In yet another embodiment, a method of forming a composite is provided. The method comprises the step of combining a carbonaceous support with a metal oxide in an alkaline solution to form a composite, wherein the alkaline solution comprises a base.

In the various embodiments, the composite material comprises a carbonaceous support and a metallic nanotube. Illustratively, the metallic nanotube is conjugated to the carbonaceous support. In some embodiments, the composite material may be used to bind contaminants in contaminated water. In some embodiments, the composite material may be used to degrade the bound contaminants. Exemplary methods for forming a composite are also described.

As used herein, a carbonaceous support refers to a material that comprises carbon. In some embodiments, the carbonaceous support comprises charcoal. In other embodiments, the charcoal is activated charcoal, powder activated charcoal, activated carbon fibers, biochar, or a mixture thereof.

In some aspects, the composite comprises a particular weight percentage of carbon. In some embodiments, the composite comprises less than about 90% carbon, less than about 85% carbon, less than about 80% carbon, or less than about 75% weight percentage of carbon. In some embodiments, the percentage carbon of the composite may be about 40%, about 50%, about 55%, about 60%, about 65%, about 70%, about 75%, or about 80% weight percentage of carbon. In some embodiments, the composite comprises about 40% to about 80% carbon, about 50% to about 80% carbon, about 60% to about 80% carbon, or about 50% to about 70% weight percentage of carbon.

In some aspects, the composite comprises a particular atomic percentage of a metal. In some embodiments, the composite comprises at least 1%, at least 3%, at least 5%, or at least 7% atomic percentage of a metal. In some embodiments, the composite comprises about 1%, about 1.5%, about 2%, about 3%, about 4%, about 5%, about 6%, about 7%, about 8%, about 9%, about 10%, about 12%, or about 15% atomic percentage of a metal. In some embodiments, the composite comprises about 1% to about 15%, about 1% to about 5%, about 2% to about 15%, about 2% to about 12%, about 4% to about 12%, or about 5% to about 10% atomic percentage of a metal. In some embodiments, the metal is titanium. In some embodiments, the metal is sodium. In some embodiments, the composite comprises titanium and sodium and each is a particular atomic percentage of the composite.

In some embodiments, the metallic nanotube may be described by the formula $M^1_xH_{2-x}M^2_yO_z$, where $M^1$ and $M^2$ are each a metal, and x, y, and z are integers. In some embodiments, $M^1$ may be sodium. In some embodiments, $M^2$ is titanium. In some embodiments, x may be absent, about 0.2, about 0.5, about 0.7, about 0.8, about 0.9, about 1, about 1.1, about 1.2, about 1.3, about 1.4, about 1.5, about 1.6, about 1.7, about 1.8, about 1.9, or about 2. In some embodiments, x may be about 0.5 to about 2, about 0.5 to about 1.7, about 0.5 to about 1, or about 1.2 to about 1.7. In some embodiments, y may be about 1, about 2, about 3, about 4, or about 5. In some embodiments, y may be about 1 to 5, about 1 to 4, or about 2 to 4. In some embodiments, z may be about 3, about 5, about 6, about 7, about 8, about 9, or about 10. In some embodiments, z may be about 3 to about 10, about 5 to about 10, or about 6 to about 9. In some embodiments, x is 0.7, y is 7, and z is 3. In some embodiments, x is 1.5, y is 7, and z is 3.

Illustratively, the carbonaceous support and the metallic nanotube have a particular mass ratio. In some embodiments, the mass ratio of the carbonaceous support to the metallic nanotube may be about 0.3:1, about 0.4:1, about 0.5:1, about 0.7:1, about 1:1, about 1.5:1, about 1.7:1, about 2:1, about 2.5:1, about 3:1, about 3.5:1, about 4:1, about 4.5:1 or about 5:1. In some embodiments, the mass ratio of the carbonaceous support may be about 0.3:1 to about 5:1, about 0.5:1 to about 5:1, about 0.5:1 to about 4:1, about 0.5:1 to about 3:1, or about 0.5:1 to about 2:1. In some embodiments, the mass ratio is about 1.7:1. In some embodiments, the mass ratio may be about 0.8:1.

Illustratively, the composite has a $pH_{pzc}$ corresponding to the solution pH where the composite does not have a charge. In some embodiments, the $pH_{pzc}$ may be at least about 2.8 or at least about 3. In some embodiments, the $pH_{pzc}$ may be less than about 7.5, less than about 7, or less than about 6.5. In some embodiments, the $pH_{pzc}$ may be about 2.8, about 2.9, about 3, about 3.1, about 3.2, about 3.3, about 3.4, about 3.5, or about 4. In some embodiments, the $pH_{pzc}$ may be about 2.8 to about 4, about 2.8 to about 3.5, or about 2.9 to about 3.4.

Illustratively, the carbonaceous support comprises a plurality of pores. In some embodiments, the pores of the carbonaceous support each have a diameter. In some embodiments, the diameter of each pore is about 2 nm to about 50 nm. Illustratively, the pores of the carbonaceous material are narrower after forming the composite than before forming the composite. Without being bound by theory, some of the metallic nanotubes may extend from the pore walls into the pore to narrow the pore size.

Illustratively, the composite may have a pore volume that is less than the pore volume of the carbonaceous material alone. In some embodiments, the pore volume may be less than about 0.7 g/cm$^3$, less than about 0.65 g/cm$^3$, or less than about 0.6 g/cm$^3$. In some embodiments, the pore volume of the composite may be about 0.4 g/cm$^3$, about 0.45 g/cm$^3$, about 0.5 g/cm$^3$, about 0.55 g/cm$^3$, about 0.6 g/cm$^3$, about 0.65 g/cm$^3$, or about 0.7 g/cm$^3$. In some embodiments, the pore volume of the composite may be about 0.4 g/cm$^3$ to about 0.7 g/cm$^3$, about 0.4 g/cm$^3$ to about 0.65 g/cm$^3$, about 0.4 g/cm$^3$ to about 0.6 g/cm$^3$, or about 0.45 g/cm$^3$ to about 0.6 g/cm$^3$.

In some embodiments, the metallic nanotube comprises a first metal and a second metal. Illustratively, the first metal and the second metal may be in a mass ratio. In some embodiments, the mass ratio of the first metal and the second metal is at least about 0.5:1 at least about 1:1, at least about 1.5:1, at least about 2:1, at least about 3:1, at least about 4:1, or at least about 5:1. In some embodiments, the mass ratio of the first metal to the second metal is selected from a range of about 0.5:1 to about 5:1, about 0.5:1 to about 4:1, about 1:1 to about 4:1, or about 2:1 to about 4:1. In some embodiments, the first metal is titanium. In some embodiments, the second metal is sodium. In some embodiments, the second metal is a transition metal such as iron, cobalt, nickel, or copper.

In some embodiments, the metallic nanotube comprises a dopant. In some embodiments, the dopant may be a transition metal. In some embodiments, the transition is iron, cobalt, nickel, copper, or a mixture thereof. In some embodiments, the mass ratio of the first metal and the dopant is at least about least about 1:1, at least about 1.5:1, at least about 2:1, at least about 3:1, at least about 4:1, or at least about 5:1. In some embodiments, the mass ratio of the first metal to the dopant is selected from a range of about 1:1 to about 5:1, about 1:1 to about 4:1, or about 2:1 to about 4:1.

In some embodiments, the metallic nanotube comprises tubular walls. In some embodiments, the metallic nanotube has an inner diameter. Illustratively, the metallic nanotube has an inner diameter of about 1 nm, about 2 nm, about 3 nm, about 4 nm, about 5 nm, about 6 nm, about 7 nm, about 8 nm, about 9 nm, about 10 nm, or about 12 nm. In some embodiments, the metallic nanotube has an inner diameter of about 1 nm to about 12 nm, about 2 nm to about 12 nm, about 2 nm to about 10 nm, about 2 nm to about 8 nm, or about 3 nm to about 8 nm. In some embodiments, each pore of the carbonaceous support is generally larger than a diameter of the metallic nanotube. In some embodiments, the metallic nanotube comprises a bottleneck at one or both ends, as shown in FIG. 1. This bottleneck may be useful in retaining adsorbed contaminants.

In some embodiments, the composite comprises at least one layer of metallic nanotubes. In some embodiments, the composite may comprise 1, 2, 3, 4, or 5 layers of metallic nanotubes. In some embodiments, the composite comprises at least 1, at least 2, or at least 3 layers of metallic nanotubes. In some embodiments, the metallic nanotubes are arranged in multiple layers on the carbonaceous support.

In some embodiments, the metallic nanotube comprises carbon. Illustratively, the carbon may be derived from the carbonaceous support. In some embodiments, the carbon in the metallic nanotube is integral with the wall of the nanotube. In some embodiments, the carbon may be in the form of a partial coating of microscale carbonaceous support.

In some embodiments, the composite may have characteristic peaks as determined by x-ray diffraction (XRD). Illustratively, the composite may have an XRD peak at 2θ of about 9.5°, about 10°, about 24°, about 26°, about 28°, about 43°, about 48°, about 62°, or a combination thereof. In some embodiments, the composite may have XRD peaks at 2θ of about 24°, about 28°, about 48°, and about 62°. In some embodiments, the composite has XRD peaks at about 26°, about 43°, or both. In some embodiments, the composite has an XRD peak at about 9.5° or about 10°.

In one aspect, the composite may have a particular Brunauer, Emmett, and Teller (BET) surface area. In some embodiments, the BET surface area of the composite is less than the BET surface area of the carbonaceous support alone. In some embodiments, the BET surface area is at least about 275 $m^2/g$, at least about 350 $m^2/g$, at least about 400 $m^2/g$, or at least about 500 $m^2/g$. In some embodiments, the BET surface area is less than about 680 $m^2/g$ or less than about 575 $m^2/g$. In some embodiments, the BET surface area is about 300 $m^2/g$, about 350 $m^2/g$, about 400 $m^2/g$, about 450 $m^2/g$, about 470 $m^2/g$, about 500 $m^2/g$, about 550 $m^2/g$, about 600 $m^2/g$, about 650 $m^2/g$, about or about 700 $m^2/g$.

In some embodiments, the composite comprises characteristic infrared (IR) spectroscopy peaks. In some embodiments, the FTIR spectra comprises a peak at about 500 $cm^{-1}$, about 900 $cm^{-1}$, about 1081 $cm^{-1}$, about 1097 $cm^{-1}$, about 1630 $cm^{-1}$, about 3400 $cm^{-1}$, or a combination thereof. In some embodiments, the composite comprises FTIR peaks at about 500 $cm^{-1}$ and about 900 $cm^{-1}$.

In another aspect of the present invention, a method of removing one or more contaminants from water comprises using the composite described. The method may comprise the step of contacting the composite with contaminated water. The composite described herein may be used remove one or more contaminants. In some embodiments, the composite will bind the contaminant in the water and form a composite-contaminant complex.

As described herein, a contaminant may be hydrocarbons such as polycyclic aromatic hydrocarbons (PAH), petroleum hydrocarbons, alkyl hydrocarbons, or aromatic hydrocarbons, any of which may be halogenated. In addition, the contaminant may be pharmaceutical and personal care products, poly- or per-fluorinated chemicals, and other emerging persistent organic pollutants. In addition, contaminants can also include cationic heavy metals and radionuclides such as lead, copper, cadmium, mercury, nickel, cobalt, and uranium.

A non-limiting list of PAHs includes naphthalene (Naph), acenaphthylene (Acel), acenaphthene (Acen), fluorene (Fluo), phenanthrene (Phen), anthracene (Anth), fluoranthene (Flan), pyrene (Pyre), benzo(a)anthracene (BaA), Chrysene (Chry), benzo(b)fluoranthene (BbF), benzo(k)fluoranthene (BkF), benzo(a)pyrene (BaP), Indeno(1,2,3-cd) pyrene (IP), dibenzo(a,h)anthracene (DA), and benzo(g,hi)perylene (BgP). In addition, primary alkylated PAHs included alkylated-Naph, alkylated-Fluo, alkylated-Phen, alkylated-Anth, alkylated-Flan, and alkylated-Pyre.

A non-limiting list of alkyl hydrocarbons includes n-alkanes (C9-C40) including lower molecular weight hydrocarbons (LMWHs, C9-C20), medium molecular weight hydrocarbons (MMWHs, C21-C30) and higher molecular weight hydrocarbons (MMWHs, C31-C40).

Halogenated hydrocarbons include halogenated aromatic compounds and halogenated alkyls, alkenyls, or alkynyls. In some embodiments, the halogenated hydrocarbon is 2-chlorophenol (2-CP) or 4-chlorophenol (4-CP).

In one aspect, the composites described herein have a particular binding capacity. In some embodiments, the composite may bind at least about 2 mg, at least about 4 mg, at least about 10 mg, at least about 100 mg, at least about 200 mg, at least about 500 mg of contaminant per gram of composite. In some embodiments, the composite binds about 2 mg, about 5 mg, about 10 mg, about 15 mg, about 25 mg, about 50 mg, about 75 mg, about 100 mg, about 125 mg, about 150 mg, about 175 mg, about 200 mg, about 250 mg, about 300 mg, about 350 mg, about 400 mg, about 450 mg, about 500 mg, or about 600 mg of contaminant per gram of composite.

In some embodiments, the step of contacting is performed for about 2 minutes, about 5 minutes, about 10 minutes, about 15 minutes, about 30 minutes, about 1 hour, about 2 hours, about 3 hours, about 4 hours, about 6 hours, about 8 hours, about 10 hours, about 12 hours, about 16 hours, about 20 hours, about 24 hours, about 30 hours, about 36 hours, about 42 hours, or about 48 hours. In some embodiments, the step of contacting is performed for about 2 minutes to about 48 hours.

In one aspect of the present invention, during the step of contacting the composite will bind a particular percentage of the contaminant. In some embodiments, the composite binds at least 70%, at least 75%, at least 80%, or at least 85% of the contaminant during the step of contacting.

In some embodiments, the contaminated water may include dissolved material. In some embodiments, the dissolved material is dissolved organic matter (DOM) or natural organic matter (NOM). In some embodiments, the dissolved material may comprise a humic acid. In some embodiments, the composite binds minimal DOM or NOM. In some embodiments, the presence of NOM or DOM does not affect the capacity of the composite to bind the contaminant. In some embodiments, the composite is not fouled by DOM or NOM.

The contaminated water may have a particular pH. The pH of the contaminated water may be about 2, about 3, about 4, about 5, about 6, about 7, about 8, about 9, about 10, about 11, about 12, or about 13. Illustratively, the composite forms a complex with the contaminant when the contaminated water has a pH of about 2, about 3, about 4, about 5, about 6, about 7, about 8, about 9, about 10, about 11, about 12, or about 13. In some embodiments, the composite forms a complex with the contaminant when the contaminated water has a pH of about 2 to about 12, about 2 to about 10, or about 4 to about 10. In some embodiments, the pH of the contaminated water does not affect the binding capacity of the composite for the contaminant, for example, if the contaminant is an organic compound.

In some embodiments, the method of removing one or more contaminants may include a step of regenerating the composite. In some embodiments, the step of regenerating may include the step of degrading the contaminant. In some embodiments, the step of regenerating may include the step of washing the contaminant from the complex.

In one aspect of the present disclosure, the composite of the present invention may act as a photocatalyst. In some embodiments, the step of degrading may be carried out by exposing the composite-contaminant complex to light. Illustratively, in some embodiments, the composite may produce reactive oxygen species or radicals in response to being exposed to light. In some embodiments, the radicals may be hydroxyl radicals.

In some embodiments, the composite is capable of producing radicals when complexed with the contaminant. Illustratively, the produced radicals may act to degrade the contaminant. In some embodiments, the composite degrades the complexed contaminant in less than about 8 hours, less than about 6 hours, or less than about 5 hours. In some embodiments, at least 75%, at least 85%, at least 90%, or at least 95% of the complexed contaminant is degraded with about 4 hours. In some embodiments, at least 75%, at least 85%, at least 90%, or at least 95% of the complexed contaminant is degraded with about 2 hours. In some embodiments, at least 75%, at least 85%, at least 90%, or at least 95% of the complexed contaminant is degraded with about 1 hour.

In some embodiments, the step of regenerating may be performed by washing the composite-contaminant complex. In some embodiments, the step of washing includes a first wash with an acidic solution. In some embodiments, the step of washing includes a second wash with a basic solution. In some embodiments, the step of washing includes washing with water.

In some aspects, the composite may be used for another cycle of contacting contaminants after the step of regenerating. In some embodiments, the composite may be reused for at least 1, at least 2, at least 3, at least 4, or at least 5 cycles. In some embodiments, the composite may be reused for 1, 2, 3, 4, 5, 6, or 7 cycles. Illustratively, the regenerated composite will maintain about 75%, about 80%, about 90%, or about 95% binding capacity for each cycle.

In another aspect of the present invention, a composite may be formed by combining a carbonaceous support with a metal oxide. In some embodiments, the step of combining in carried out in an alkaline solution comprising a base. In some embodiments, the metal oxide comprises titanium oxide of organo-titanium compounds.

In some embodiments, the carbonaceous support is an activated charcoal, a powder activated charcoal, activated carbon fibers, biochar, or a mixture thereof.

In some embodiments, the mass ratio of the metal oxide to the carbonaceous support may be about 0.5:1 to about 1:3. In some embodiments, the mass ratio of the metal oxide to the carbonaceous support is about 1:1. In some embodiments, the mass ratio of the metal oxide to the carbonaceous support is about 1:2.

In some embodiments, the base may be an inorganic base or an organic base. In some embodiments, the inorganic base may be of the formula MOH. In some embodiments, the inorganic base may be sodium hydroxide, calcium hydroxide, or potassium hydroxide. In some embodiments, the base may be at a concentration of about 5 M, about 6 M, about 7 M, about 8 M, about 9 M, or about 10 M.

In some embodiments, the step of combining is performed for a particular time. In some embodiments, the step of combining is performed for at least 3 hours, at least about 4 hours, at least about 6 hours, at least about 8 hours, at least about 10 hours, at least about 24 hours. In some embodiments, the step of combining is performed for about 3 hours, about 6 hours, about 8 hours, about 12 hours, about 16 hours, about 20 hours, about 24 hours, about 36 hours, about 48 hours, about 60 hours, or about 72 hours. In some embodiments, the step of combining is performed for about 6 hours to about 24 hours, about 6 hours to about 16 hours, or about 8 hours to about 16 hours.

In some embodiments, the method of forming the composite may include a step of heating. Illustratively, the step of heating may include heating the alkaline solution to a temperature of at least 100° C., at least 120° C., at least about 150° C., or at least about 180° C. In some embodiments, the step of heating may be performed at about 100° C. to about 220° C., about 110° C. to about 200° C., or about 110° C. to about 180° C.

In some embodiments, the step of heating is performed for at least 3 hours, at least about 4 hours, at least about 6 hours, at least about 8 hours, at least about 10 hours, at least about 12 hours, at least about 24 hours, at least about 36 hours, at least about 48 hours, or at least about 60 hours. In some embodiments, the step of heating is performed for about 3 hours, about 6 hours, about 8 hours, about 12 hours, about 16 hours, about 20 hours, about 24 hours, about 36 hours, about 48 hours, about 60 hours, about 72 hours, or about 84 hours.

In some embodiments, the method for forming the composite may include the step of washing the composite. In some embodiments, the composite is washed with water, methanol, or both.

In some embodiments, the method for forming the composite may include the step of drying the composite.

EXAMPLES

General Materials

For the examples described herein, all chemicals were of analytical grade or higher. Nano-$TiO_2$ (P25, 80% anatase and 20% rutile) was purchased from Degussa (Evonik) of Germany. Sodium hydroxide (GR) and absolute ethanol were obtained from Acros Organics (Fair Lawn, N.J., USA). A DARCO granular activated charcoal (20-40 mesh) was acquired from Sigma-Aldrich (St. Louis, Mo., USA) and used as received. Considerations for examples utilizing AC included: 1) moderate adsorption affinity toward the target contaminants so that adsorbed contaminants are available for subsequent photodegradation, 2) some carbon can be released to modify the TNTs during the hydrothermal treatment to facilitate photodegradation, and 3) relatively larger pore size to avoid pore clogging. Phenanthrene was purchased from Alfa Aesar (Ward Hill, Mass., USA), and a stock solution of 2 g/L was prepared by dissolving phenanthrene in methanol. A standard leonardite humic acid (LHA, IHSS 1S104H) containing 64% of total organic carbon (TOC) was utilized as the model NOM.

General Material Characterization Procedures

For the examples described herein, surface morphology was imaged using a scanning electron microscope (SEM) (FEI XL30F, Philips, USA) operated at 20 kV and further analyzed via energy-dispersive X-ray spectroscopy (EDS). Transmission electron microscopy (TEM) analysis was conducted on a Tecnai30 FEG microscopy (FEI, USA) operated at 300 kV. The crystal phases of the samples were analyzed using an X-ray diffractometer (XRD) (D/max-2400, Rigaku, Japan) at 100 kV and 40 mA with the Cu Kα radiation ($\lambda=1.542$ Å) and a scanning rate of 4°/min. The surface elemental compositions and oxidation states were acquired using an AXIS-Ultra X-ray photoelectron spectroscopy (XPS) (Kratos, England) operated at 15 kV and 15 mA using the Al Kα X-ray. The standard C 1s peak (Binding energy, $E_b=284.80$ eV) was used to calibrate all the peaks and eliminate the static charge effects. Fourier transform infrared spectroscopy (FTIR) (Tensor 27, Bruker, Germany) analysis was carried out to obtain the functional groups, operated with a scanning range of 4000-400 $cm^{-1}$ and resolution of 4 $cm^{-1}$ through the KBr pellet method. The BET surface area was obtained on an ASAP 2010 BET surface area analyzer (Micromeritics, USA) in the relative pressure ($P/P_0$) range of 0.06-0.20. The pore size distribution was obtained following the Barret-Joyner-Halender method.

The nitrogen adsorption at the relative pressure of 0.99 was used to determine the pore volumes and the average pore diameters. Zeta potential of the materials was measured using a Nano-ZS90 Zetasizer (Malvern Instruments, UK). Diffuse reflectance UV-visible absorption spectra (UV-DRS) were obtained on a UV-2400 spectrophotometer (Shimadzu, Japan), where $BaSO_4$ powder was used as the reference at all energies (100% reflectance) and the reflectance measurements were converted to absorption spectra using the Kubelka-Munk function. Photoluminescence (PL) spectra were obtained on a fluorescence spectrophotometer (SpectraMax M2, Molecular Devices, CA, USA) to evaluate generation of hydroxyl radicals (•OH). UV-visible spectra of phenanthrene solutions (500 μg/L) treated with TNTs@AC, AC, and TNTs were collected using a SpectraMax M2 spectrophotometer over the wavelength range of 200-400 nm. The spectra were calibrated by deducting the spectra of the background DI water. The UV-visible spectra changes during adsorption and photodegradation were recorded at various times.

General Contaminant Detection

Phenanthrene in water was determined using an Agilent 1260 Infinity high-performance liquid chromatography (HPLC) system with a UV-vis diode array detector at 254 nm. A Poroshell 120 EC-C18 column (50×4.6 mm, 2.7 μm) was used, with temperature held constant at 30° C. The mobile phase was comprised of acetonitrile and water at 70:30 (v/v) and at a flow rate of 1 mL min-1 in the isocratic mode. The detection limit for phenanthrene was ~1 μg/L. For HPLC analysis, 1 mL sample was first mixed with 1 mL methanol and then filtered through a PTFE membrane. The phenanthrene photodegradation intermediates were determined using a GC-MS (Agilent 7890A GC with 5975C Series mass spectrometry) equipped with an Agilent DB EUPAH column (121-9627, 20 m×180 μm×0.14 μm).

Dissolved Ti concentration in the supernatant after adsorption was measured on an inductively coupled plasma-optical emission spectroscopy (ICP-OES, 710-ES, Varian, USA). HA concentrations before and after adsorption were determined on a Tekmar Dohrmann Pheonix 8000 UV-Persulfate TOC analyzer (Mason, Ohio, USA).

Production of hydroxyl radicals by various materials was determined as follows. Terephthalic acid was used as a probe molecule to react with •OH in the photocatalytic process. After the reaction, the formed 2-hydroxyterephthalic acid excites a high fluorescent, and the fluorescence intensity is proportional to the amount of •OH. Therefore, the production of •OH may be indirectly measured by the fluorescence intensity on the fluorescence spectrophotometer. In some Examples, 0.2 g of a material was dispersed in a mixture of 0.5 mmol terephthalic acid and 2 mmol NaOH with a total volume of 200 mL in the photo-reactor. After a 15 minute illumination under UV light, samples were taken and microfiltered through a 0.22 μm PTFE membrane. The PL spectra were then obtained on a fluorescence spectrophotometer (SpectraMax M2, Molecular Devices, CA, USA) at an excitation wavelength of 425 nm.

Example 1

Synthesis of TNTs@AC

Approximately 2.4 g AC and 1.2 g $TiO_2$ were combined with 66.7 mL of a 10 mol/L NaOH solution. After stirring for 12 hours, the mixture was transferred into a Teflon reactor with a stainless steel cover and then heated at 130° C. for 72 hours. The black precipitate (TNTs@AC) was then separated and washed with deionized (DI) water until pH ~7.5-8.5, and then dried at 80° C. for 4 hours. For comparison, plain TNTs were also prepared separately via the same procedure but without AC, and a sample of amended AC was also prepared by subjecting the parent AC to the same hydrothermal treatment without $TiO_2$.

Example 2

Analysis of TNTs@AC

Figure 2A:
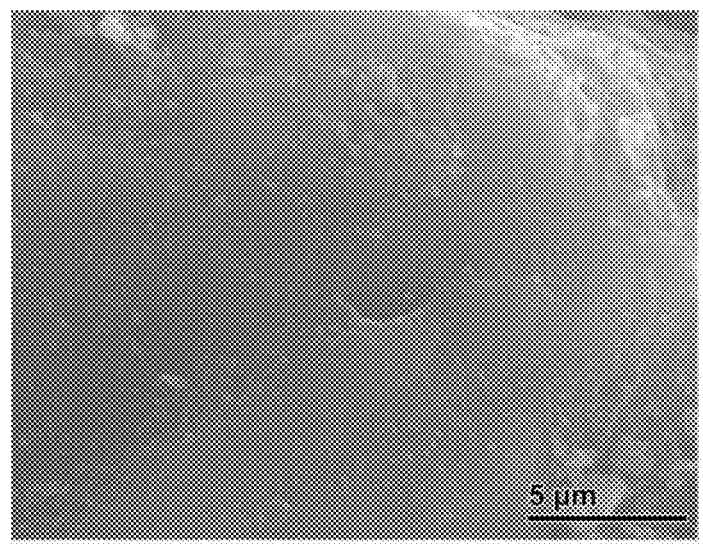
Figure 2B:
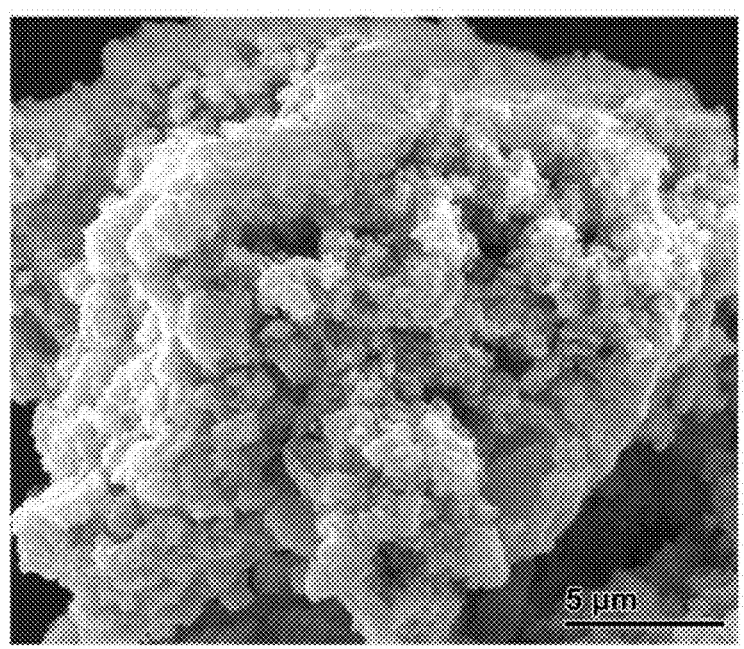
Figure 2C:
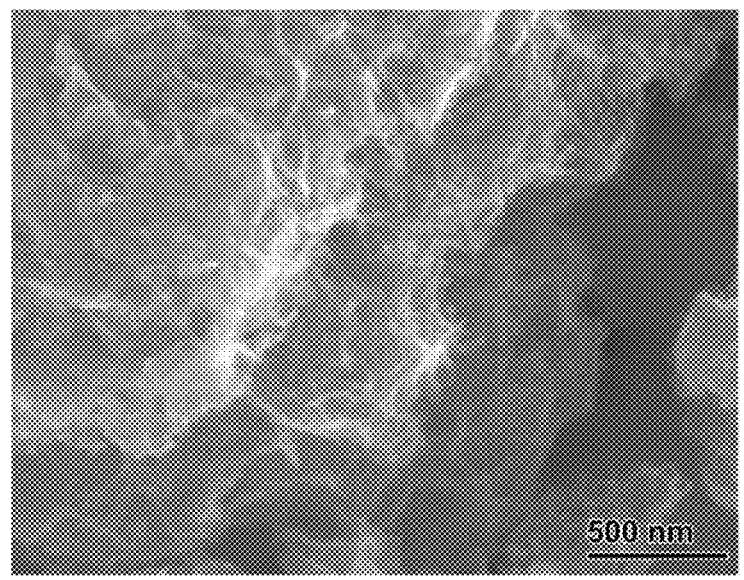
Figure 2D:
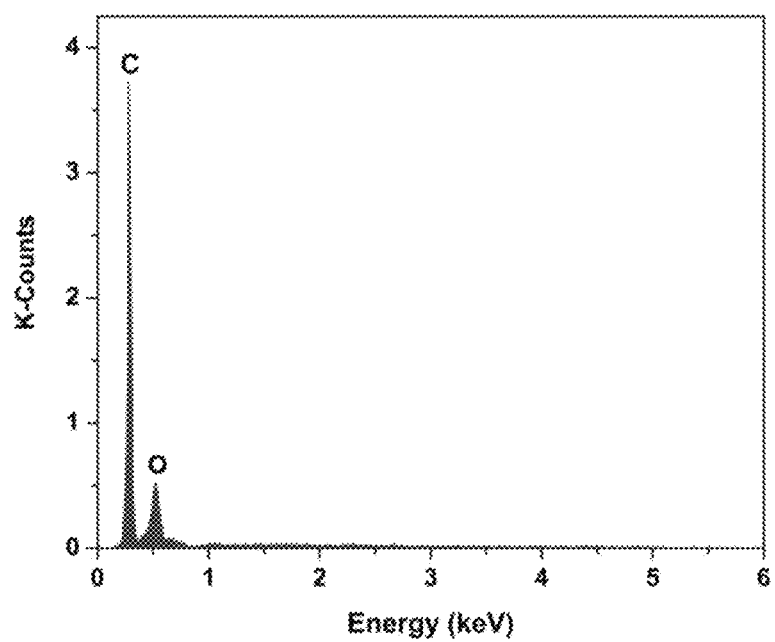
Figure 2E:
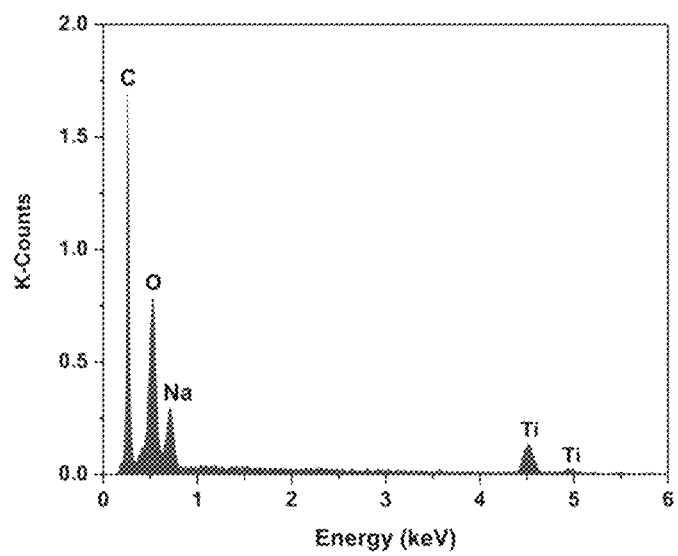

Scanning electron microscope (SEM) images of the parent AC and TNTs@AC are shown in FIGS. 2A-2C. While the surface of AC appeared bulky, flat and smooth (FIG. 2A), the surface of TNTs@AC appeared rather rough and full of clusters of aggregates (FIG. 2B). A close-up of the surface revealed that the tubular TNTs formed an interweaved network spreading throughout the surface (FIG. 2C). The length of the nanotubes stretched up to hundreds of nanometers. The energy-dispersive X-ray spectra (EDS) (FIGS. 2D, 2E) reveal four major elements C, O, Na and Ti on the surface of TNTs@AC, indicating that TNTs were not just simply coated on AC, rather the nanotubes are intermingled with AC, i.e., some AC is also coated on TNTs.

Figure 7:
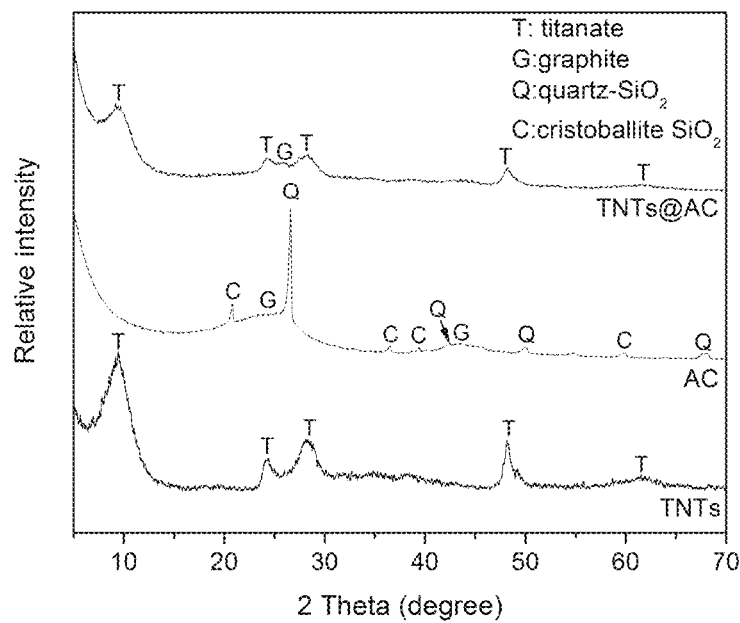
FIG. 7 shows XRD patterns of TNTs, AC, and TNTs@AC.

FIG. 7 shows the X-ray diffractometer (XRD) patterns of neat TNTs, AC, and TNTs@AC. For neat TNTs, the peak at 9.4°, 24.4°, 28.1°, 48.2° and 61.5° are all assigned to sodium tri-titanate, with a basic structure of $Na_xH_{2-x}Ti_3O_7$ (x=0-0.75, depending on the remaining sodium). The tri-titanate is composed of corrugated ribbons of triple edge-sharing [$TiO_6$] as a skeletal structure and $H^+/Na^+$ located in interlayers.

In addition, the peak at 9.4° represents the interlayer distance (crystal plan (020)) of TNTs. For AC, the two peaks at 26° and 43° are attributed to the diffractions of crystal planes of graphite (002) and (100), respectively. For TNTs@AC, all the peaks observed for TNTs remained, and in addition, the graphite (002) peak was observed, confirming the SEM finding that AC is covered by TNTs with some AC coated on the surface TNTs. The Si impurities (quartz/cristoballite-$SiO_2$) in the raw AC were removed in TNTs@AC upon the hydrothermal-alkaline treatment and the subsequent washing process.

FIG. 8A shows X-ray photoelectron spectroscopy (XPS) spectra of AC and TNTs@AC, and Table 1 lists the corresponding atomic compositions. 7.1% of Ti and 1.7% of Na are detected for TNTs@AC. Based on the Na/Ti ratio and the general molecular formula of $Na_xH_{2-x}Ti_3O_7$ for TNTs, the compositions of the synthetic TNTs can be identified as $Na_{0.7}H_{1.3}Ti_3O_7$. Based on carbon content in AC (82.1%) and Ti mass added, the overall mass ratio of AC to TNTs in the composite material is ~1.7:1. FIG. 8B shows high resolution of C 1s. The high resolution spectra of C 1s appeared similar before and after the hydrothermal treatment (FIG. 8A), while the C atomic percent associated with the π-π bond increased from 9.9% for AC to 13.0% for TNTs@AC (Table 2), indicating that TNTs@AC may offer stronger adsorption of aromatic organic compounds through π-π interactions. The high-resolution spectra of O 1s (FIG. 8C) reveal that the lattice O increased from 22.6% for AC (due to inorganic oxide impurities such as $SiO_2$) to 72.8% for TNTs@AC (due to [Ti—$O_6$]) (Table 2), confirming accumulation of TNTs on AC. The O peak at 532.3 eV in TNTs@AC is assigned to Ti—O/C—O, which suggests the formation of a linkage of C—O—Ti between TNTs and AC. The Fourier transform infrared spectroscopy (FTIR) spectra (FIG. 9) also confirm the new peak at 1081 $cm^{-1}$ that is assigned to C—O—Ti bond. In addition, the C—OH peak of AC at 1091 $cm^{-1}$ was not only much lower but also shifted to 1097 cm$^{-1}$ in TNTs@AC, indicating decreased carbon-oxygen groups.

TABLE 1

Surface atomic percentage of AC and TNTs@AC obtained by XPS.

| Material | Element atomic percent (%) | | | | |
|---|---|---|---|---|---|
| | C | O | Na | Ti | Si |
| AC | 82.1 | 12.7 | 0.2 | 0.0 | 5.0 |
| TNTs@AC | 75.1 | 16.1 | 1.7 | 7.1 | 0.0 |

TABLE 2

Surface atomic percentage of various compositions of C 1s and O 1s obtained by XPS

| | AC | | TNTs@AC | | |
|---|---|---|---|---|---|
| Region | Position (eV) | At % | Position (eV) | At % | Assignment |
| C 1s | 284.6 | 73.7 | 284.6 | 67.6 | C—C/C—H |
| | 285.9 | 11.1 | 285.8 | 13.4 | C—O |
| | 287.1 | 5.3 | 287.1 | 6.0 | C=O |
| | 290.1 | 9.9 | 289.8 | 13.0 | π-π |
| O 1s | 529.7 | 4.5 | — | — | C=O |
| | 530.6 | 19.2 | 530.9 | 72.8 | [Ti—O$_6$]/[Si—O] |
| | 532.3 | 76.3 | 532.9 | 21.0 | Ti/C—O |
| | — | — | 535.8 | 6.2 | Chemisorbed O + H$_2$O |

Example 3

Hydrothermal Treatment

The hydrothermal treatment and loading of TNTs lowered the measured BET surface area from 566.1 m$^2$/g for AC to 471.6 m$^2$/g for TNTs@AC and the pore volume from 0.61 to 0.52 cm$^3$/g (Table 3).

TABLE 3

Physicochemical properties of AC and TNTs@AC.

| Material | BET surface area (m$^2$/g) | Single point total pore volume (cm$^3$/g) | Average pore diameter (nm) | Point of zero charge (pH$_{PZC}$) |
|---|---|---|---|---|
| TNTs@AC | 471.6 | 0.52 | 3.74 | 3.1 |
| AC | 566.1 | 0.61 | 4.27 | 6.8 |
| TNTs | 272.3 | 1.26 | 18.6 | 2.6 |

The N$_2$ adsorption-desorption isotherms for both AC and TNTs@AC conformed to the type IV isotherm with the H3 hysteresis loop (FIG. 10A), suggesting the presence of mesopores (2-50 nm) in the materials, which is also shown in FIG. 10B of the pore size distribution. FIGS. 10A and 10B also reveal that the hydrothermal treatment transformed the larger pores (>6 nm) in both TNTs and AC into smaller pores centered around ~4 nm in TNTs@AC.

Considering the compositions of TNTs@AC (AC:TNTs mass ratio of 1.7:1) and the specific surface area of TNTs (272.3 m$^2$/g), the measured BET surface area of TNTs@AC is very close to the calculated value 470.6 m$^2$/g, suggesting that the hydrothermal treatment did not significantly alter the AC surface area. However, the measured pore volume is much lower than the theoretical value of 0.85 cm$^3$/g of TNTs@AC (calculated as the weighted average of the mean pore volumes for neat AC and TNTs), which supports the postulate that some micro-AC may have intruded into the pores of TNTs during the hydrothermal treatment. TNTs@AC exhibits a bimodal pore size distribution profile with a primary peaking at ~4 nm and a secondary peaking at 2-2.5 nm (FIG. 10B), which are attributed to the pores of AC and conversion of larger pores (>10 nm) of TNTs into more micropores in TNTs@AC, respectively. The pore size distribution (FIG. 10B) also indicates that most of the larger pores (>10 nm) in AC disappeared in TNTs@AC, suggesting that these macro-pores may also be blocked due to the leached AC particles and/or growth of TNTs at the mouth of the macro-pores. It is less likely for TNTs to intrude into the internal finer pores due to their interwoven tubular structure and size exclusion. The AC coating on the nanotubes reduced the mean pore diameter of TNTs from 18.6 to 3.7 nm of TNTs@AC.

FIG. 11 shows that zeta potential of TNTs@AC is much less negative than neat TNTs, indicating that AC coating on TNTs shielded part of the functional groups (—OH/—ONa) on TNTs. The pH$_{PZC}$ values were measured to be 3.1 for TNTs@AC, 2.6 for TNTs and 6.8 for AC (Table 3).

Example 4

FTIR Spectra

FTIR spectra (FIG. 9) show the variation of functional groups before and after the hydrothermal treatment. Overall, the FTIR spectra of TNTs@AC are closer to those of TNTs. The peaks at ca. 3400, 1630, 900 and 500 cm$^{-1}$ are assigned to vibrations of O—H (hydroxyl groups), H—O—H (bond water molecules), coordinated Ti—O involving non-bridging oxygen atoms coordinated with Na ions (TiO(ONa)$_2$), and Ti—O in [Ti—O$_6$] octahedrons, respectively, which all belong to TNTs and were also observed with TNTs@AC.

General Adsorption and Isotherm Procedures

Phenanthrene adsorption kinetic experiments were carried out in dark using brown glass vials (40 mL) with Teflon-lined caps. Adsorption kinetic tests were conducted at pH 7 with an initial concentration of phenanthrene of 500 µg/L and TNTs@AC dosage of 0.5 g/L. The tests were initiated by adding TNTs@AC into the respective phenanthrene solutions and then the change in phenanthrene concentration was followed for 24 hours under shaking at 200 rpm. At predetermined times, the vials were sacrificially sampled. Upon centrifuging at 8000 rpm (6400 g-force) for 5 minutes, the supernatants were sampled and analyzed for phenanthrene. For comparison, phenanthrene adsorption kinetics by original untreated AC and hydrothermally-treated AC (AC-treated) were also tested.

Adsorption isotherms were constructed in a similar fashion with an initial phenanthrene concentration of 50-1000 µg/L and a fixed TNTs@AC dosage of 0.5 g/L at pH 7, and the mixtures were equilibrated for 24 hours under shaking. For comparison, adsorption isotherms by AC, AC-treated, and TNTs were also obtained. To investigate further the adsorption behaviors of TNTs@AC at high phenanthrene concentrations, sequencing batch isotherm tests were conducted. After the adsorption reached equilibrium for initial phenanthrene concentration of 1000 µg/L, phenanthrene stock solution was further injected to increase the initial concentration by 400 µg/L each time. Phenanthrene concentration in solution at another round of equilibrium, and the sequencing batch tests lasted for 10 runs, i.e. up to 5000 µg/L for the cumulative initial phenanthrene concentration.

To test the adsorption reversibility, desorption isotherms were measured. Following the adsorption isotherm tests, the supernatant in each vial was replaced with 40 mL of deionized water, and then re-equilibrated for 24 hours. The equilibrium distribution of phenanthrene was then measured in the same fashion as in the adsorption equilibrium tests.

To test effects of pH, the equilibrium tests were carried out at an initial phenanthrene concentration of 500 µg/L, a TNTs@AC dosage of 0.5 g/L, and final solution pH 3-11 (adjusted using dilute HCl and NaOH). To probe effects of ionic strength, the tests were carried out in the presence of 0-10 mM of NaCl and $CaCl_2$. Likewise, effects of humic acid were tested by measuring equilibrium uptake of phenanthrene in the presence of 0-10 mg/L as TOC of LHA.

Example 5

Figure 3A:
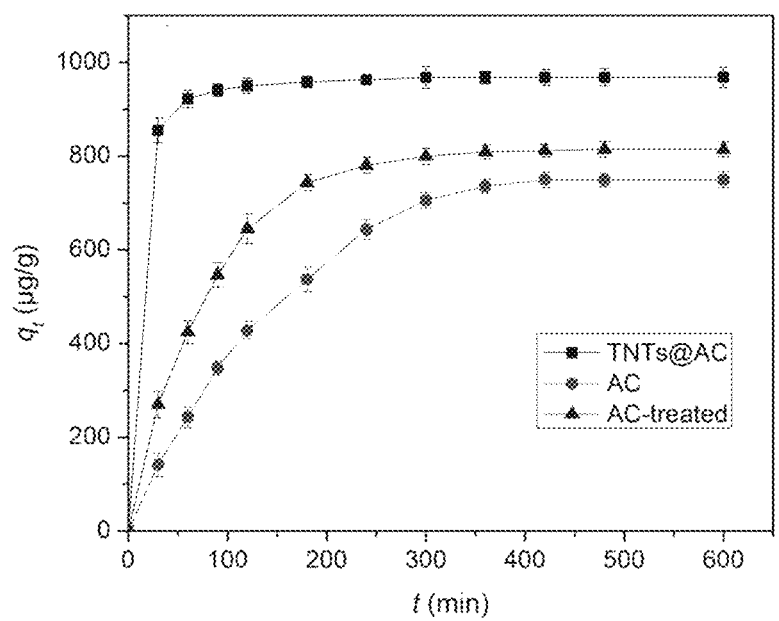

FIG. 3A shows adsorption kinetics of phenanthrene by TNTs@AC. TNTs@AC displayed rapid uptake rate. The adsorption equilibrium was reached in 180 min, with a high removal efficiency of 96.8% at equilibrium, and most (>92%) of the adsorption capacity was filled in the first 60 min. In contrast, the parent AC showed much slower kinetics and lower phenanthrene capacity (74.9% removal at 600 min). Furthermore, the hydrothermally treated AC showed only slightly enhanced kinetics and equilibrium uptake compared to the original AC, and much lower capacity than TNTs@AC. These observations indicate that the TNTs play an important role in phenanthrene adsorption by providing sites that are more accessible and added adsorption capacity.

Table 4 shows that the pseudo-second-order model best-fits the experimental kinetic data ($R^2$=1) for TNTs@AC, whereas the intraparticle diffusion model performs worst (see Section S6 for the models), which differs from standard AC where film or intraparticle diffusion often controls the adsorption rate, suggesting that the rate-controlling step for TNTs@AC is due to chemical interactions.

TABLE 4

| Model | Parameter | Material | | |
|---|---|---|---|---|
| | | TNTs@AC | AC | AC-treated |
| Pseudo-first-order model | $q_{e,cal}$ (µg/g) | 175.93 | 778.99 | 570.74 |
| | $k_1$ (min$^{-1}$) | 0.0341 | 0.0064 | 0.0069 |
| | $R^2$ | 0.9083 | 0.8850 | 0.7664 |
| Pseudo-second-order model | $q_{e,cal}$ (µg/g) | 970.87 | 925.93 | 884.96 |
| | $k_2$ (g/(µg · min)) | 4.08 × 10$^{-4}$ | 9.28 × 10$^{-6}$ | 2.71 × 10$^{-5}$ |
| | $R^2$ | 1.0000 | 0.9480 | 0.9913 |

TABLE 4-continued

| Model | Parameter | Material | | |
|---|---|---|---|---|
| | | TNTs@AC | AC | AC-treated |
| Intraparticle diffusion model | $k_{int}$ (µg/(g · min$^{0.5}$)) | 4.34 | 34.70 | 26.97 |
| | C (µg/g) | 882.74 | 25.40 | 271.69 |
| | $R^2$ | 0.6188 | 0.9137 | 0.7922 |
| | $q_{e,exp}$ (µg/g) | 968.42 | 749.68 | 814.38 |

Figure 3B:
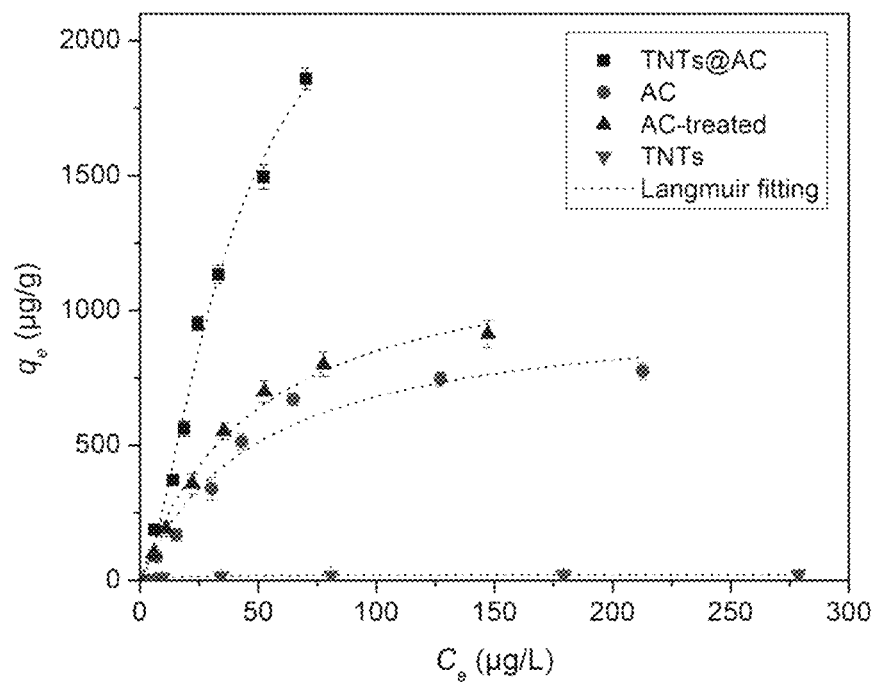

FIG. 3B compares the adsorption isotherms of phenanthrene by TNTs@AC, parent AC, treated AC, and neat TNTs in the low concentration range of <210 µg/L. Neat TNTs showed only negligible phenanthrene uptake (<21 µg/g), while TNTs@AC offered the much higher adsorption capacity. The classic Langmuir model can well fit the isotherm data for TNTs@AC (Table 5).

TABLE 5

Isotherm model parameters for adsorption of phenanthrene by AC, TNTs, and TNTs@AC.

| Model | Parameter | Material | | | |
|---|---|---|---|---|---|
| | | TNTs@AC | AC | AC-treated | TNTs |
| Linear model | $K_d$ (L/g) | 28.8 | 4.9 | 7.8 | 0.1 |
| | $R^2$ | 0.9591 | 0.4670 | 0.5869 | 0.1330 |
| Langmuir model | $Q_{max}$ (mg/g) | 12.1 | 1.1 | 1.3 | 0.02 |
| | b (L/mg) | 2.9 | 16.2 | 16.5 | 108.8 |
| | $R^2$ | 0.9954 | 0.9475 | 0.9630 | 0.9973 |
| Freundlich model | $K_F$ (mg/g · (L/mg)$^{1/n}$) | 42.8 | 29.5 | 34.95 | 5.1 |
| | n | 1.10 | 1.48 | 1.40 | 3.60 |
| | $R^2$ | 0.9803 | 0.9032 | 0.9454 | 0.9240 |

Figure 3C:
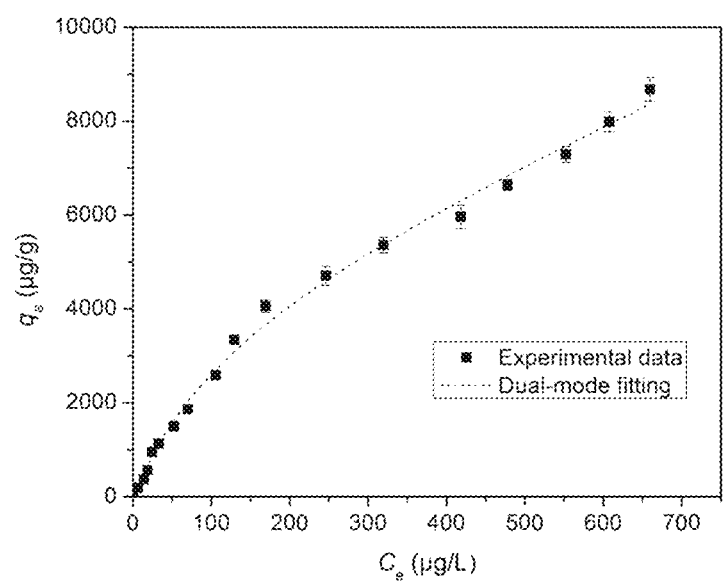

The maximum Langmuir capacity for phenanthrene on TNTs@AC was 12.1 mg/g, which is ~11.5 and 9.2 times higher than AC (1.1 mg/g) and AC-treated (1.3 mg/g), respectively. To acquire a deeper understanding of the adsorption mechanisms, a detailed adsorption isotherm was constructed by extending the equilibrium isotherm $C_e$ to ~0.6× its solubility value (FIG. 3C). The isotherm displayed a two-stage profile, i.e. a Langmuir adsorption at lower $C_e$ (<400 µg/L) and a linear uptake at higher $C_e$. A dual-mode model considers a Langmuir-type adsorption in the low concentration range and a capillary condensation in the high concentration range. FIG. 3C shows that the dual-mode model can well describe the isotherm data ($R^2$=0.9956) (Table 6).

TABLE 6

Isotherm model parameters for adsorption of phenanthrene by TNTs@AC at high phenanthrene concentrations.

| Model | Parameter | Values |
|---|---|---|
| Linear model | $K_d$ (L/g) | 14.3 |
| | $R^2$ | 0.9242 |
| Langmuir model | $Q_{max}$ (mg/g) | 22.2 |
| | b (L/mg) | 1.4 |
| | $R^2$ | 0.9917 |
| Freundlich model | $K_F$ (mg/g · (L/mg)$^{1/n}$) | 61.8 |
| | n | 1.29 |
| | $R^2$ | 0.9787 |

TABLE 6-continued

Isotherm model parameters for adsorption of phenanthrene
by TNTs@AC at high phenanthrene concentrations.

| Model | Parameter | Values |
|---|---|---|
| Dual-mode model | $K_d$ (L/g) | 1.3 |
| | $Q_L$ (mg/g) | 4.3 |
| | b (L/mg) | 2.7 |
| | $R^2$ | 0.9956 |

The adsorption capacity of TNTs@AC far exceeded the simple sum of those of neat TNTs and AC-treated. This finding reflects the synergy between AC and TNTs attributed to the different adsorption mechanisms. Based on the XPS spectra and the structures of TNTs@AC, adsorption of phenanthrene may be through, in addition to the standard hydrophobic interactions as for conventional AC, the enhanced π-π interaction and the hole-filling mechanism of the AC-coated TNTs on the surface.

Example 6 pH Dependence

FIG. 12A shows the performed TNTs@AC consistently well (>950 μg/g) over the broad pH range of 3-11. In addition, only 0.037% of Ti was dissolved into the solution even at pH 3 (Table 7), and no soluble Ti was detected in alkaline solutions, indicating the strong material stability of TNTs@AC. FIG. 12B shows that the presence of 10 mM NaCl and $CaCl_2$ had a statistically insignificant effect on phenanthrene uptake based on t tests (p>0.05).

TABLE 7

Dissolution of Ti from TNTs@AC at different pH.

| pH | Dissolution (wt. %) |
|---|---|
| 3 | 0.037 |
| 4 | 0.012 |
| 5 | 0.006 |
| 6 | 0.002 |
| 7 | N.D.* |
| 8 | N.D. |
| 9 | N.D. |
| 10 | N.D. |
| 11 | N.D. |

*N.D.: Non-detectable.

FIG. 12C shows the effects of HA on TNTs@AC and AC. First, TNTs@AC was shown much more resistant to the organic fouling than the parent AC (FIG. 12B and FIG. 13). Second, HA affects the adsorption capacity of AC and TNTs@AC in a quite different manner. When HA concentration was increased from 0 to 2.5 mg/L as TOC, phenanthrene uptake by TNTs@AC was decreased from 970.5 to 803.0 μg/g; however, when HA was further increased from 2.5 to 10 mg/L, the uptake bounced up to 955.4 μg/g. In contrast, the uptake of phenanthrene by AC was progressively decreased from 747.4 to 455.2 μg/g when HA was increased from 0 to 10 mg/L.

The inhibitive effect on AC is consistent with the conventional notion that dissolved organic matter (DOM) can retard adsorption of AC due to irreversible adsorption and clogging of the pores (also known as organic fouling or territorial binding). For TNTs@AC, however, the narrowed pore size and the modified surface characteristics exclude HA macromolecules from entering and clogging the pores, greatly mitigating organic fouling. The relatively minor suppression in the low HA concentration range (<5 mg/L) can be attributed to the competition of relatively smaller and hydrophobic HA molecules for the π-π bonding sites and/or hydrophobic sites.

At elevated HA concentrations, the smaller adsorbable components of HA became increasingly aggregated through dispersive hydrophobic interactions and H-bonds. Indeed, based on diffusion-ordered spectroscopic studies, it was shown that HA aggregates display diffusivities corresponding to average molecular weights>66,000 Da in concentrated solutions and 2500-6100 Da in less concentrated solutions. Since the experimental HA concentration is far below the reported critical micelle concentration of 5-10 g/L HA, no micelles are expected in the solution, though the aggregates are large enough to be excluded by the narrow pores of TNTs@AC. On the other hand, according to the membrane model, surfactant-like HA molecules may form bilayer membranes coating on the TNTs, which in turn can facilitate ad-solubilization of phenanthrene.

Example 7

FIGS. 14A and 14B show that adsorbed phenanthrene on TNTs@AC is hardly desorbable (<0.7% desorption in all cases). This may be attributed to hysteresis from the formation of closed interstitial spaces in spherical fullerene aggregates while no such formations can occur for long, cylindrical carbon nanotubes. As such, TNTs@AC may take up phenanthrene in a different fashion from CNTs.

Example 8

Figure 4A:
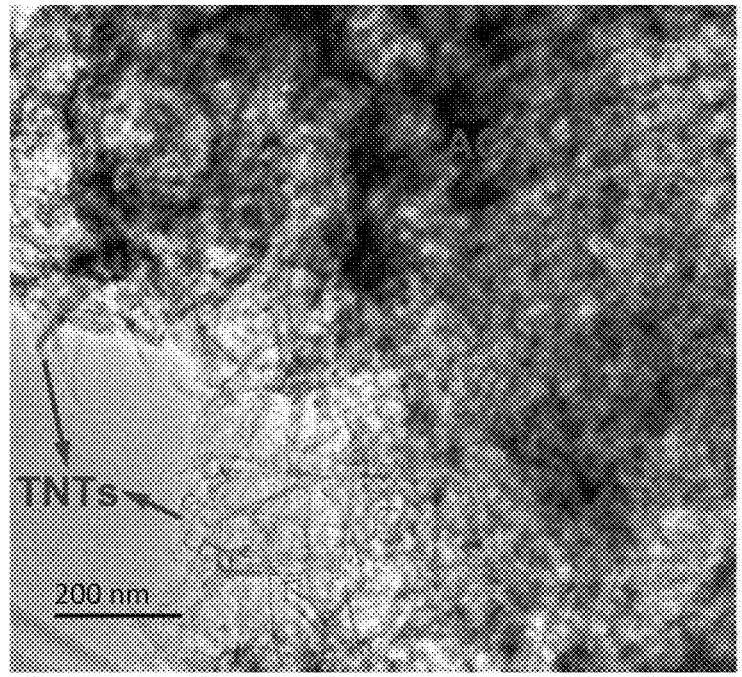
Figure 4B:
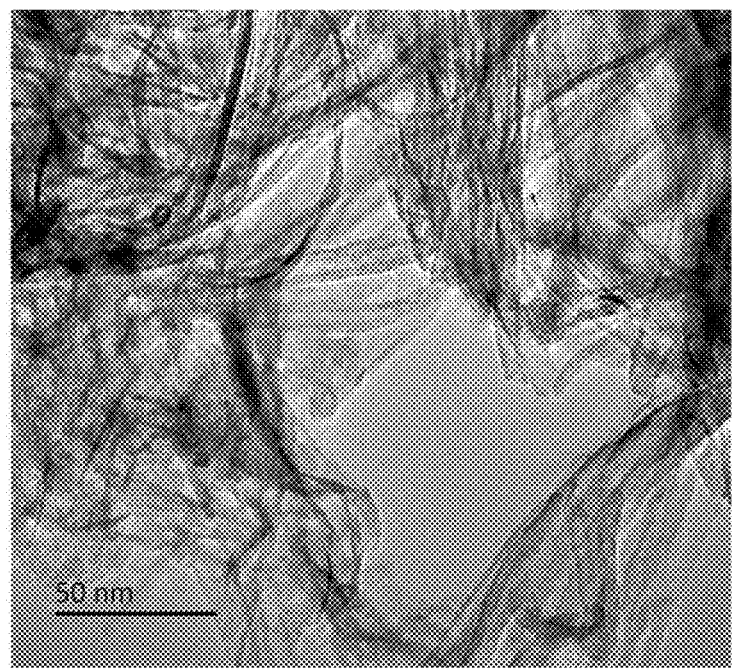
Figure 4C:
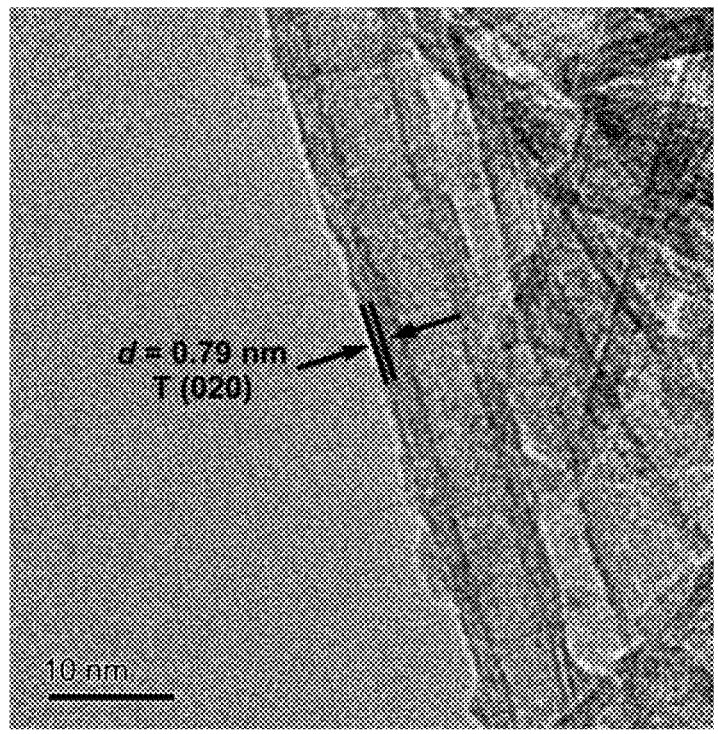
Figure 4D:
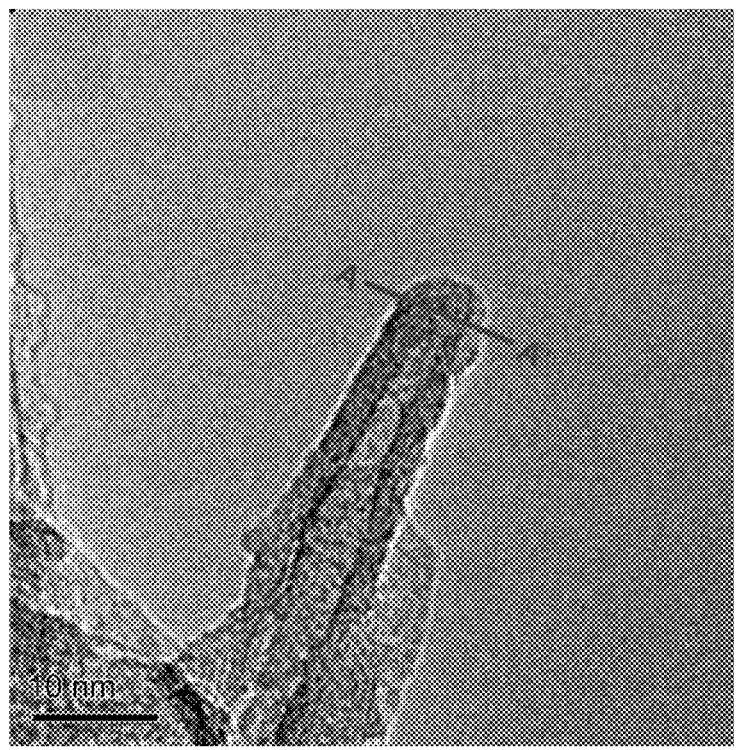
Figure 4E:
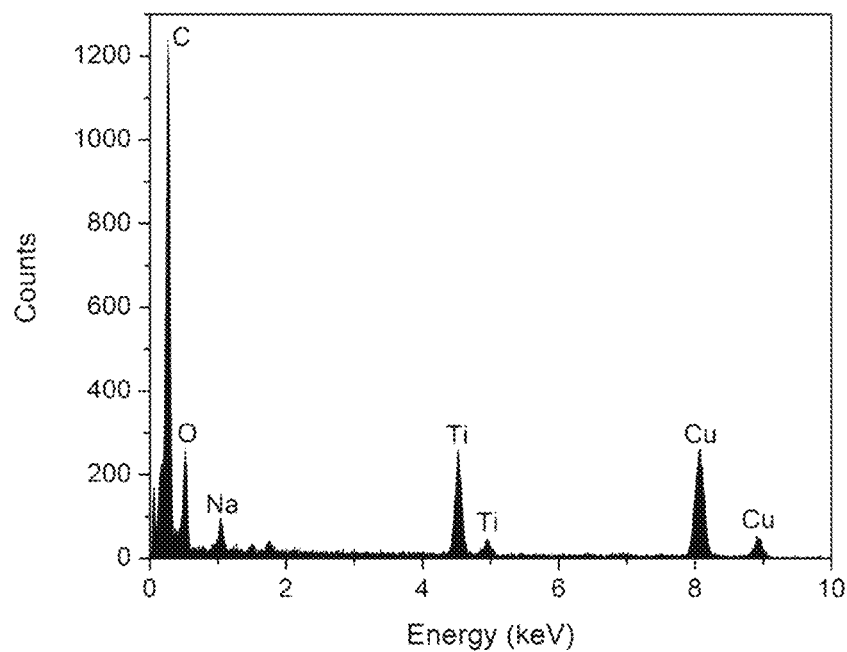

The substantially enhanced adsorption behavior of TNTs@AC is attributed to the modified surface property, geometry and curvature, narrowed pore size, more confined pore space, and much enhanced capillary condensation inside the carbon-modified TNTs. FIGS. 4A-4E show the TEM and HRTEM images of TNTs@AC. Consistent with the SEM images (FIGS. 2A-2E), TNTs are attached on scattered AC particles (FIGS. 4A, 4B). Due to the co-existence of AC in the hydrothermal process, the tubular structure of TNTs@AC appeared much contaminated and somewhat distorted compared to the neat TNTs (FIG. 15A), which are well-defined multilayered nanotubes (4-5 layers), with inner and outer diameters of 4.5 and 9 nm. The HRTEM also reveals some small patches on the coarse nanotubes or in the interlayer of TNTs (FIGS. 4C and 4D), indicating partial coating of microscale AC on the nanotubes (also see prior characterization and discussion below). Moreover, the interlayer distance of neat TNTs is 0.75 nm (FIG. 4C), which is assigned to the crystal plane (020) of titanate. In contrast, the interlayer distance increased to 0.79 nm for TNTs@AC, due to stretching by incorporated AC. Morphologically, while neat TNTs are open-ended (FIG. 15B), the nanotubes of TNTs@AC display a narrow ink-bottle structure with more carbon accumulated on the tube entry (FIG. 4D). The EDS line-scan of section A-A' (FIG. 4E) shows high carbon content on the TNTs walls, providing direct evidence of the carbon patching. Considering the inner diameter of TNTs is only 4.5 nm, it is postulated that some very fine carbon nanoparticles and/or "softer" carbonaceous materials were released from AC during the hydrothermal and extreme-alkaline treatment, and a fraction of the finest particles was able to enter the TNTs and deposited on the walls.

Taken together, the making of TNTs@AC may encompass two features: (1) the hydrothermal treatment converts TiO$_2$ into tubular TNTs that are attached on bulk AC particles, and (2) the treatment facilitates micro-AC stripping from GAC and then coating/incorporation on the TNTs. As such, the resulting TNTs@AC may adsorb phenanthrene in dual modes, i.e., in addition to the standard adsorption by AC, the narrow ink-bottle shaped TNTs also facilitate much enhanced 'bottle-filling' or capillary condensation of phenanthrene.

Example 9

Mechanistic Function

Figure 1A:
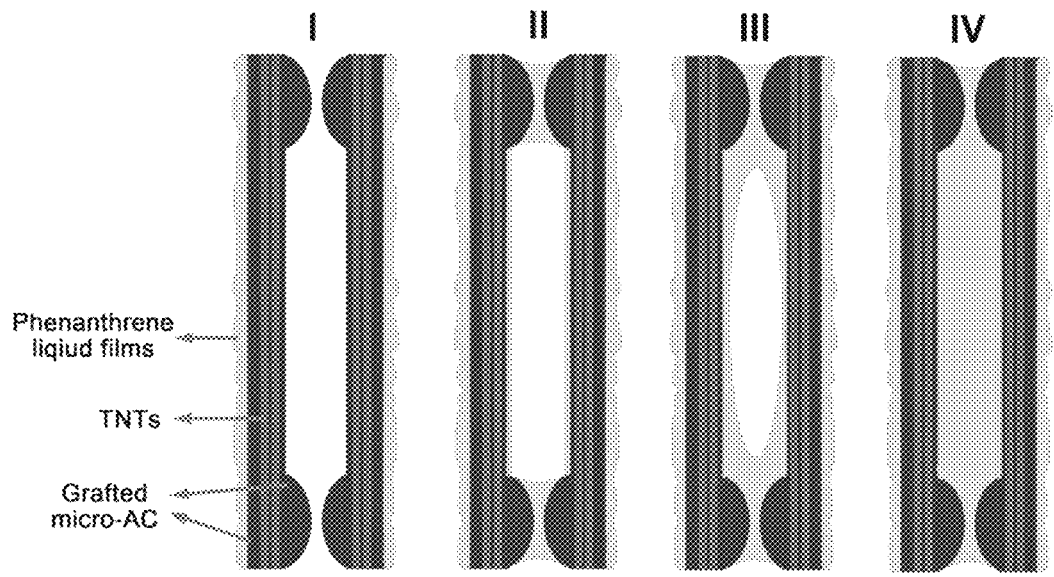

FIG. 1A depicts the transition from adsorption to capillary condensation as a function of matric potential for carbon modified TNTs. Although AC may be grafted on both the interior and exterior walls of the nanotubes, more AC is accumulated at the entrance (FIG. 4D), forming a narrow throat at the open ends of the nanotubes and relatively larger, ellipsoidal cavity inside the nanotubes mimicking the ink-bottle pore geometry. The carbon coating reduced most of the interior tube diameters to <4 nm, which is conducive to capillary condensation. Four steps can be discerned during the transition from adsorption to capillary-condensation. At low concentrations, phenanthrene is adsorbed on the pore and slit walls following the classical Langmuir mode (Step I in FIG. 1A). With increasing matric potential, the adsorbed layer thickens to a point where the slits are filled up with liquid due to capillary condensation (Step II in FIG. 1A). Further increasing the matric potential fills up the "belly" of the pore, resulting in a reduction in the radius of curvature of liquid-vapor interfaces and forming a circle or elongated oval-shaped interface (Step III in FIG. 1A). Subsequently, the pore is completely filled up (Step IV in FIG. 1A).

Various factors can cause adsorption and/or capillary condensation hysteresis, including hysteresis of the liquid-solid contact angle, the existence of inkbottle pores, pore size and geometry, and pore connectivity. The hysteresis loop (FIG. 14A) conforms to the Everett's independent domain theory for inkbottle pores, and it corresponds to a relatively narrow distribution of domain properties. Therefore, the strong hysteresis of TNTs@AC may be attributed to the unique inkbottle pores associated with the AC-coated TNTs, where desorption is controlled by the bottleneck (pore blocking) that is characterized by strongly curved menisci with higher activation energies.

Example 10

Photo-Regeneration of TNTs@AC and Material Reuse

Figure 5:
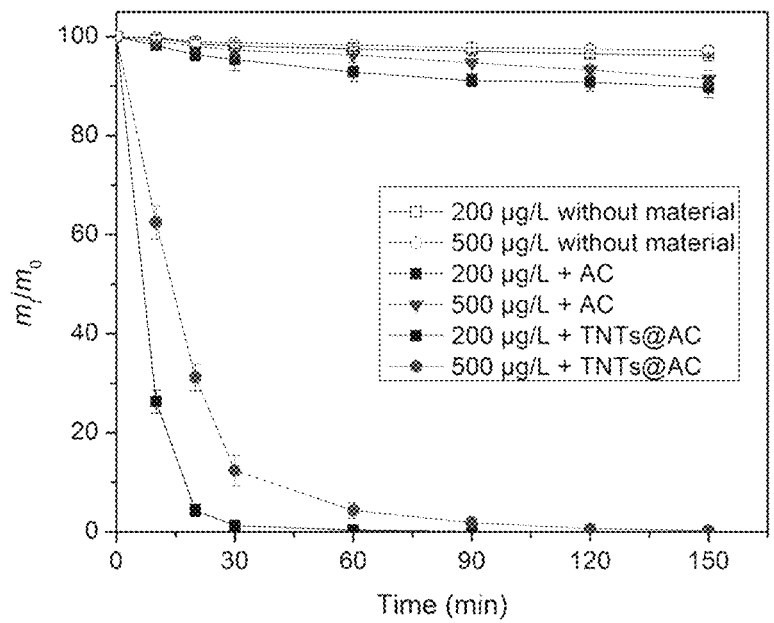
FIG. 5 shows photo-degradation of adsorbed phenanthrene by TNTs@ AC.

FIG. 5 shows that almost no phenanthrene (<4%) was photodegraded without the catalyst but under otherwise identical conditions. However, the pre-concentrated phenanthrene on TNTs@AC was nearly completely (>99%) under UV irradiation within 120 minutes for both loadings of phenanthrene (initial concentration of 200 or 500 µg/L). In comparison, only 9.2% ($C_0$=200 µg/L) and 6.7% ($C_0$=500 µg/L) of phenanthrene loaded on the parent AC were degraded under the identical UV irradiation, indicating excellent photocatalytic activity of TNTs grafted on AC. UV-vis spectra confirmed that phenanthrene was rapidly removed through adsorption by TNTs@AC, and the photo-degradation products were also rapidly adsorbed and/or degraded (FIG. 16).

FTIR spectra of TNTs@AC before and after photocatalysis confirmed phenanthrene bonding with TNTs@AC, and indicated that sorbed phenanthrene was rapidly and completely photodegraded while the material itself remained intact (FIG. 17). Compared to the precursor TiO$_2$, neat TNTs are known to show much weaker photocatalytic activity due to the easy recombination of electron-hole pairs. It has been suggested that carbon doping or deposition can greatly enhance the photocatalytic activity of TNTs/TiO$_2$ because the carbon materials can act as an electron transfer mediator that inhibits the recombination. Some of grafted AC nanoparticles may act as carbon quantum dots, which have been known to be an effective sensitizer of photocatalysts.

FTIR spectra of TNTs@AC before and after photocatalysis confirmed phenanthrene bonding with TNTs@AC and indicated that sorbed phenanthrene was rapidly and completely photodegraded while the material itself remained intact. FIG. 17 shows the FTIR spectra of TNTs@AC before and after photodegradation of phenanthrene. Following the adsorption, all the characteristic peaks assigned to TNTs@AC remain intact.

In addition, the new peaks at 1452 and 1576 cm$^{-1}$ were detected, which are attributed to the skeleton vibration peak of the benzene ring in phenanthrene. The observation is consistent with the primary adsorption mechanism that phenanthrene is taken up by TNTs@AC through π-π interaction, hydrophobic effect, and capillary condensation. After photocatalysis, the peaks belonging to phenanthrene disappeared and no new peaks were observed, indicating nearly complete degradation of phenanthrene and its degradation intermediates. The C—O band shifted from 1097 to 1106 cm$^{-1}$, resulting from interactions with small organic compounds. While the Ti—O—Na band at ca. 900 cm$^{-1}$ band disappeared after photo-degradation, due to protonation of TNTs after adsorption of acidic products.

Example 11

UV-VIS

Figure 6A:
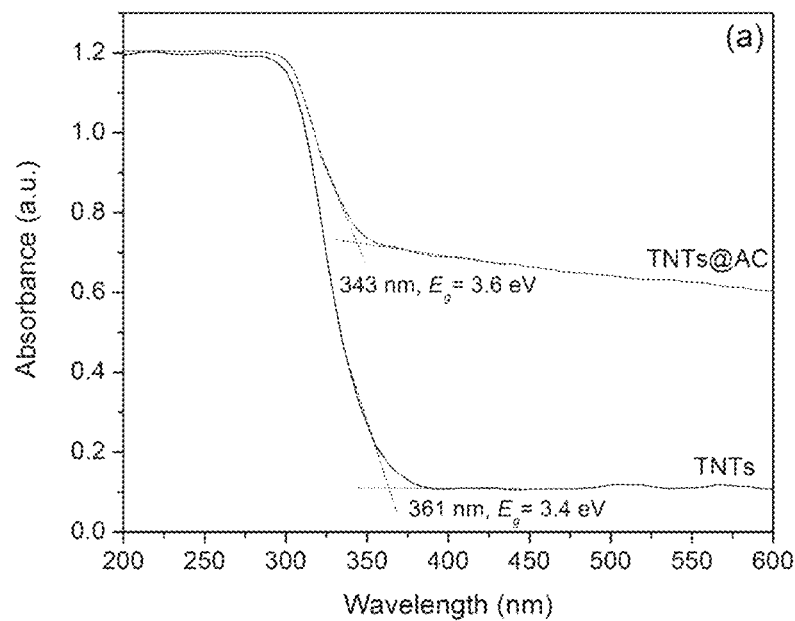
FIG. 6A shows UV-DRS spectra of TNTs and TNTs@AC.
Figure 6B:
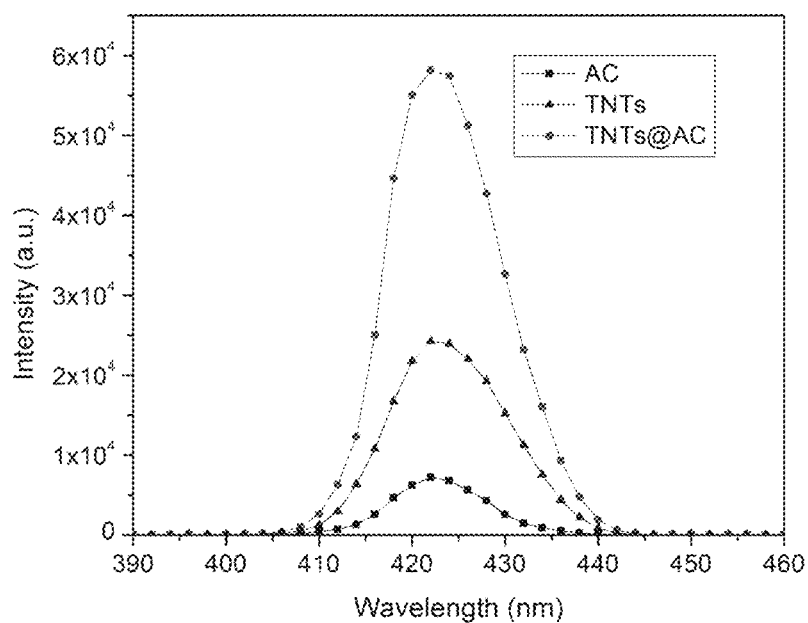
FIG. 6B shows PL spectra of TNTs@AC and neat AC and TNTs in the presence of terephthalic acid after UV irradiation.

UV-visible absorption spectra (UV-DRS) spectra (FIG. 6A) indicate that the absorption edge TNTs@AC displayed a blue shift compared to neat TNTs, with an increased band energy gap ($E_g$) of 3.6 eV compared to 3.4 eV of TNTs. The broadened $E_g$ indicates that the band structure of TNTs@AC becomes quantized, which favors utilization of UV light and suggests the micro-carbon deposited on TNTs are, at least in part, quantum dots. The quantization tends to confine photo-excited electrons in the conduction band, thereby enhancing the photocatalytic activity. In addition, UV-DRS spectra also show that the light absorbance of TNTs@AC in the range 350-600 nm was enhanced, which is attributed to AC's strong absorbance of visible light, suggesting that TNTs@AC can also facilitate photodegradation of phenanthrene under visible light. The photoluminescence (PL) spectra (FIG. 6B) confirm that much more •OH (the primary reactive oxygen species (ROS)) was produced by TNTs@AC than by neat TNTs and AC.

FIG. 16 displays the UV-vis spectra of a phenanthrene solution in various stages of adsorption (in the dark) and photocatalysis. The notable peak at ca. 250 nm is assigned to the absorbance of the aromatic ring from phenanthrene. The UV-vis spectra confirmed fast adsorption of phenanthrene by TNTs@AC, as the peak decayed by >93% after 1-hour adsorption in the dark, and by ~97% after 10 hours adsorption, which is consistent with the adsorption kinetics data. Moreover, the absorbance of the solution over 200-400 nm was lowered to nearly the background DI water level throughout the photocatalysis process, indicating that all formed degradation intermediates and products were either adsorbed or degraded rapidly by TNTs@AC. The UV-vis spectra for AC-treated solution appeared similar profile, except much less phenanthrene removal, and TNTs had no effect on the UV-vis spectra.

Example 12

Figure 1B:
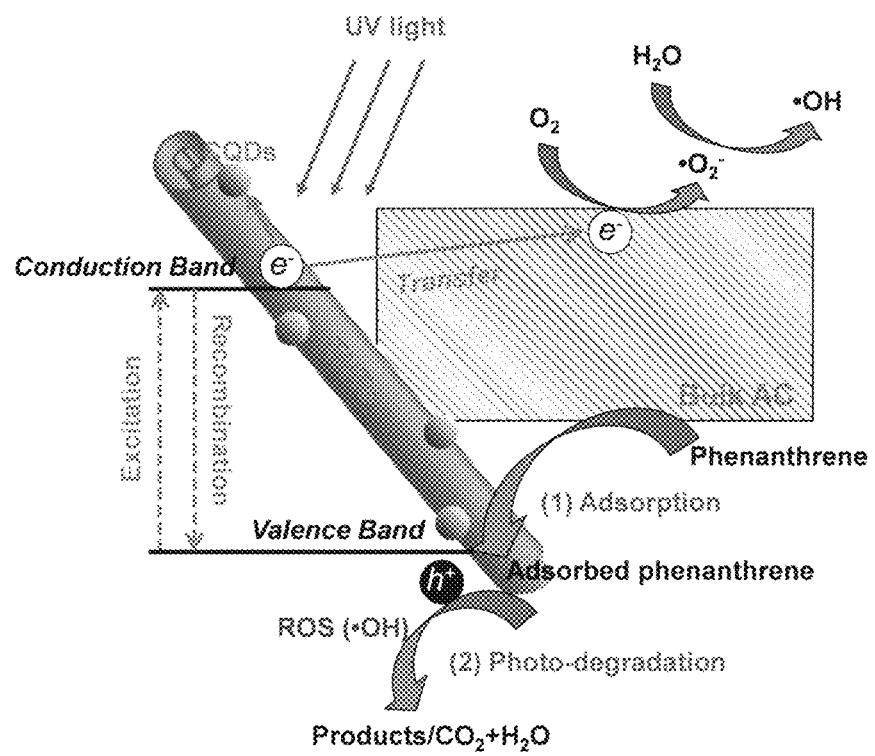

FIG. 1B summarizes the schematic and mechanisms of the two-step adsorption and photo-regeneration process and the synergistic effects of AC and TNTs. First, phenanthrene is adsorbed on TNTs@AC through adsorption and capillary condensation. TNTs, acting as the primary photocatalysis center, are excited under UV light and generate a conduction band (electron, $e^-$) and a valence band (hole, $h^+$) (Eqn. 1). Then, AC, especially the micro-AC grafted on TNTs, serves as electron mediator facilitating transferring $e^-$, and thus preventing recombination of the excited conduction band and the valence band (Eqn. 2). The quantization effect caused by the micro-AC also facilitates utilization of UV light for transferring more electrons from TNTs@AC and photocatalysis to $O_2$ and $H_2O$, resulting in more ROS ($•O_2^-$ and $•OH$) (Eqns. 3-5); likewise, as more holes are used to oxidize $H_2O$, more $•OH$ radicals, which are the primary ROS in the photocatalytic oxidation process, are produced (Eqn. 6) (as confirmed by PL spectra). Consequently, trace levels of PAHs in water can be highly efficiently degraded (Eqn. 7).

$$TNTs \rightarrow TNTs^*(h^+-e^-) \quad (1)$$

$$AC+e^- \rightarrow AC-e^- \text{(electron trap)} \quad (2)$$

$$O_2+e^- \rightarrow •O_2^- \quad (3)$$

$$•O_2^-+e^-+2H^+ \rightarrow H_2O_2 \quad (4)$$

$$H_2O_2+•O_2^- \rightarrow •OH+OH^-+O_2 \quad (5)$$

$$H_2O+h^+ \rightarrow •OH+H^+ \quad (6)$$

$$\text{phenanthrene}+•OH \rightarrow \text{intermediates} \rightarrow CO_2+H_2O \quad (7)$$

Example 13

Photo-Regeneration

Photo-regenerated TNTs@AC was repeatedly used in five consecutive cycles of operation (cycle=adsorption+photo-regeneration). Table 8 shows that more than 94% of the adsorption capacity was sustained after five cycles of operations and >99% of adsorbed phenanthrene was consistently photodegraded.

TABLE 8

Adsorbed versus degraded phenanthrene by TNTs@AC with or without light.

| | With light | | Without light | |
|---|---|---|---|---|
| Cycle | $E^a$ (%) | $R^b$ (%) | E (%) | R (%) |
| 0 | — | 96.8 | — | 96.8 |
| 1 | 0.63 | 95.1 | 85.3 | 1.33 |
| 2 | 0.46 | 93.3 | 83.6 | 2.16 |
| 3 | 0.59 | 92.4 | 82.2 | 1.47 |
| 4 | 0.42 | 91.7 | 81.3 | 1.03 |
| 5 | 0.61 | 91.1 | 80.6 | 1.22 |

$^a$E: The ratio of extracted phenanthrene from TNTs@AC after UV irradiation to total adsorbed phenanthrene before photo-degradation.
$^b$R: Removal efficiency of phenanthrene by regenerated TNTs@AC.

Example 14

TNTs@AC with Oil Components

FIG. 18 shows the distribution of n-alkanes in the aqueous phase during the adsorption process at a material dosage of 0.625 g/L. The targeted n-alkanes (C9-C40) were grouped into lower molecular weight hydrocarbons (LMWHs, C9-C20), medium molecular weight hydrocarbons (MMWHs, C21-C30) and higher molecular weight hydrocarbons (MMWHs, C31-C40). The initial total concentration of n-alkanes was 71.5 mg/L, and two main peaks were centered in C24-C29 and C11-C13. The concentration of all n-alkanes gradually decreased as the adsorption proceeded, and the total n-alkanes removal was 49%, 80% and 82% at 10 minutes, 4 hours and 24 hours, respectively. However, the removal efficiency of LMWHs, MMWHs, and HMWHs at 24 hours was 79%, 82%, and 91%, respectively, indicating that n-alkanes with longer carbon chains are more preferentially adsorbed, which can be attributed to their higher hydrophobicity.

Example 15

TNTs@AC with Oil Components

FIG. 19 shows the distribution of PAHs during the adsorption at a material dosage of 0.625 g/L. The targeted 16 parent PAHs include naphthalene (Naph), acenaphthylene (Acel), acenaphthene (Acen), fluorene (Fluo), phenanthrene (Phen), anthracene (Anth), fluoranthene (Flan), pyrene (Pyre), benzo (a)anthracene (BaA), Chrysene (Chry), benzo(b)fluoranthene (BbF), benzo(k)fluoranthene (BkF), benzo(a)pyrene (BaP), Indeno(1,2,3-cd)pyrene (IP), dibenzo(a,h) anthracene (DA), and benzo(g, hi)perylene (BgP). In addition, primary alkylated PAHs were also targeted, including alkylated-Naph, alkylated-Fluo, alkylated-Phen, alkylated-Anth, alkylated-Flan, and alkylated-Pyre. The initial concentration of the total PAHs was 3.4 mg/L, including 1.0 mg/L of parent PAHs and 2.4 mg/L of alkylated PAHs. The 2-ring (e.g., Naph, Acen, and Fluo) and 3-ring (e.g., Phen) PAHs were found to be the main components, while very low concentrations of >5-ring PAHs (<0.4% of total PAHs) were detected in the DWAO. TNTs@AC were very effective at adsorbing PAHs. More than 90% of PAHs were removed within 1 hour, and over 99% of both parent and alkylated PAHs were removed at 24 hours, which is much higher than that for THPs (83%) and n-alkanes (82%). In addition, TNTs@AC preferred to adsorb parent PAHs to the corresponding alkylated PAHs, for example, 74% of the parent PAHs was adsorbed on TNTs@AC at 10 minutes compared with 63% for the alkylated PAHs.

Example 16

Photodegradation of Adsorbed Oil Components

FIG. 20A shows the photo-degradation kinetics of adsorbed TPHs, n-alkanes and PAHs on TNTs@AC. FIG. 20A shows that 98.0%, 94.8% and 98.4% of the pre-concentrated TPHs, n-alkanes, and PAHs were degraded within 4 hours, respectively. Table 9 lists the best-fit model parameters when the pseudo-first-order model was used to interpret the photocatalytic kinetic data. The apparent rate constant ($k_1$) follows the sequence of: PAHs ($1.01 \text{ h}^{-1}$)>TPHs ($0.89 \text{ h}^{-1}$)>n-alkanes ($0.70 \text{ h}^{-1}$), indicating that PAHs are more prone to the photocatalytic degradation. When PAHs and alkylated PAHs are compared, alkylated PAHs are more preferentially photodegraded (FIG. 20B), with a higher $k_1$ value of $1.17 \text{ h}^{-1}$. The ROS (e.g. $•OH$, $•O_2^-$ and $^1O_2$) produced in the photocatalytic reactions may be more likely to attack the alkyl-groups in alkylated PAHs.

TABLE 9

Parameters of first-order kinetic model for photocatalytic degradation of TPHs, n-alkanes, and PAHs by TNTs@AC

| Parameters | TPHs | n-alkanes | | | | PAHs | | |
| --- | --- | --- | --- | --- | --- | --- | --- | --- |
| | | Total | LMWHs | MMWHs | HMWHs | Total | Parent | Alkylated |
| $k_1$ (h$^{-1}$) | 0.8852 | 0.7046 | 0.6771 | 0.7237 | 0.6250 | 1.0144 | 0.8168 | 1.1723 |
| $R^2$ | 0.9751 | 0.9675 | 0.9543 | 0.9691 | 0.9904 | 0.9986 | 0.9984 | 0.9951 |

According to these results, more than 99.5% of TPHs, n-alkanes, and PAHs could be adsorbed at 1.25 g/L TNTs@AC, and then, 98.0%, 94.8% and 98.4% of the pre-concentrated TPHs, n-alkanes, and PAHs could be degraded within 4 hours under UV irradiation.

Example 17

General Synthesis of TNTs/ACFs

P25 TiO$_2$ (ca. 80% anatase and 20% rutile, Evonik, Germany), NaOH (Acros Organics, Fair Lawn, N.J., USA) and activated carbon fibers (DARCO, USA) were used to synthesize TNTs@ACFs. Uranyl nitrate dihydrate (UO$_2$(NO$_3$)$_2$.2H$_2$O, U in the form of $^{238}$U) was purchased from International Bio-Analytical Industrial Inc. (FL, USA), and a stock solution of 1000 mg/L was prepared with the addition of 1 mL concentrated HNO$_3$ to acidify the solution (pH≈2.7). 2-Chlorophenol from Sigma-Aldrich (St. Louis, Mo., USA) was used to prepare a stock solution of 1000 mg/ml and stored at 4° C. All stock solutions were prepared with Millipore deionized (DI) water (18.2 MΩ cm).

TNTs@ACFs was synthesized through a one-step hydrothermal method modified from our previous study. Briefly, 1.2 g of ACFs and 1.2 g of TiO$_2$ were mixed with 66.7 mL of a 10 mol/L NaOH solution and stirred for 12 hours. Then, the mixture was transferred to a Teflon reactor sealed with a stainless-steel cover and heated in a muffle furnace at 130° C. for 72 hours. The black precipitate (TNTs@ACFs) was collected and washed with DI water until pH~9 and dried at 105° C. for 4 hours.

Example 18

Batch Adsorption and Kinetic Assays

Batch adsorption kinetic and isotherm experiments were conducted in amber glass bottles with Teflon-lined caps at 22° C. (preliminary test showed no adsorption of U(VI) or 2-CP by glass bottles and Teflon lined caps). For adsorption kinetics, the reaction was initiated by adding 0.04 g of TNTs@ACFs into 200 mL U(VI) or 2-CP solution with an initial concentration of 20 mg/L and pH adjusted to 5, and the bottles were placed on the horizontal shaker (200 rpm). The solution pH was kept constant through manually adjusted by diluted NaOH or HCl. After a predetermined time interval, 2 mL sample was taken and immediately filtered through a 0.22 μm Nylon membrane, and the filtrates were analyzed to determine the concentration of remained U(VI) or 2-CP. All kinetic experiments were conducted for 24 hours to reach adsorption equilibrium. For single adsorption isotherm tests, the same experimental procedure as kinetic tests were applied, while the tests were finished in 43 mL amber glass vials with no headspace to minimize the volatilization loss of 2-CP. The same experimental conditions were kept (materials dosage equals to 0.2 g/L and pH maintained at 5) with initial U(VI) or 2-CP concentration ranged from 5 to 300 mg/L. While for adsorption isotherm in a binary system, U(VI) and 2-CP were mixed to achieve initial mass concentration ratios of 1:2, 1:1, and 2:1. After 24 hours, the remaining concentration of U(VI) or 2-CP was determined.

The concentration of aqueous U(VI) was determined with an ICP-OES (Varian 710-ES, Palo Alto, Calif., USA) and the detection limits were 0.1 mg/L. 2-CP concentration was measured on an Agilent 1100 high-performance liquid chromatography (HPLC, USA) equipped with a Zorbax SB-C18 column (2.1 mm×150 mm, 5 μm) and a diode array detector (DAD). A mixture of methanol (HPLC grade) and ultrapure water (v/v of 60:40) was applied as the isocratic eluent at a flow rate of 0.8 mL/min and the eluate analyzed at a UV array detector of 280 nm.

Example 19

Adsorption of U(VI) or 2-CP

FIG. 21 shows the XRD patterns of TNTs@ACFs before and after adsorption of U(VI) or 2-CP. The diffraction at 2 θ=10.0°, 24.2°, 28.1°, 48.1° and 61.9° of neat TNTs@ACFs are all assigned to sodium titanate. After the adsorption of U(VI), the intensity of these sodium titanate peaks remarkably decreased when compared to neat materials. Particularly, the peak at 10° represents the interlayer distance of TNTs, which was sharped diminished and shifted to 9.5° after adsorption of U(VI) only and totally disappear after adsorption of U(VI) and 2-CP complex, indicating the interlayer distance is enlarged after the ion exchange between U(VI) and Na$^+$/H$^+$.

FIG. 22 represents the adsorption kinetics of U(VI) or 2-CP by TNTs@ACFs with initial concentration equals to 20 m/L. The U(VI) or 2-CP was rapidly removed by TNTs@ACFs with the most adsorption occurred in the first 15 minutes and 120 minutes for U(VI) and 2-CP, respectively. The adsorption equilibrium was reached after 8 hours for U(VI) and 240 minutes for 2-CP. The final removal efficiency of U(VI) reached 99.5% with high finial uptake of 99.5 μg/g; for 2-CP, the equilibrium uptake reached 64.1 mg/L.

FIGS. 34A and 34B give the adsorption isotherm in the single or binary system by TNTs@ACFs. For both U(VI) and 2-CP, the equilibrium uptake in a binary system is much larger than in single system. The synergistic promotion effect might be due to the additional adsorption sites on TNTs@ACFs after U(VI) complexing with 2-CP. For example, in the single system, U(VI) may mainly be adsorbed by TNTs and ACFs provided limited adsorption capacity; while in binary system, U(VI) complexes with 2-CP, so ACFs could also effectively adsorb the U(VI)-2-CP complex and enhance the total U(VI) uptake amount.

TNTs@ACFs posses both heavy metal and organic compound adsorption capacity, and could simultaneously remove U(VI) and 2-CP. In a binary system, U(VI) and 2-CP exhibit synergistic promotion effect on adsorption by TNTs@ACFs compared to a single system.

Example 20

Adsorption 2-CP 4-chlorophenol (4-CP) adsorption kinetic experiments were carried out in dark using brown glass vials (40 mL) with Teflon-lined caps. Adsorption kinetic tests were conducted at pH 7 with an initial concentration of 4-CP of 5 and 8 mg/L and TNTs@AC dosage of 0.2 g/L. The tests were initiated by adding TNTs@AC into the respective 4-CP solutions and then the change in 4-CP concentration was followed for 24 hours under shaking at 200 rpm. At predetermined times, the vials were sacrificially sampled. Upon centrifuging at 6000 rpm (6400 g-forces) for 5 minutes, the supernatants were sampled and analyzed for 4CP. For comparison, 4-CP adsorption kinetics by original untreated AC and was also tested. Adsorption isotherms were constructed in a similar fashion with an initial 4-CP concentration of 2-100 mg/L and a fixed TNTs@AC dosage of 0.2 g/L at pH 7, and the mixtures were equilibrated for 24 hours under shaking. For comparison, adsorption isotherms by AC, AC-treated, and TNTs were also obtained. To test effects of pH, the equilibrium tests were carried out at an initial 4-CP concentration of 8 mg/L, a TNTs@AC dosage of 0.2 g/L, and final solution pH 2-10 (adjusted using dilute HCl and NaOH). To probe effects of ionic strength, the tests were carried out in the presence of 0-10 mM of NaCl and $CaCl_2$. Likewise, effects of humic acid were tested by measuring equilibrium uptake of 4-CP in the presence of 0-20 mg/L as total organic content (TOC) of Leonardite Humic Acid (LHA). To test the adsorption reversibility, desorption isotherms were measured. Following the adsorption isotherm tests, the supernatant in each vial was replaced with 40 mL of deionized water, and then re-equilibrated for 24 hours. The equilibrium distribution of 4-CP was then measured in the same fashion as in the adsorption equilibrium tests.

FIG. 23 shows adsorption kinetics of 4-CP by TNTs@AC. TNTs@AC displayed rapid uptake rate. The adsorption equilibrium was reached in 120 min, with a high removal efficiency of 98.3% at equilibrium, and most (>95%) of the adsorption capacity was filled in the first 60 min. In contrast, the parent AC and the hydrothermally treated AC have slower kinetics and lower 4-CP capacity. These observations indicate that the TNTs play an important role in 4-CP adsorption by providing sites that are more accessible and added adsorption capacity. Previous studies suggested that the rate-controlling step for 4-CP adsorption by TNTs@AC is due to chemical interactions.

FIG. 24 compares the adsorption isotherms of 4-CP by TNTs@AC and parent AC with the 4-CP initial concentration range of 2-100 mg/L. As shown in FIG. 24, TNTs@AC has higher adsorption capacity. The main sorbent is only AC for parent AC and TNTs@AC. Since the mass of AC in TNTs@AC is only ⅔ of the parent AC mass, the unite weight AC's adsorption capacity in TNTs@AC is much higher than parent AC. The isotherm displayed a two-stage profile, i.e. a Langmuir adsorption at lower Ce (<10 mg/L) and a linear uptake at higher $C_e$. Accordingly, a dual-mode uptake model was used to interpret the isotherm data. The dual-mode model considers a Langmuir type adsorption in the low concentration range and a capillary condensation in the high concentration range. This dual-mode model suggests that sorption of 4-CP to TNTs@AC is attributed to combined adsorption on the AC surface and "hole-filling" or capillary condensation in the nanotubes.

Example 21

4-CP Degradation

Almost no 4-CP (<5%) was photodegraded without the catalyst but under otherwise identical conditions. However, the preconcentrated 4-CP on TNTs@AC was photodegraded under UV irradiation for both material dosage of 0.2 and 0.3 g/Lg. when material dosage equal to 0.2 g/L, about 68% of 4-CP degraded within 4 hours and when material dosage equal to 0.3 g/L, about 87% of 4-CP degraded within 4 hours, as suggested in FIG. 25. In comparison, only less than 10% of 4-CP loaded on the parent AC were degraded under the identical UV irradiation, indicating excellent photocatalytic activity of TNTs grafted on AC. UV-vis spectra confirmed that 4-CP was rapidly removed through adsorption by TNTs@AC, and the photodegradation products were also rapidly adsorbed and/or degraded. Compared to the precursor $TiO_2$, neat TNTs show much weaker photocatalytic activity due to the easy recombination of electron-hole pairs. Yet, carbon doping or deposition may enhance the photocatalytic activity of $TNTs/TiO_2$, because the carbon materials can act as an electron transfer mediator that inhibits the recombination. Some of the grafted AC nanoparticles may act as carbon quantum dots, which have been known to be an effective sensitizer of photocatalysts.

Example 22

TNT@AC Reuse

Reuse tests were performed for 4 cycles. Results are shown in FIG. 26. Two dosages of materials were applied (0.2 and 0.3 g/L) in this test. In each cycle, 4-CP removal efficiency (adsorption) remains higher than 95%. The higher dosage (0.3) shows better performance due to high degradation rate.

Example 23

Effect of Dissolved Organic Matter (DOM)

DOM adsorption kinetic experiments were carried out in dark using brown glass vials (40 mL) with Teflon-lined caps. Adsorption kinetic tests were conducted at pH 7 with an initial concentration of DOM of 5 mg/L as TOC and 2 kinds of TNTs@AC were utilized and dosage of them are same (0.2 g/L). The tests were initiated by adding TNTs@AC into the respective DOM solutions and then the change in DOM concentration was followed for 24 hours under shaking at 200 rpm. At predetermined times, the vials were sacrificially sampled. Upon centrifuging at 6000 rpm (6400 g-forces) for 5 min, the supernatants were sampled and analyzed for DOM. For comparison, DOM adsorption kinetics by original untreated AC was also tested. Adsorption isotherms were constructed in a similar fashion with an initial DOM concentration of 1-25 mg/L as TOC and a fixed TNTs@AC dosage of 0.2 g/L at pH 7, and the mixtures were equilibrated for 24 hours under shaking. For comparison, adsorption isotherms by AC, AC-treated, and TNTs were also obtained.

FIG. 27 shows adsorption kinetics of DOM by 2 kinds of TNTs@AC. TNTs@AC displayed rapid uptake rate. The adsorption equilibrium was reached in 90 min. For 325 mesh TNTs@AC, 52% of DOM was removed. For 100 mesh TNTs@AC, 76% of DOM was removed. For 100 mesh AC, 72% of DOM was removed. In contrast, 325 mesh AC only remove about 10% of DOM. These observations suggest that the TNTs play an important role in DOM adsorption by providing sites that are more accessible and added adsorption capacity.

FIG. 28 shows a comparison of the adsorption isotherms of DOM by 2 kinds of TNTs@AC and their parent AC, as well as hydrothermal treated AC, with the DOM initial concentration range of 1-25 mg/L as TOC. As shown in FIG. 28, 100 mesh TNTs@AC has highest adsorption capacity. After then, 100 mesh parent AC has the second high DOM adsorption capacity. After then, 325 mesh TNTs@AC has third high DOM adsorption capacity and 325 mesh parent AC has the lowest DOM adsorption capacity. DOM adsorption capacity for two kinds of TNTs@AC were both significantly enhanced. By comparing with FIG. 29, the hydrothermal treatment enhances AC adsorption capacity by 7-13%. Moreover, the TNTs have very limited DOM adsorption capacity.

Example 24

Regeneration

Almost no DOM was photodegraded without the catalyst but under otherwise identical conditions. However, the pre-concentrated DOM on TNTs@AC was photodegraded under UV irradiation when pH equal to 5, 7, and 9 (FIG. 30), when the material dosage equal to 0.2 g/L and pH equal to 9, about 78% of DOM degraded within 3 hours and when material dosage equal to 0.2 g/L and pH equal to 7, about 67% of DOM degraded within 3 hours. Moreover, when material dosage equal to 0.2 g/L and pH equal to 5, about 48% of DOM degraded within 3 hours.

In FIG. 31, the photocatalytic ability of TNTs@AC was compared with the photocatalytic ability of TNTs. Since TNTs take 33% of total mass of TNTs@AC. Thus, 0.066 g/L TNTs was utilized to compare with 0.2 g/L TNTs@AC. Under the identical UV irradiation, 10% significant improvement indicated excellent photocatalytic activity of TNTs grafted on AC. UV-Vis spectra confirmed that DOM was degraded by TNTs@AC, and the photodegradation products were also rapidly adsorbed and/or degraded (FIG. 32).

Compared to the precursor $TiO_2$, neat TNTs are known to show much weaker photocatalytic activity due to the easy recombination of electron-hole pairs. Carbon doping or deposition may greatly enhance the photocatalytic activity of $TNTs/TiO_2$, because the carbon materials can act as an electron transfer mediator that inhibits the recombination. Some of the grafted AC nanoparticles may act as carbon quantum dots, which have been known to be an effective sensitizer of photocatalysts.

Example 25

Reusability

FIG. 33 shows the reuse-ability of TNTs@AC. 100 mesh TNTs@AC was selected as material. 1 g/L of TNTs@AC was applied. Moreover, adsorption without regeneration was used to compare with a normal cycle. For all applied dosage, the DOM removal efficiency remains stable after regeneration within 5 cycles. But without regeneration, TNTs@AC will be fully occupied by DOM within 2-3 cycles and cannot remove more DOM. Another finding is when dosage equal to 1 g/L, the DOM which was not adsorbed can be lower than 1 mg/L which meet the requirement of water treatment plant.

Example 26

Synthesis of TNTs@PAC

TNTs@PAC was synthesized through a one-step hydrothermal approach modified from our previous work. In brief, 1.2 g of the PAC and 1.2 g of the $TiO_2$ particles were mixed and dispersed in 66.7 mL of a 10 M NaOH solution. After magnetically stirring for 12 hours, the mixture was transferred into a Teflon reactor with a stainless steel cover. The hydrothermal reaction then proceeded at 130° C. for 72 hours. The resulting black particles were collected upon gravity settling and washed with deionized (DI) water until pH about 9, and then dried at 105° C. for 4 hours.

The morphology of TNTs@PAC was analyzed on a Tecnai30 FEG transmission electron microscopy (TEM, FEI, USA). Crystal phases of the material were identified using a D/max-2400 X-ray diffractometer (XRD, Rigaku, Japan) at 100 kV and 40 mA, with the Cu K α radiation (k=1.542 Å) and a scanning rate of 4°/min. The surface elemental compositions and oxidation states of the materials were obtained on an AXIS-Ultra X-ray photoelectron spectroscopy (XPS) (Kratos, England) operated at 15 kV and 15 mA using the Al K α X-ray. The standard C1s peak (Binding energy, E=284.80 eV) was used to calibrate all the peaks and eliminate the static charge effects. The BET surface area of TNTs@PAC was obtained on an ASAP 2010 BET surface area analyzer (Micromeritics, USA) in the relative pressure ($P/P_0$) range of 0.06-0.20. The pH of the point of zero charge ($pH_{pzc}$) of TNTs@PAC was measured on a Nano-ZS90 Zetasizer (Malvern Instruments, UK) via measuring the zeta potential at various pH values.

FIG. 35 shows the TEM images of TNTs@PAC. The titanate nanotubes appeared interwoven and were attached on the PAC surface. The TNTs present themselves with a very high length-to-diameter ratio, and a hollow tubular structure, with an inner diameter of about. 4 to 5 nm and an outer diameter of about 8 to 9 nm. Therefore, the diameter of TNTs is smaller than the mesopores/micropores of PAC. It is noted that the hydrothermal treatment process during the TNTs@PAC formation may pose the following two effects on the resulting composite materials: (1) it transforms the precursor $TiO_2$ nanoparticles into titanate nanotubes, which are then immobilized on the PAC surface, and (2) some of micro-PAC particles are stripped from the bulk PAC and patched on TNTs, resulting in a modification of the nanotubes.

FIG. 36 shows the XRD patterns of TNTs@PAC before and after Pb(II) adsorption. For neat TNTs@PAC, the peaks at 9.5°, 24.2°, 28.1°, 48.1° and 61.7° are all assigned to sodium trititanate, with a basic chemical formula of $Na_xH_{2-x}Ti_3O_7 \cdot nH_2O$ (x=0-0.75, depending on the pH and remaining sodium after washing). The triple edge-sharing [$TiO_6$] octahedron constitutes the basic skeleton of titanate, while $Na^+$ and $H^+$ located in the interlayers serve as exchangeable counterions. In particular, the peak at 9.5° represents the interlayer distance of TNTs. The peak at 26.0° belongs to the crystal plane of graphite (002) from PAC, where the peak is weakened due to the low crystallinity of PAC and partial coverage of TNTs by micro-PAC particles. Upon Pb(II) adsorption, the interlayer peak strength remarkably diminished and shifted to 9.3°, suggesting the interlayer structure is stretched after the ion exchange between Pb(II) and $Na^+/H^+$. This observation differs from the previous findings showing that ion-exchange process between metal cations and $Na^+/H^+$ did not significantly affect the interlayer structure. It can be attributed to the intrusion of micro-carbon into the interlayer of TNTs during the formation of the tubular structure, resulting in a metastable state of TNTs. Consequently, the uptake of metal cations with a larger ionic radius (e.g. Pb(II)) will cause stretching of the lattice structure of TNTs.

Example 27

FIGS. 37A-37C show the XPS spectra of TNTs@PAC before and after Pb (II) adsorption, and Table 10 lists the atomic percentage of the elements. The results indicate that TNTs@PAC is composed of Na (4.6 at. %), O (27.6 at. %), Ti (9.3 at. %) and C (58.5 at. %). Based on the basic trititanate structure of TNTs, i.e. $Na_xH_{2-x}Ti_3O_7 \cdot nH_2O$, the synthesized TNTs@PAC in this study can be expressed as $[Na_{1.5}H_{0.5}Ti_3O_7 \cdot 1.9H_2O][18.9C]$, in which the 18.9C represents the PAC. Considering a carbon content of 90% in the PAC based on the manufacturer, the calculated TNTs-to-PAC mass ratio is 1:0.78. After Pb (II) uptake, a clear Pb 4f peak appeared in the survey spectra while the Na 1s peak was clearly weakened (FIG. 37A). The composite material composition upon Pb adsorption can be expressed as $[Na_{0.3}Pb_{0.6}H_{0.5}Ti_3O_7 \cdot 1.1H_2O][17.4C]$, where the Na portion was decreased from 1.5 to 0.3 in response to the uptake of Pb(II).

In the high-resolution spectra of O 1s, the peak at ca. 532 eV is assigned to the O from surface hydroxyl or C=O groups (FIG. 37B), while the peak at ca. 530 eV belongs to the lattice O in the $[TiO_6]$ octahedron. After Pb(II) adsorption, no compositional changes in lattice O and surface O were evident, indicating the stability of the skeleton trititanate structure in the adsorption process, and the ion exchange reaction occurred in the interlayers of TNTs, which is in accordance with the previous studies of neat TNTs. The observation also suggests that the change of interlayer distance of TNTs revealed by the XRD analysis had no effect on the basic trititanate compositions of TNTs. Moreover, the peaks at 141.5 and 136.5 eV are attributed to Pb $4f_{5/2}$ and Pb $4f_{7/2}$, respectively (FIG. 37C), and Pb(II) was the only Pb species detected on the material after adsorption.

TABLE 10

Atomic percentages of elements in TNTs@PAC before and after Pb(II) adsorption.

| Material | Element atomic percent (%) | | | | |
| --- | --- | --- | --- | --- | --- |
| | C | O | Na | Ti | Pb |
| TNTs@PAC | 58.5 | 27.6 | 4.6 | 9.3 | 0 |
| TNTs@PAC + Pb | 59.2 | 27.4 | 1.1 | 10.2 | 2.1 |

The BET-based specific surface area of TNTs@PAC was measured to be 654.2 m²/g, which is larger than the TNTs@AC (471.6 m²/g). The $pH_{pzc}$ of TNTs@PAC was measured to be 3.1, which was lower than that for neat PAC (6.7), resulting from the coating of TNTs on the PAC surface. The larger specific surface area and lower $pH_{pzc}$ are both in favor of adsorption of metal cations.

Example 28

Batch Adsorption and Kinetics

Batch adsorption kinetic and equilibrium experiments were conducted in glass bottles, which were mounted on a shaker operated at 200 rpm and at 25° C. For kinetic tests, the adsorption was initiated by adding 0.04 g of TNTs@PAC into 200 mL Pb(II) solution with an initial concentration of 50 and 100 mg/L, respectively, and with a solution pH 5. The solution pH as kept constant through intermittent adjusting by diluted HCl and NaOH. Then, 1 mL each of aqueous samples was then taken at predetermined time intervals and immediately filtered through a 0.22 µm cellulose acetate membrane. The filtrates were analyzed for Pb(II) remaining in the solution phase after dilution by deionized water. All kinetic tests lasted for 240 minutes, which was sufficient to reach the adsorption equilibrium. For adsorption isotherm tests, the same experimental procedure was followed as for the kinetic tests. However, the tests were carried out using 40 mL glass vials with Teflon lined caps and the initial Pb(II) concentrations ranged from 10 to 200 mg/L, with the material dosage of 0.2 g/L and solution pH of 5.0. The adsorption lasted for 240 minutes based on the kinetic tests to completely reach the equilibrium. For comparison, adsorption isotherms of Pb(II) by neat PAC and TNTs were also constructed under otherwise identical experimental conditions.

FIG. 38 displays the adsorption kinetics of Pb(II) by TNTs@PAC at a very high initial Pb(II) concentration of 50 and 100 mg/L. It is evident that Pb(II) was rapidly removed by TNTs@PAC in both cases, and most adsorption occurred in the first 15 minutes. The adsorption equilibrium was reached within 30 minutes for the lower concentration and 120 minutes for the higher concentration. At $C_0$=50 mg/mL the final removal efficiency of Pb(II) reached 99.4%, with a final Pb(II) uptake of 241.5 mg/g; and at $C_0$=100 mg/mL the equilibrium uptake reached 294.8 mg/g.

Example 29

Effect of NOM

To test the effect of NOM on Pb(II) adsorption by TNTs@PAC or the ability of the TNTs@PAC to resist DOM inhibition, the adsorption kinetic tests were also carried out in the presence of 1-10 mg/L (as TOC) of HA, with an initial Pb(II) concentration of 50 mg/L and a TNTs@PAC dosage of 0.2 g/L. The kinetic tests lasted for 240 minutes at pH 5.0. For comparison, the Pb(II) adsorption rates by neat PAC and TNTs were also tested in the presence of HA but under otherwise identical conditions. In addition, the HA concentration after adsorption by TNTs@PAC was also determined to quantify the HA uptake by TNTs@PAC.

FIG. 39 shows the adsorption kinetics of Pb(II) by TNTs@PAC in the presence of HA, and Table 11 gives the pseudo second-order model parameters. HA showed very different effects on adsorption of Pb(II) by the three materials. Increasing the HA from 0 to 10 mg/L as TOC showed only modest effect on the adsorption rate and extent of Pb(II) by TNTs@PAC, and the presence of 10 mg/L TOC only reduced the equilibrium adsorption uptake ($q_e$) by <5% (from 241.5 to 229.5 mg/g) (FIG. 39). In contrast, increasing the HA concentration suppressed the Pb uptake by neat TNTs and the presence of 10 mg/L of TOC diminished the Pb uptake by 23.5% (from 249.4 to 190.8 mg/g) (Table 11).

Example 30

Effect of pH

FIG. 40 shows the effect of pH on adsorption of Pb(II) by TNTs@PAC. The adsorption capacity increased with increasing pH. At low pH of 2 and 3, the equilibrium Pb uptake was lowered to 105.4 and 173.0 mg/g, respectively, due to the electrostatic repulsion between the positively charged surface of TNTs@PAC and $Pb^{2+}$. In addition, the $H^+$ ions will compete with Pb(II) for adsorption sites under strongly acidic conditions. At pH of about 4, the surface potential of TNTs@PAC turned to negative, resulting in an upsurge in Pb(II) uptake (230.2 mg/g, R=94.0%). At pH 5, nearly complete removal of Pb(II) (>99%) was achieved by TNTs@PAC, indicating the high adsorption capacity over broad pH range. Although no Pb(II) adsorption experiment was carried out at pH>7 due to the solubility limit of Pb(II), it is expected the material will perform even better under alkaline conditions due to both adsorption and precipitation.

Example 31

Regeneration

Two regeneration methods were tested to restore the adsorption capacity of spent TNTs@AC. First, a two-step acid desorption followed by base treatment was employed to regenerate TNTs@PAC. While good desorption efficiencies were. While fairly good desorption efficiencies were achieved high (D=7.282.1%) over the 3 cycles of operation, the Pb(II) removal efficiency (R) following each regeneration fell more aggressively, with a drop from 99.4% to 47.3% after the 3rd run.

The invention claimed is:

1. A composite comprising a carbonaceous support and a metallic nanotube conjugated with the carbonaceous support,
    wherein the metallic nanotube comprises titanate, and
    wherein the metallic nanotube further comprises carbon nanoparticles on the surface of the metallic nanotube.

2. The composite of claim 1, wherein the carbonaceous support comprises charcoal selected from the group consisting of activated charcoal, powder activated charcoal, activated carbon fibers, biochar, and mixtures thereof.

3. The composite of claim 1, wherein the titanate has a basic structure of $Na_xH_{2-x}Ti_3O_7$, wherein x=0-0.75.

4. The composite of claim 3, wherein the titanate comprises a skeletal structure and one or more interlayers, wherein the skeletal structure comprises corrugated ribbons of triple edge-sharing $TiO_6$, and wherein the one or more interlayers comprise $H^+$, $Na^+$, or a combination of both.

5. The composite of claim 1, wherein the composite has XRD peaks at 2θ of about 24°, about 28°, about 48°, and about 62°.

6. The composite of claim 1, wherein the carbonaceous support comprises a plurality of pores and each pore of the plurality of pores has a diameter of about 2 nm to about 50 nm.

7. The composite of claim 1, wherein the metallic nanotube has an inner diameter of about 2 nm to about 10 nm.

8. The composite of claim 1, wherein the metallic nanotube further comprises a dopant.

9. The composite of claim 1, wherein the carbon nanoparticles are grafted on the surface of the metallic nanotube.

10. The composite of claim 1, wherein the carbonaceous support and the metallic nanotube are in a mass ratio of about 4:1 to about 0.5:1.

11. The composite of claim 1, wherein the carbon nanoparticles perform as carbon quantum dots.

12. A method of removing one or more contaminants from water, the method comprising the step of contacting a composite according to claim 1 with a contaminant to form a composite-contaminant complex, wherein the contaminant is a hydrocarbon or a heavy metal.

13. The method of claim 12, wherein the hydrocarbon is selected from the group consisting of aromatic hydrocarbons, polyaromatic hydrodrocarbons, alkyl hydrocarbons, and halogenated hydrocarbons and the heavy metal is lead, copper, cadmium, mercury, nickel, cobalt, or uranium.

14. The method of claim 12, comprising regenerating the composite.

15. The method of claim 14, wherein the step of regenerating comprises degrading the contaminant by exposing the composite-contaminant complex to light.

16. The method of claim 12, wherein the composite is not fouled by dissolved organic matter.

* * * * *